United States Patent
Rosheim

(10) Patent No.: US 9,630,326 B2
(45) Date of Patent: Apr. 25, 2017

(54) ROBOTIC MANIPULATOR WITH SPHERICAL JOINTS

(71) Applicant: ROSS-HIME DESIGNS, INCORPORATED, St. Paul, MN (US)

(72) Inventor: Mark E. Rosheim, St. Paul, MN (US)

(73) Assignee: Ross-Hime Designs, Inc., St. Paul, MN (US)

(*) Notice: Subject to any disclaimer, the term of this patent is extended or adjusted under 35 U.S.C. 154(b) by 71 days.

(21) Appl. No.: 14/356,437

(22) PCT Filed: Nov. 8, 2012

(86) PCT No.: PCT/US2012/064185
§ 371 (c)(1),
(2) Date: May 6, 2014

(87) PCT Pub. No.: WO2013/070938
PCT Pub. Date: May 16, 2013

(65) Prior Publication Data
US 2015/0114163 A1 Apr. 30, 2015

Related U.S. Application Data

(60) Provisional application No. 61/607,896, filed on Mar. 7, 2012, provisional application No. 61/557,264, filed on Nov. 8, 2011.

(51) Int. Cl.
*B25J 9/00* (2006.01)
*B25J 17/00* (2006.01)

(52) U.S. Cl.
CPC ............ *B25J 17/00* (2013.01); *B25J 9/0045* (2013.01); *Y10S 901/28* (2013.01); *Y10T 74/20317* (2015.01); *Y10T 74/20329* (2015.01)

(58) Field of Classification Search
CPC .... B25J 17/00; B25J 9/0045; Y10T 74/20317
See application file for complete search history.

(56) References Cited

U.S. PATENT DOCUMENTS

| 4,580,461 A | * | 4/1986 | Sears | ........................ | H01Q 3/08 |
| | | | | | 343/765 |
| 6,412,363 B1 | * | 7/2002 | Brog.ang.rdh | ............. | B25J 9/02 |
| | | | | | 414/744.5 |

(Continued)

FOREIGN PATENT DOCUMENTS

| JP | 2011-000643 A | 1/2011 |
| KR | 10-2009-0116072 A | 11/2009 |

OTHER PUBLICATIONS

International Preliminary Report on Patentability, dated May 22, 2014, for PCT/US2012/064185.

(Continued)

*Primary Examiner* — David M Fenstermacher
(74) *Attorney, Agent, or Firm* — Kinney & Lange, P.A.

(57) ABSTRACT

A controlled relative motion system includes a base support and a manipulable support. A plurality of lower link members are pivotally coupled to the base support, and each includes a spherical section capture opening. A plurality of upper link members are rotatably coupled to the lower link members via spherical joints at the spherical section capture openings. The manipulable support is pivotally coupled to the plurality of upper link members.

24 Claims, 51 Drawing Sheets

(56) References Cited

U.S. PATENT DOCUMENTS

| | | | | |
|---|---|---|---|---|
| 7,392,722 | B2* | 7/2008 | Gosselin | B25J 13/02 |
| | | | | 414/729 |
| D619,632 | S * | 7/2010 | Feng | B25J 9/02 |
| | | | | D15/199 |
| 8,215,199 | B2* | 7/2012 | Marcroft | B25J 17/0216 |
| | | | | 74/490.08 |
| 8,578,811 | B2* | 11/2013 | Alet | B25J 9/0042 |
| | | | | 74/490.09 |
| 2004/0126198 | A1* | 7/2004 | Chen | B23Q 1/5462 |
| | | | | 409/201 |
| 2009/0095108 | A1 | 4/2009 | Rayandeh et al. | |
| 2009/0255353 | A1 | 10/2009 | Nishida et al. | |
| 2010/0043577 | A1* | 2/2010 | Rosheim | B25J 17/0266 |
| | | | | 74/5.4 |
| 2010/0101359 | A1 | 4/2010 | Breu et al. | |
| 2010/0234844 | A1* | 9/2010 | Edelhauser | A61B 17/62 |
| | | | | 606/56 |
| 2012/0137816 | A1* | 6/2012 | Carricato | B25J 17/0266 |
| | | | | 74/490.05 |
| 2015/0239133 | A1* | 8/2015 | Whitney | B25J 19/002 |
| | | | | 74/490.01 |

OTHER PUBLICATIONS

International Search Report and Written Opinion mailed on Mar. 19, 2013, for PCT/US2012/064185.

* cited by examiner

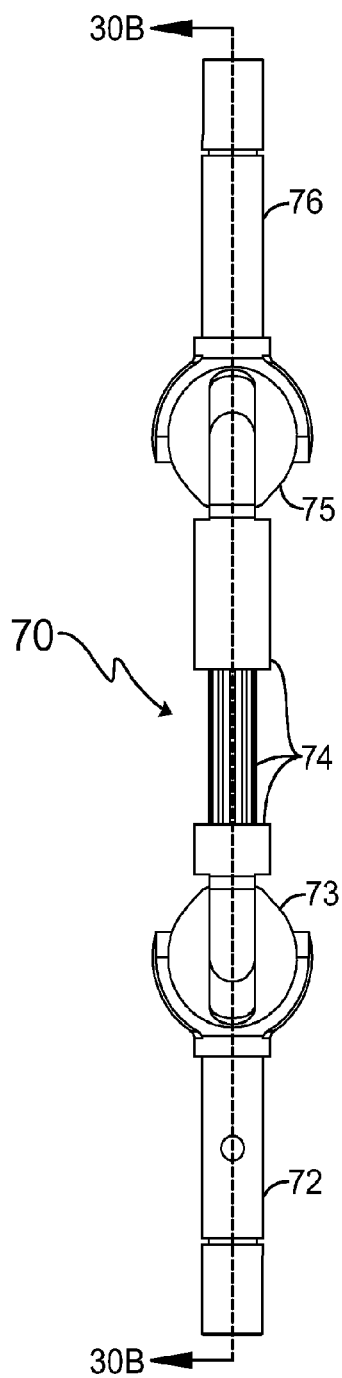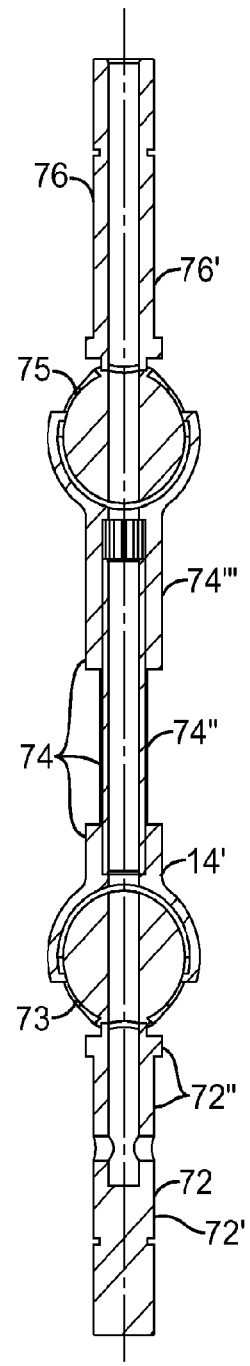
FIG. 30A  FIG. 30B

ROBOTIC MANIPULATOR WITH SPHERICAL JOINTS

BACKGROUND

The present invention relates to controlled motion mechanical members used as a mechanical manipulator and, more particularly, to a motion controllable mechanical manipulator which can be formed from repeated use of components of relatively few component types.

A strong desire for increased automation in the workplace, and a desire to increase the use of animated figures depicting animals, humans or other characters in entertainment situations, use in hazardous environments and other situations, along with an increased ability to control such mechanical manipulators has led to substantial efforts in the development of robotics. As a result, substantial advances have occurred in many aspects of robotics.

Perhaps the most widely used controlled component in robotic systems is a mechanical manipulator, that portion of a robot used to change the position or orientation of selected objects engaged by that manipulator. In many instances, such mechanical manipulators are desired to have capabilities similar to those of the human wrist or shoulder, that is, exhibiting two or more degrees of freedom of motion.

Although a number of such mechanical manipulators have been developed which to a greater or lesser degree achieve some of these desires therefor, many have been relatively complicated devices requiring complicated components and difficult assembly procedures or both. Many, in addition, represent compromises in having relatively limited range, or singularities within the ranges, or other limitations in performance. There has been previously disclosed a mechanical manipulator which can, under control of the user, position objects anywhere over at least a hemispherical surface without any singularities in the operation of the device in this range, and which can be made both reliably and inexpensively.

This manipulator comprises a base support, a pivot holder and a plurality of pivoting links. The pivoting links are rotatably coupled to both the base support and to members of the pivot holder to rotate about axes which extend in different directions for each of these rotatable couplings to a link, typically in accord with specific geometrical arrangements, and in different directions from similar axes in another of such links. These pivot holder members, are in turn in a second coupling, each rotatably coupled to one of a second plurality of pivoting links that are rotatably coupled, in turn, to a manipulable support.

Each of the coupling joints in the manipulator contributes some deflection or deformation when subjected to a sufficiently large mechanical force, or load, being applied thereto. These contributions reduce the mechanical stiffness of the manipulator. Thus, there is a strong desire to reduce the number of coupling joints needed, and to reduce any configurational distortions therein occurring under substantial loads applied thereto.

SUMMARY

A controlled relative motion system is disclosed herein. The system includes a base support. A plurality of lower link members are pivotally coupled to the base support, and each includes a spherical section capture opening. A plurality of upper link members are rotatably coupled to the lower link members via spherical joints at the spherical section capture openings. A manipulable support is pivotally coupled to the plurality of upper link members.

BRIEF DESCRIPTION OF THE DRAWINGS

FIG. 30A shows an elevation view of a portion of the embodiment shown in FIG. 29, and FIG. 30B shows a cross section view of the portion shown in FIG. 30A.

DETAILED DESCRIPTION

Figure 1:
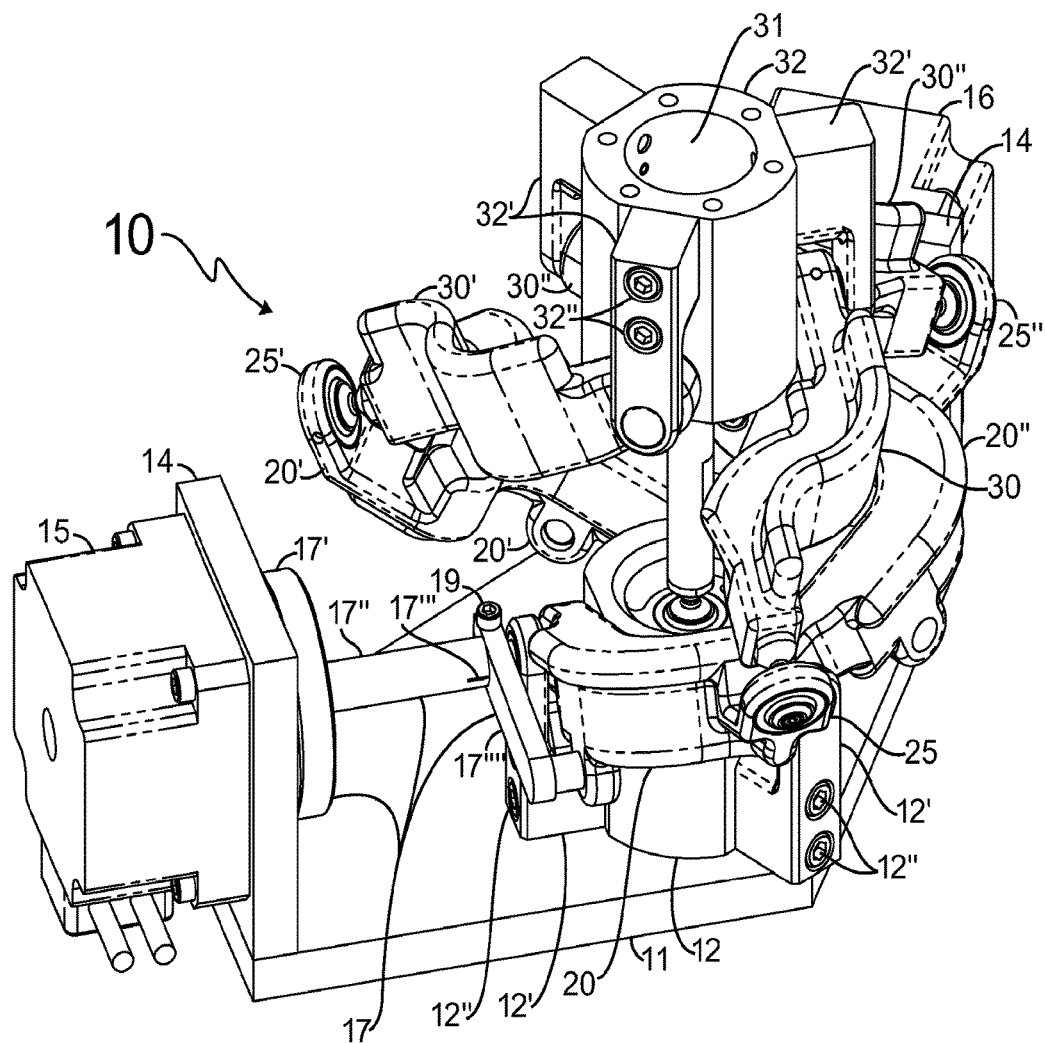
FIGS. 1 through 3 show perspective, elevation and plan views of an embodiment of the present invention.
Figure 2:
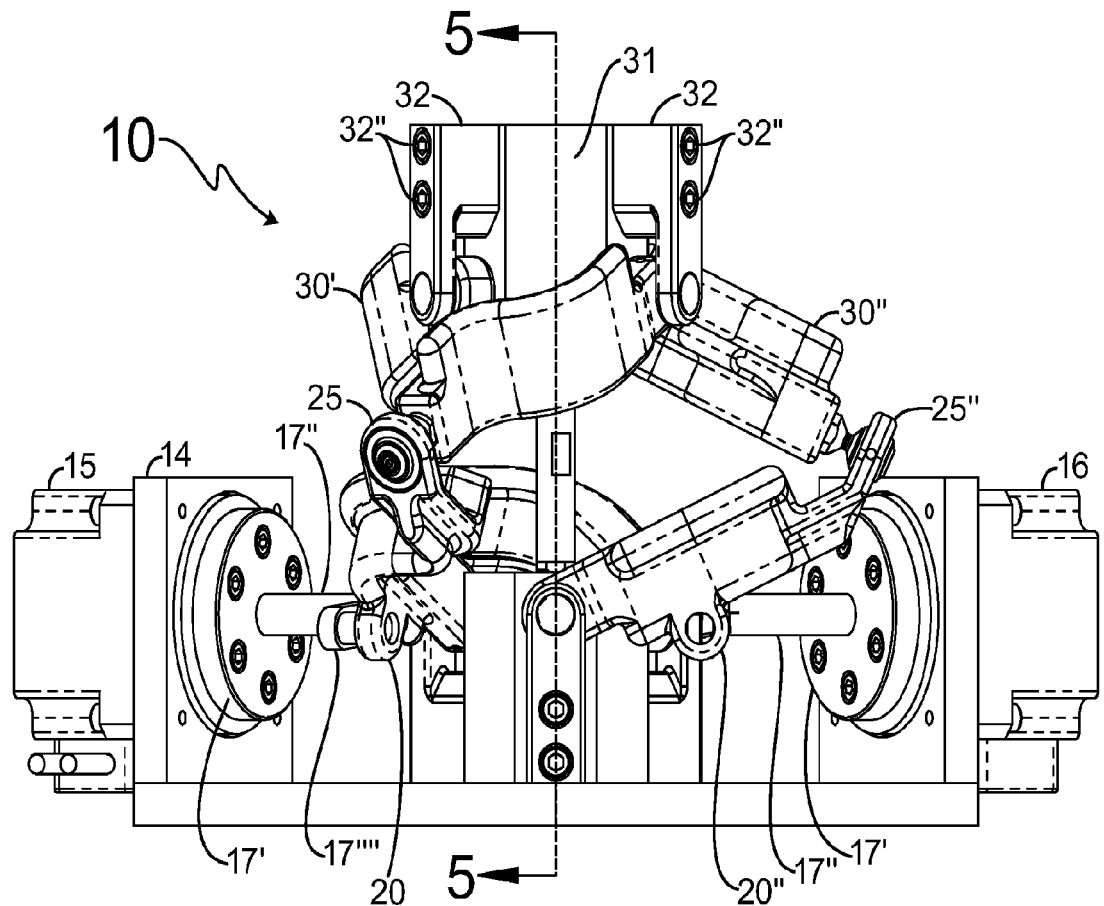
Figure 3:
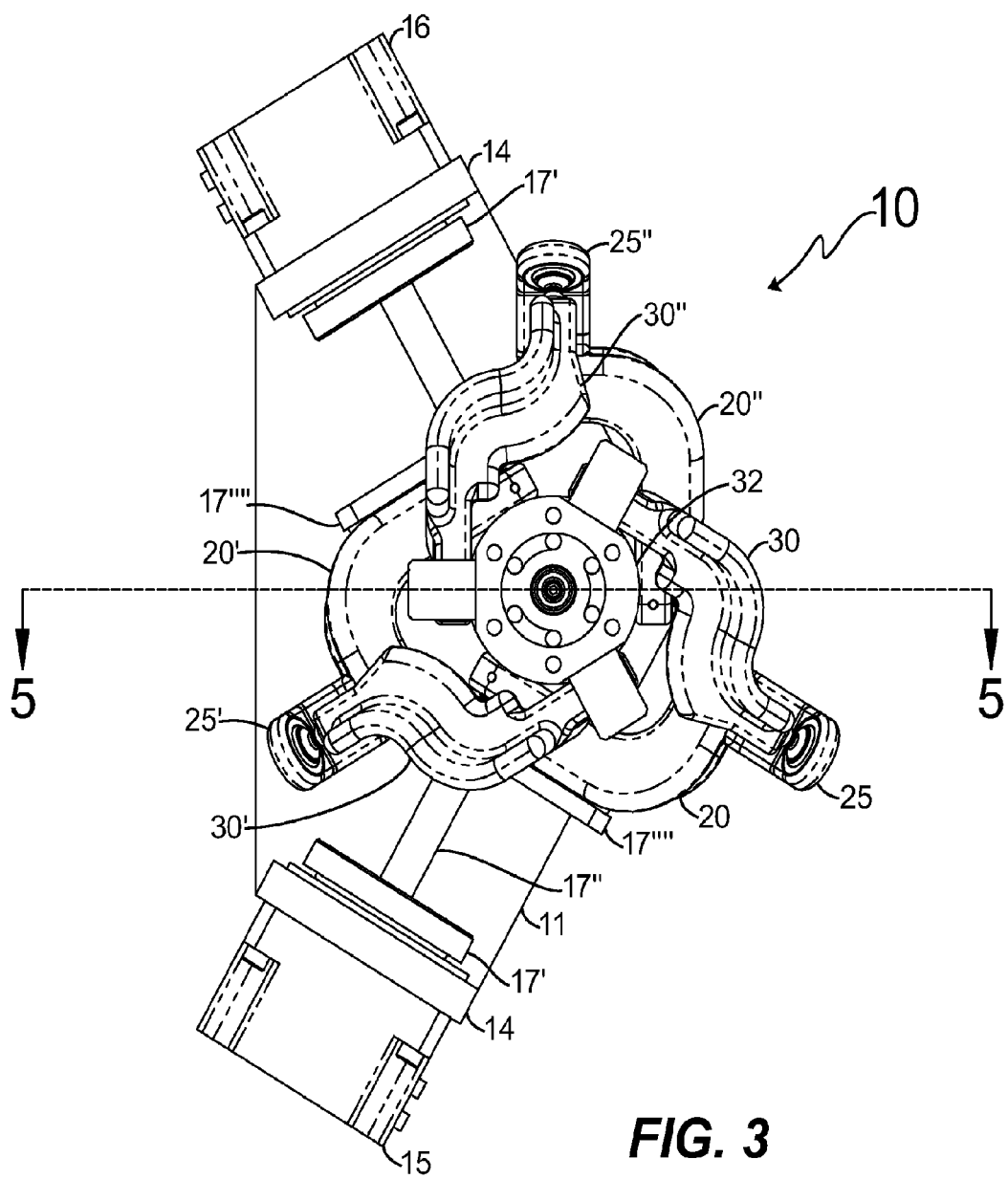

FIGS. 1 through 12 show a first embodiment of a mechanical manipulator, or controlled member motion system, 10, which can have a very large output operating range in various configurations over which it is free of singularities, and which is operated by various force imparting devices directly or through various drive trains. FIG. 1 shows a perspective view of manipulator 10 with FIGS. 2 and 3 showing an elevation view and a plan view of that manipulator, respectively.

Manipulator 10 is positioned on a mounting arrangement having a base portion, 11, selectively containing therein, or alternatively not, an electric motor arrangement, unseen in these figures, which can rotate the mounting arrangement in either the clockwise or counterclockwise direction, as selected by the user, to thereby carry the remainder of joint or manipulator 10 correspondingly with it in these directions. Directly supported on the outer surface of base 11, shown as a flat surface, is a manipulator base support, 12, shown as a truncated, rounded corner triangular cross section (parallel to base 11) shell structure, with flat sides between these rounded corner sides, this support extending outward from base 11 along an extension axis typically perpendicular to the flat surface shown as the outer surface of base 11 in these figures. The flat sides of support 12 are shown parallel to the generally symmetrical extension axis of base support 12 in their outward (or upward) extensions from base 11. Alternatively, different geometrical shapes can be used for this support in extending outward from base 11. There are shown a plurality of screws, 11', each insertable through a corresponding one of a plurality of smaller openings in base 11 symmetrically positioned about a larger opening in base 11.

In addition, there are three base support brackets, 12', each having a bearing reception opening therein in a portion thereof spaced apart from base support 12. Each bracket is fastened in a contact portion thereof to a corresponding one of the three substantially flat sides out of the six sides of base support 12 (every other one of these six sides) by a corresponding one of three pairs of screws, 12", that extend through corresponding openings in the contact portions of these brackets to be screwed into threaded openings in those support flat sides.

Figure 4:
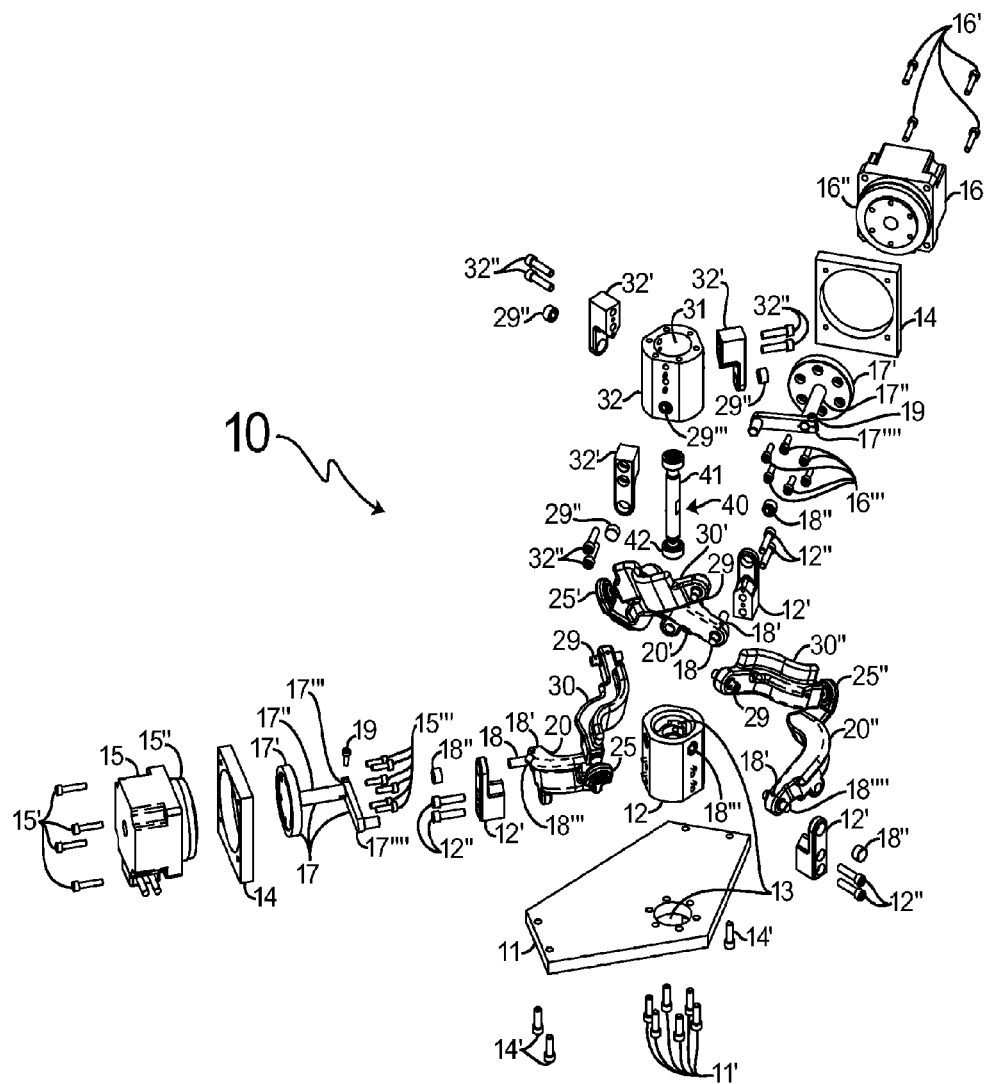
FIG. 4 shows an exploded view of the embodiment shown in FIGS. 1 through 3.
Figure 5:
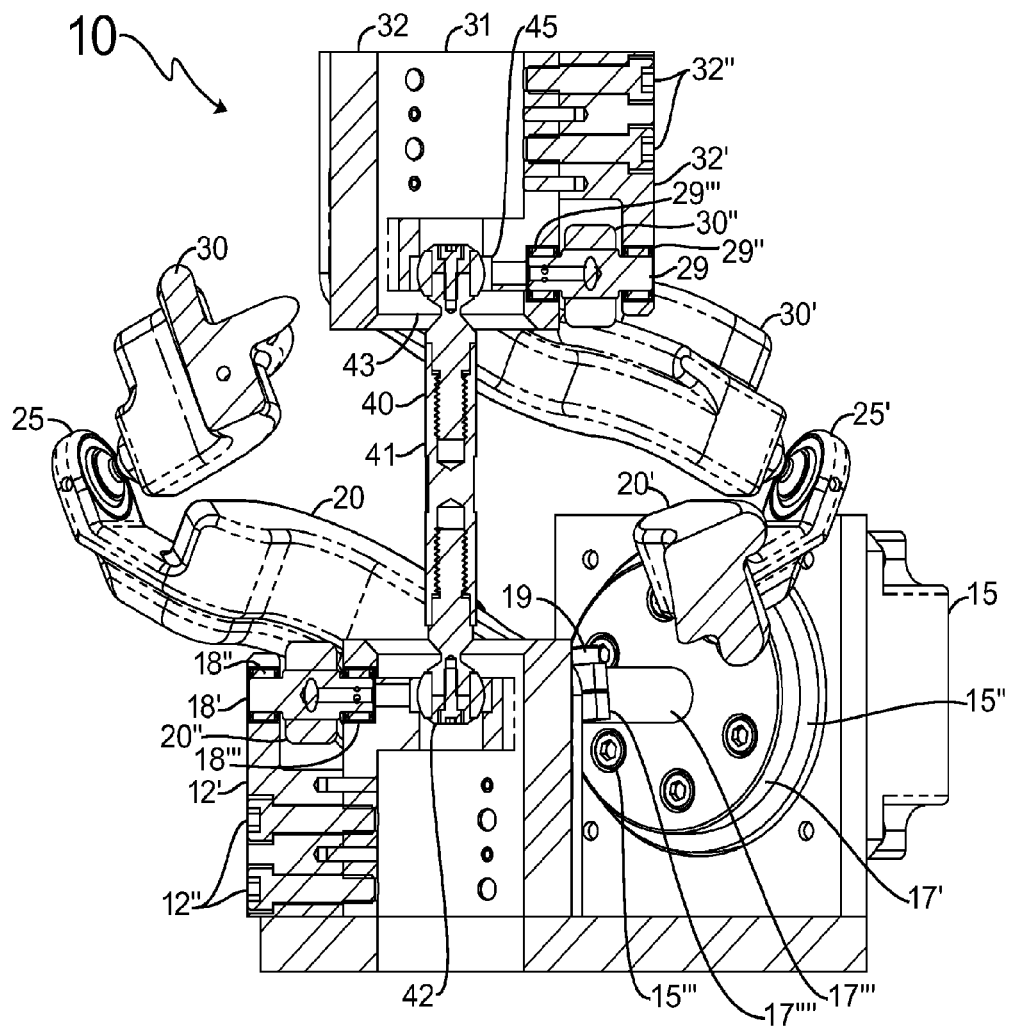
FIG. 5 shows a cross section view of the embodiment shown in FIGS. 1 through 3 as indicated in FIGS. 2 and 3.

Support 12 has an opening, 13, seen in the exploded view of manipulator 10 in FIG. 4, extending vertically in these figures along the extension axis of support 12 to parallel the outer six sides thereof including the outer curved sides thereof. Opening 13 extends through support 12 and from there through base 11, as the larger opening therein indicated above, along or parallel to the axis about which this base is capable, with the motor arrangement indicated above present therein, of rotating manipulator 10 which is typically perpendicular to the outer surface of that base. Support 12 has threaded openings therein symmetrically about opening 13 corresponding to screws 11' that are inserted through the smaller openings in base 11 to be screwed into these threaded support openings so that these screws fasten support 12 to base 11. Opening 13 extending through base portion 11 permits some desired means to extend therethrough such as electrical wiring, optical fibers, fluid conduit or some mechanical arrangement, or some combination thereof.

Also shown supported directly on base 11 is a pair of rotary actuator support pedestals, 14, each of which is shown supporting a rotary electric motor along with the direct mechanical interconnection between that electric motor and the remaining portions of manipulator 10. There are shown for each of pedestals 14 a plurality of screws, 14', with each screw inserted through a corresponding one of a plurality of smaller openings in base 11 at the desired locations of those pedestals on that base. Each of pedestals 14 has threaded openings therein corresponding to screws 14' that are inserted through these smaller openings in base 11 to be screwed into these threaded pedestal openings so that these screws fasten pedestals 14 to base portion 11.

Each of a pair of "pancake" type electric motors, 15 and 16, is mounted in a motor mounting opening in the corresponding one of pedestals 14 by the corresponding one of two pluralities of screws, 15' and 16'. These screws are inserted through a corresponding corner mounting opening in the mounting plates in the outer casings of these motors to be screwed into corresponding threaded smaller pedestal openings peripheral to the motor mounting opening in a pedestal so that these screws fasten the associated motor to the corresponding one of pedestals 14.

Each of electric motors 15 and 16 has a motor revolutions output disk, 15" and 16", respectively, to each of which there is fastened by a corresponding one of two pluralities of screws, 15''' and 16''', respectively, a corresponding one of two rotary output transferors, 17. A first rotary transferor 17 is fastened to electric motor 15, and includes a mating disk, 17', affixed to one end of a shaft, 17", which extends from there to a shaft slotted opening arrangement, 17''', at the opposite end thereof.

Arrangement 17''' comprises a double slotted shaft wall with the two slots beginning at, and extending inwardly from, the end of shaft 17". One of these slots is seen as a short line in FIG. 1 extending along shaft 17" away from a crank arm, 17"", as a further part of transferor 17, and in which the shaft is positioned. These slots are positioned in the shaft wall across from one another along shaft diameters, and are also positioned about a circular opening in that end of the shaft, extending inwardly therefrom, that is coaxial with the shaft central axis extending along the shaft length. Mating disk 17' on the one end of shaft 17" is fastened to output disk 15" by screws 15'" that are inserted through corresponding peripheral openings in the mating disk to be screwed into corresponding threaded disk openings in output disk 15" as indicated above. Shaft 17", at the opposite end thereof, mates to the further portion of transferor 17 in having shaft slotted opening arrangement 17'" affixedly positioned in an opening near one end of crank arm 17"" as part of this transferor.

The wall of this crank arm about this crank arm opening has a slot in it following an extension of a radius of that opening in extending between the opening and the outside of the arm, and also extending along the central length axis of the arm. This slot is shown in the cross section view of in FIG. 5 at the end of crank arm 17"" visible there. This crank arm slot is positioned directly across from one of the slots in the shaft wall of shaft 17". The upper portion of the wall of the crank arm about this crank arm opening, above the crank arm slot, has a threaded securing opening extending through it positioned radially to the crank arm opening. In addition, crank arm 17"" has a crank pin at the opposite end thereof extending parallel to shaft 17" but from the opposite side of the crank arm from the side thereof to which shaft 17" extends.

Figure 6:
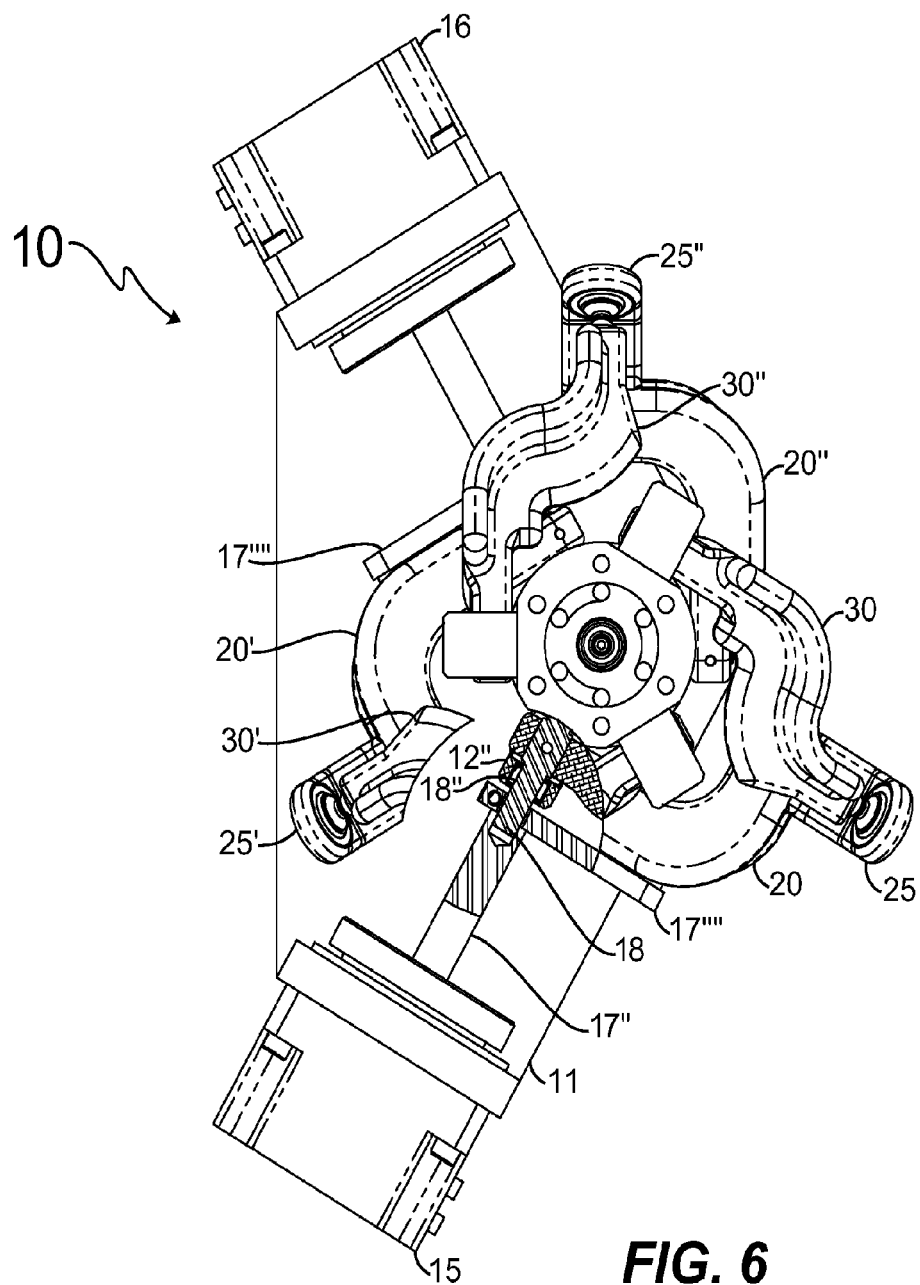
FIG. 6 shows a partial fragmentary view of the embodiment shown in FIGS. 1 through 3, FIGS. 7 and 8 show partial exploded views of the embodiment shown in FIGS. 1 through 3, FIGS. 9 and 10 show various further perspective views of the embodiment shown in FIGS. 1 through 3, FIGS. 11 and 12 show various further elevation views of the embodiment shown in FIGS. 1 through 3, FIGS. 13 and 14 show perspective and plan views of an alternative embodiment of the present invention.
Figure 7:
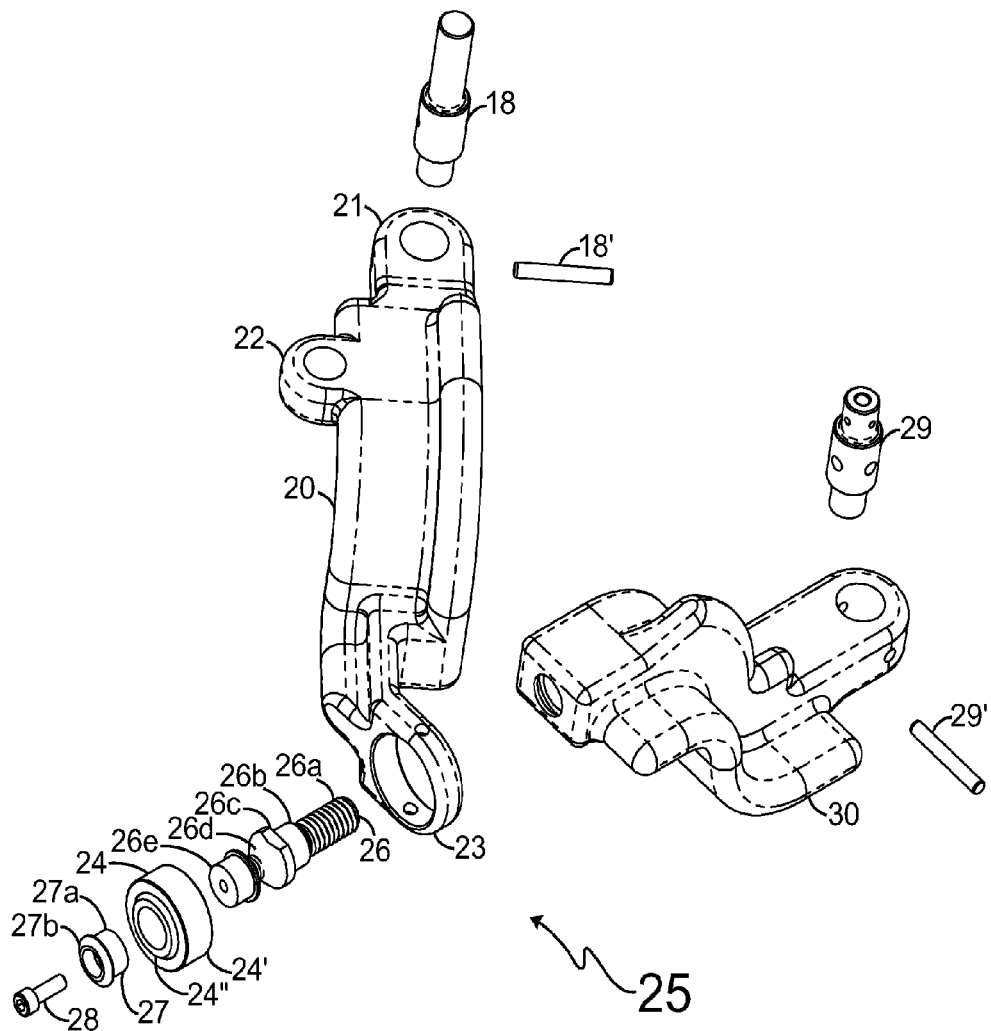
Figure 8:
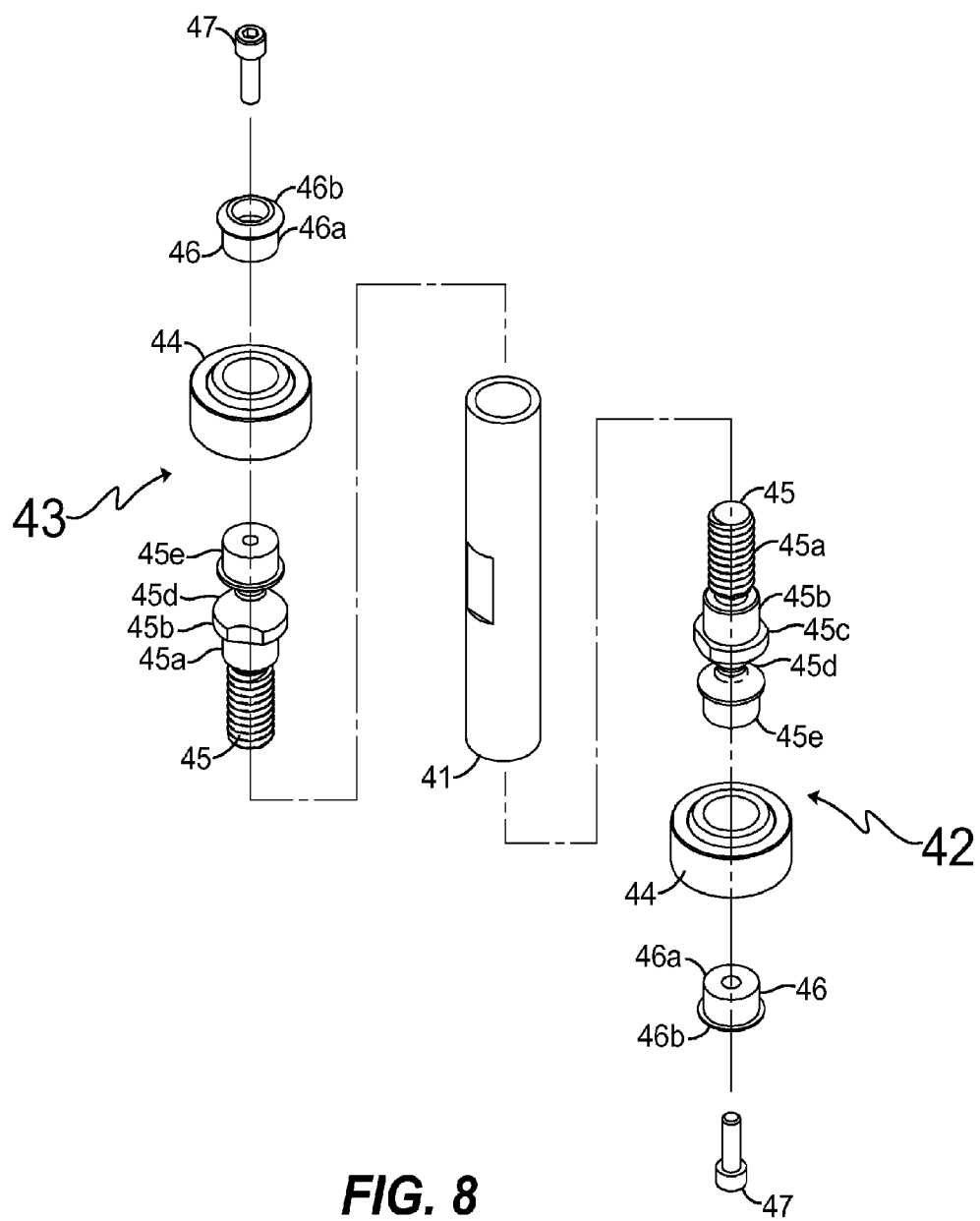

The coaxial opening in the end of shaft 17" in shaft slotted opening arrangement 17'" has an extended outer part of an outer bearing pin end of a base link pin, 18, positioned in it as can be seen in the fragmentary view of FIG. 6. This outer bearing pin end has the shape of a truncated cylinder with a smaller diameter than a cylindrical shaped central pin portion of the link pin at one end of which the outer bearing pin end is joined so as to have both share a common axis of rotational symmetry. The other end of the central pin portion is joined with an inner bearing pin end of base link pin 18 which also has the shape of a truncated cylinder with a smaller diameter than the cylindrical shaped central pin portion which are again joined so as to share a common axis of rotational symmetry. A pin capture opening extends through the through the central portion of base link pin 18 along a diameter thereof suited for receiving a base link capture pin, 18'.

The outer bearing pin end of base link pin 18 extends through the circular interior opening of a needle bearing, 18", positioned in the bearing reception opening in the spaced apart portion of a corresponding one of support brackets 12' so as to have this bearing against the adjacent end of the central portion of the pin. The inner bearing pin end of base link pin 18 extends through the circular interior opening of another needle bearing, 18'", not seen in many of these views, but positioned in a bearing reception opening of a truncated cylindrical shape in the same flat side of base 12 to which this support bracket 12' is fastened, and so as to have this bearing against the other end of the central portion of base link pin 18. The extended outer part of the outer bearing pin end that extends past bearing 18" is the part positioned in the coaxial opening in the end of shaft 17" as described above, and this part is secured there by a securing screw, 19, positioned in the securing opening in crank arm 17"". Screw 19 is screwed in there so as to squeeze the slotted wall portions of crank arm 17"" on opposite sides of the slot there, and to also squeeze the double slotted wall portions of shaft 17" on the opposite sides of the slots there, toward one another so these portions squeeze the extended outer part of the outer bearing pin end of base link pin 18 to keep the shaft and arm positioned about this link pin part so that they can all be rotated about the pin 18 common axis of rotational symmetry extending through the outer bearing pin end.

The central portion of base link pin 18 between the inner and outer bearing pin ends thereof is connected to a base pivoting link, 20, in being positioned in a circular base link opening at one end, 21, of this link such that the axis of symmetry of both the pin and the opening coincide. Two wall capture openings are across from one another in the wall portion of pivoting link 20 about this base link opening along a diameter of that opening, and are on a common axis with the pin capture opening through the central portion of base link pin 18. Base link capture pin 18' is thus positioned with its pin capture opening between the two wall capture openings of link 20 with capture pin 18' positioned in all of these openings to secure base link pin 18 in pivoting link 20 extending through the base link opening thereof. This connection arrangement allows link 20 to rotate with respect to base 12 and the corresponding support bracket 12' about the pin 18 common axis of rotational symmetry extending through the inner and outer bearing pin ends thereof.

Crank arm 17"" is also directly affixed to pivoting link 20 by its crank pin that is press fitted into a circular opening in a link boss, 22, extending from the mounting arrangement side of link 20. Link 20 extends generally in length from its base link opening along a plane in a straight line over an initial length portion, curves in the plane inwardly into an intermediate straight line portion for a shorter distance along the plane, and then curves in the plane in the opposite direction in a final length portion that is parallel to the initial length portion thereof. The link boss thereof extends from the initial length portion, and has the circular opening in it with an axis of symmetry that parallels the axis of symmetry of the base link opening in pivoting link 20 to receive the crankpin therein. Rotation by the rotor in electric motor 15 clockwise or counterclockwise causes shaft 17" to rotate in a corresponding angular direction which in turn causes crank arm 17"" and so link 20 to correspondingly rotate about the axis of rotational symmetry of the outer bearing pin end of base link pin 18 (common also to the central and inner pin portions) that is more or less perpendicular to the length of link 20.

A similar electric motor rotational drive system for forcing rotational motion of another pivoting link is provided in connection with electric motor 16. As seen in FIGS. 1 through 6, the other of the two rotary transferors 17 is connected to motor revolutions output disk 16" of motor 16 by a plurality of screws 16'" through corresponding mating disk 17' which is again affixed to one end of a corresponding shaft 17". That shaft again extends from there to another shaft slotted opening arrangement 17'" at the opposite end thereof that positioned the opening of a corresponding crank arm 17"". The crank arm pin of this crank arm 17"" is again connected to a similar further pivoting link, 20', near an end, 21', thereof by being press fitted into an opening in a link boss, 22' extending from the mounting arrangement side thereof. Link 20' is also rotatably connected by another base link pin 18 through needle bearings 18" and 18'" to base support 12 and the corresponding support bracket 12', as above for motor 15, to thereby be rotatable about the axis of rotational symmetry of the outer bearing pin end of base link pin 18 (common also to the central and inner pin portions).

The transferor part designations are the same for this second transferor 17 as they were for the parts in the transferor used with motor 15, and the parts designations for link 20' are the same as for link 20 with the addition of a prime mark thereafter. Thus, here too, rotation of the rotor of electric motor 16 in either the clockwise or counterclockwise direction forces pivoting link 20' to correspondingly rotate in either a clockwise or counterclockwise direction just as motor 15 can rotate pivoting link 20.

Pivoting links 20 and 20' are two in a plurality of base portion side pivoting links in manipulator 10, or lower side pivoting links in the figures, this plurality further including another similar pivoting link, 20". This pivoting link, although not connected to another motor, is also capable of being rotated about a rotation axis extending through the length of another base link pin, 18"", extending through an opening at an end, 21", of the link connecting this link through needle bearings to base support 12 and the corresponding support bracket 12' as above for links 20 and 20' as seen in the cross section view in FIG. 5. There, base link pin 18"" again has a central portion between inner and outer bearing pin ends thereof that is positioned in a base link opening at one end of base pivoting link 20. The inner bearing pin end of base link pin 18"" is in the interior circular opening in needle bearing 18'" positioned in an opening in base support 12, and the outer bearing pin end is in the interior circular opening in needle bearing 18" positioned in the corresponding one of support brackets 12' as above for links 20 and 20'. Base link 18"" differs from base link pins 18 in not having an extended part to its outer bearing pin end for positioning in a transferor shaft as do base link pins 18. The needle bearing designations for the bearings supporting pin 18"" are the same as they were for the bearings supporting pins 18.

Pivoting links 20, 20' and 20" each have a stiffening rib along most of the length thereof located on the side opposite the side thereof from which its link boss protrudes. The parts designations for link 20" are the same as for links 20 and 20' with the addition, or substitution, of a double prime mark thereafter, and, due to the omission of any connected forcing motor for link 20", a link boss, 22", in link 20" is not used and could be omitted.

The base portion side, or lower, pivoting links 20, 20' and 20", in addition to each having a corresponding one of link ends 21, 21' and 21" that are rotatably connected to the shell wall about opening 13 in base support 12 by base link pins in the base link opening provided at each such end, also have, at opposite ends thereof, 23, 23' and 23", respectively, a spherical section capture opening. Each of these spherical section capture openings has an axis of rotational symmetry that extends in a direction perpendicular to the direction of the symmetry axis of the base link opening in that link, and also extends at approximately half a right angle (plus or minus 10 degrees) to the general direction of extent of the link. This angle, or other relatively similar angles, for the plane in which the wall about the spherical section capture opening extends, relative to the general length extent direction of that link are selected to aid in assuring that the link end successfully clears other manipulator structures during positionings of the manipulator that cause the link to be at lateral, or even downward extremes, from the extension axis of base support 12.

A ball portion and socket structure, 24, has an outer ring, 24', with an inner surface shape about an inner opening following the shape of a portion of a basis geometrical construct spherical surface, that captures, in this outer ring inner opening, an inner ring, 24", which inner ring has an outer surface shape also following the shape of a portion of the basis geometrical spherical surface. Thus, inner ring 24" can be directed to have pitch, yaw and rotation motions with respect to outer ring 24'. Outer ring 24' has a cylindrically shaped outer surface that is press fitted into the spherical section capture opening in end 23 of lower pivoting link 20. Alternatively, the spherical section capture opening in end 23 of lower pivoting link 20 can have an inward directed ring extension at one side of the opening that one side of outer ring 24' is positioned against, with the other side of this outer ring having a retaining ring holding the outer ring in its position.

Inner ring 24" has a pair of parallel circularly edged flat sides each also parallel to a great circle between them of the basis geometrical spherical surface, and so are each perpendicular to a spherical radius of that basis spherical surface. Thus, the inner ring partial spherical outer surface shape follows the truncated portion of the basis spherical surface resulting from the absence of the surface portions corresponding to the basis spherical surface outside of the remaining basis spherical surface portion coincident to the ring segment outer surface between the two parallel circularly edged sides forming the flat sides of that ring segment. A cylindrically shaped inner opening extends between these parallel sides of inner ring 24" with an axis of symmetry coincident with the axis of symmetry of this ring segment. This inner ring provides a portion of the ball captured in outer ring 24' serving as a socket and, with this socket being positioned in the spherical section capture opening at end 23 of lower pivoting link 20, this link in effect becomes an extended socket for the joint. Inner ring 24", with further joint components to be described, together form the complete ball for a ball-and-socket joint, or spherical joint, 25, between lower pivoting link 20 and an upper pivoting link, to be further described below, that is fastened to the ball.

A cylindrically shaped link joint post, 26, is threaded at one end, 26a, and has a "shoulder bolt" like structure at the opposite end with a cylindrically shaped unthreaded portion, 26b, on a common post axis extending from the threaded portion to a "nut" portion, 26c, having parallel opposite sides joined to a flared back outer surface. This "nut" portion has a "neck" portion, 26d, extending along the common post axis from its flared back outer surface to a ring holding stud, 26e. Stud 26e has a ball surface portion thereof, or partial spherical surface, facing that "nut" portion across neck portion 26d. This ball surface portion follows a substantial portion of the surface of the basis sphere absented in inner ring 24" as the means to form the side of a more complete ball in joint 25 that will face the upper pivoting link that will be further described below. Neck portion 26d by which ring holding stud 26e extends from "nut" portion 26c has a much smaller diameter in extending along the common post axis than the lateral extents of either the flared back surface of "nut" portion 26c or the ball surface portion of ring holding stud 26e to thereby cover a relatively small part of either of these surfaces.

The ball surface, or partial spherical surface, of holding stud 26e ends in a circularly edged flat or planar surface, perpendicular to the common post axis through the neck from the "nut" portion, to thereby form a solid polar portion of a sphere defined by the ball surface portion and the flat surface. The stud ball surface portion is such as to mate with the ring partial spherical outer surface of inner ring 24" when the remainder of the stud past this flat surface is assembled into the open interior of this segment. This assembly substantially completes the ball for the socket in joint 25 on the side thereof that will face the upper pivoting link to be further described. The smallness of the areas of covered by of the flared back surface of "nut" portion 26c and the ball surface portion of ring holding stud 26e covered by neck portion 26d permits large yaw and pitch motions of the part of the ball before interference with nearby structure limits such motions.

The remainder of stud 26e past this surface is a cylindrical solid extending from this polar sphere segment flat surface along the common post axis, and has a smaller diameter than the diameter of the circularly edged flat surface end of the stud ball surface portion. Thus, at that edge of the circularly edged flat surface where the ball surface portion ends, there is a small inward lip formed in the flat surface resulting from the cylindrical solid being of a smaller diameter in extending from the flat surface along the common post axis. This holding stud cylinder portion extends to a circular flat surface on the holding stud side opposite the partial spherical surface side thereof. This circular flat surface side of holding stud 26e has a threaded opening therein extending into the holding stud along the common post axis.

In spherical joint 25, post 26 is fastened to inner ring 24" by having ring holding stud 26e positioned in a corresponding interior opening in that ring. A spherical portion joining cap, 27, has a cylinder portion, 27a, much like that of holding stud 26e with a flat circular end surface side also, but this cylinder portion is instead inserted into the interior opening in inner ring 24" from the side of that ring opposite the stud in the joint 25 assembly. Cylinder portion 27a is positioned in that interior opening with its flat circular end surface side closely adjacent to or against the circular flat surface side of the holding stud 26e. The common post axis through the circular flat surface side of holding stud 26e coincides with the axis of symmetry of the flat circular end surface side of cylinder portion 27a that is also part of the common cap axis.

The opposite side of joining cap 27, at the other end of cylinder portion 27a, is again a spherical segment portion, 27b, much like inner ring 24" but much thinner between its two circularly edged parallel surfaces. Spherical segment portion 27b has its axis of symmetry coinciding with, and part of, the common cap axis. The spherical shaped outer segment surface of this cap also mates at an end thereof with the ring partial spherical outer surface of inner ring 24" when cylinder portion 27a is assembled in the open interior thereof to thereby add to the spherical surface of the ball in spherical joint 25. Here, too, in cap 27 there is a lip where cylinder portion 27a joins the larger of the two circularly edged parallel surfaces of spherical segment portion 27b of this cap because of the cylinder portion having a smaller diameter than the diameter of that surface. There is a circular opening provided through cap 27 along the common cap axis.

Spherical joint 25 is then an assembly in which inner ring 24" has the cylindrical internal opening thereof partially filled from one side by ring holding stud 26e with the remainder of this opening filled from the other by cylinder portion 27a. Each has a flat circular surface end against that of the other within this interior opening in inner ring 24". These two surfaces are held against one another, and maintained so, by a screw, 28, that is positioned in the opening in cap 27 to be screwed into the threaded opening in holding stud 26e. This joint, as a spherical joint, has three degrees of freedom in allowing pitch, yaw and roll rotations of joint post 26 with respect to link 20.

The other two lower pivoting links 20' and 20" are also, at ends 23' and 23" thereof, respectively, each part of a corresponding one of ball-and-socket, or spherical, joints, 25' and 25", respectively. Joints 25' and 25" are similar to joint 25, and the parts designations for joints 25' and 25" are the same as for joint 25 with the addition, or substitution, of, correspondingly, a single or double prime mark thereafter.

Three rotation connection sets, each having a manipulator link pin, 29, shaped like pin 18'''', a capture pin, 29', and a corresponding pair of needle bearings, 29" and 29''', are each provided with a corresponding one of a plurality of manipulator side pivoting links, 30, 30' and 30", or upper side pivoting links in the figures, and with each of such links extending from a corresponding one of spherical joints 25, 25' and 25". Each of the sets rotatably connects the pinned end of a corresponding one of links 30, 30' and 30" through the bearings to a corresponding bearing reception opening in the shell wall about an opening, 31, in a manipulable support, 32, and to a corresponding bearing reception opening through a corresponding one of three manipulator support brackets, 32'. Each bracket is fastened in a contact portion thereof to a corresponding one of three substantially flat sides each between two rounded corner sides forming together the six sides of manipulable support 32 (a flat being every other one of these six sides) by a corresponding one of three pairs of screws, 32", that extend through corresponding openings in the contact portions of these brackets to be screwed into threaded openings in those manipuable support flat sides.

The outer bearing pin end of manipulator link pin 29 extends through the circular interior opening of a needle bearing, 29", positioned in the bearing reception opening in a spaced apart portion of a corresponding one of support brackets 32' so as to have this bearing against the adjacent end of the central portion of the pin. The inner bearing pin end of manipulator link pin 29 extends through the circular interior opening of another needle bearing, 29''', not seen in these views, but positioned in a bearing reception opening of a truncated cylindrical shape in the same flat side of manipuable support 32 to which this support bracket 32' is fastened, and so as to have this bearing against the other end of the central portion of manipulator link pin 29.

The central portion of manipulator link pin 29 between the inner and outer bearing pin ends thereof is connected to manipulator pivoting link 30 in being positioned in a circular manipulator link opening at the pinned end thereof such that the axis of symmetry of both the pin and the opening coincide. A pin capture opening extends through the through the central portion of manipulator link pin 29 along a diameter thereof suited for receiving manipulator link capture pin 29'. Two wall capture openings are across from one another in the wall portion of pivoting link 30 about this manipulator link opening along a diameter of that opening, and are on a common axis with the pin capture opening through the central portion of manipulator link pin 29. Manipulator link capture pin 29' is thus positioned with its pin capture opening between the two wall capture openings of link 30 with capture pin 29' positioned in all of these openings to secure manipulator link pin 29 in pivoting link 30 extending through the manipulator link opening thereof. This connection arrangement allows link 30 to rotate with respect to manipulable support 32 and the corresponding support bracket 32' about the pin 29 common axis of rotational symmetry extending through the inner and outer bearing pin ends thereof. The other two upper pivoting links 30' and 30" are also configured similarly and rotatably connected to manipuable support 32 in the same manner.

Upper pivoting link 30 extends from spherical joint 25 through having a threaded post opening in the spherical joint end of this link, extending parallel to the general length of the adjacent portion thereof, and into which is screwed threaded end 26a of joint post 26. As described above, post 26 extends from joint inner ring 24" held in outer ring 24' which is captured in the spherical section capture opening at end 23 of lower pivoting link 20 serving as a socket. The angle, or other relatively similar angles, for the plane in which the wall about the spherical section capture opening is included, relative to the lower link 20 general length direction, and the joint link end of link 30, are selected not only to aid in clearances, as stated above, but also to aid links 20 and 30 in achieving a large range of relative rotation positions with respect to one another. The other two upper pivoting links 30' and 30" are also configured similarly and each extends in the same manner from a corresponding one of ball-and-socket, or spherical, joints 25' and 25", respectively.

Link 30 extends generally in length from its post opening in its spherical joint end along a plane in a straight line over an initial length portion, curves in the plane outwardly into an intermediate straight line portion for a shorter distance along the plane, and then curves in the plane in the opposite direction in a final length portion to its pinned end with the final length portion thereof being parallel to the initial length portion thereof. Link 30 has a stiffening ridge along much of its extent on the side thereof facing away from base 11. With manipulable support 32 positioned directly over base support 12 so that the axes of symmetry of openings 13 and 31 coincide, pin 29 rotatably connects the pinned end of upper link 30 to manipulable support 32 at its shell wall on the opposite side of these coinciding axes at which lower link 20 is rotatably connected to base support 12. The other two upper pivoting links 30' and 30" are also configured similarly and each is correspondingly positioned in a similar manner.

Manipulable support 32 is also supported by a tiltable and rotatable column structure, 40, with respect to base support 12 insofar as maintaining a separation therebetween. Column structure 40 has a cylindrical shell, 41, forming a ball-and-socket, or spherical, joint, 42, at one end thereof together with base support 12 in opening 13 thereof, and forming a ball-and-socket, or spherical joint, 43, at the other end thereof together with manipulable support 32 in opening 31 thereof. As seen in the exploded view of FIG. 8, spherical joints 42 and 43 are like spherical joints 25, 25' and 25" except, instead of the spherical section capture openings at ends 23, 23' and 23" of lower pivoting links 20, 20' and 20", there is a base spherical section capture opening formed in opening 13 in the upper portion of base support 12 for joint 42, and another spherical section capture opening formed in opening 31 in the lower portion of manipulable support 32 for joint 43. Each of these openings holds a ball portion and socket structure, 44, having an outer ring, 44', press fitted into the opening against a narrowed portion of the opening, and having therein an inner ring, 44". Also, there are joint posts, 45, for both joints each having its threaded end, 45a, screwed into the corresponding internally threaded end of cylindrical shell 41. Each of these posts again has a "shoulder bolt" like structure with an unthreaded cylindrical portion, 45b, and a "nut" portion, 45c, and next a "neck" portion, 45d, extending to a ring holding stud, 45e.

In spherical joints 42 and 43, posts 45 are fastened to inner ring 44" by having ring holding stud 45e positioned in a corresponding interior opening in that ring. A spherical portion joining cap, 46, has a cylinder portion, 46a, inserted into the interior opening in inner ring 44" from the side of that ring opposite the stud in the joint assembly with its flat circular end surface side closely adjacent to or against the circular flat surface side of the holding stud 45e.

The opposite side of joining cap 46 is again a spherical segment portion, 46b, that mates at an end thereof with the ring partial spherical outer surface of inner ring 44" when cylinder portion 46a is assembled in the open interior thereof to thereby add to the spherical surface of the ball in the spherical joint. There is a circular opening provided through cap 46 along the common cap axis. Stud 45e and cap 46 are held closely adjacent to or against one another, and maintained so, by a screw, 47, that is positioned in the opening in cap 46 to be screwed into the threaded opening in holding stud 45e.

Joints 42 and 43, as spherical joints, each have three degrees of freedom in allowing pitch, yaw and roll rotations of joint post 45 with respect to base support 12 and manipulable support 32, respectively. Thus, rotations of lower pivoting links 20 and 20', caused by motors 15 and 16 being directed to rotate their motor revolutions output disks to result in corresponding selected positionings of lower link 20" and upper links 30, 30' and 30", and so of manipulable support 32, are accompanied by rotations of column structure 40 in base 12 and rotations of manipulable support 32 on column structure 40 that, in general, do not limit the rotational positions selected for manipulable support 32.

Figure 9:
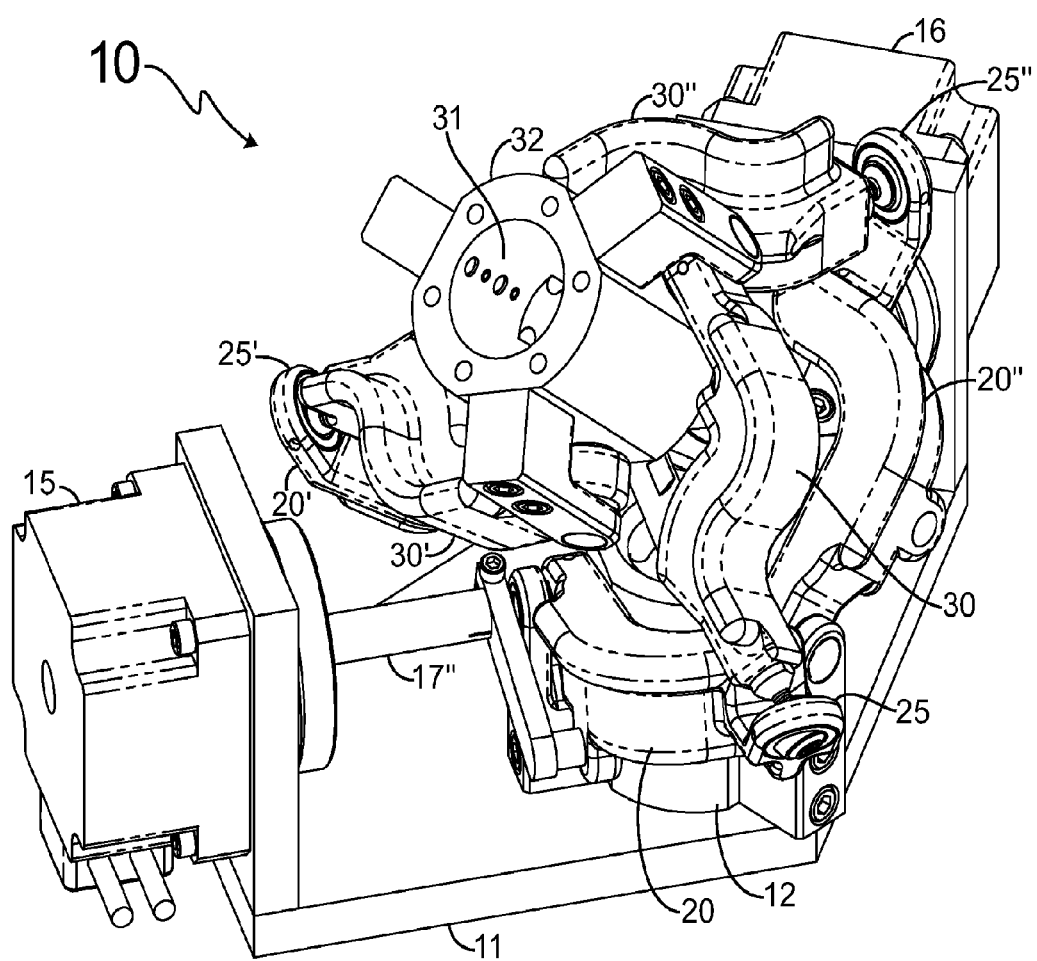
Figure 10:
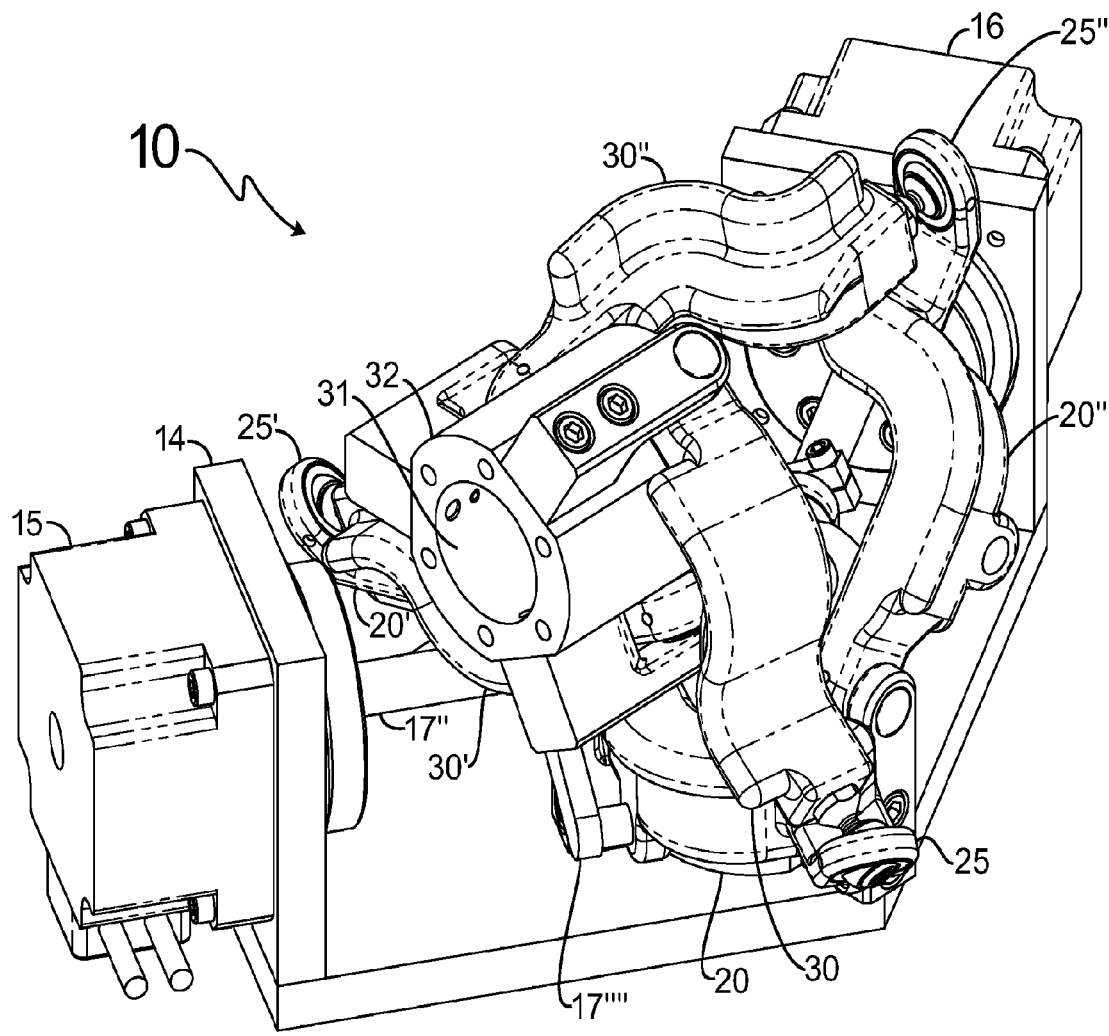
Figure 11:
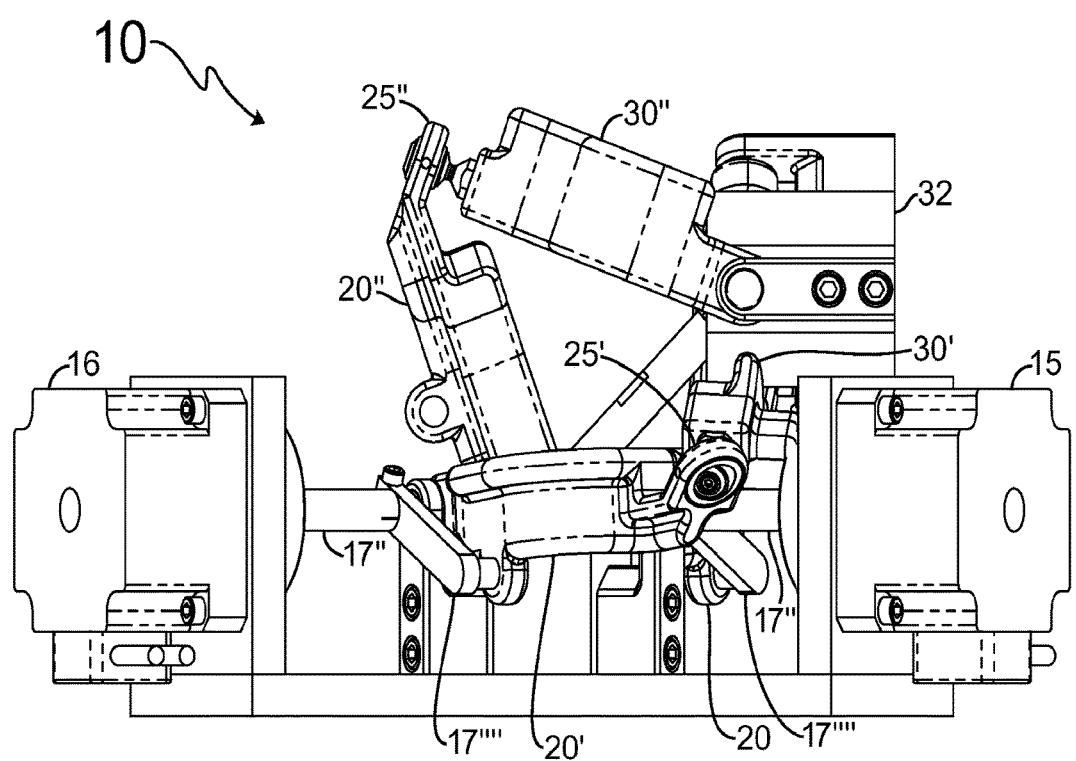
Figure 12:
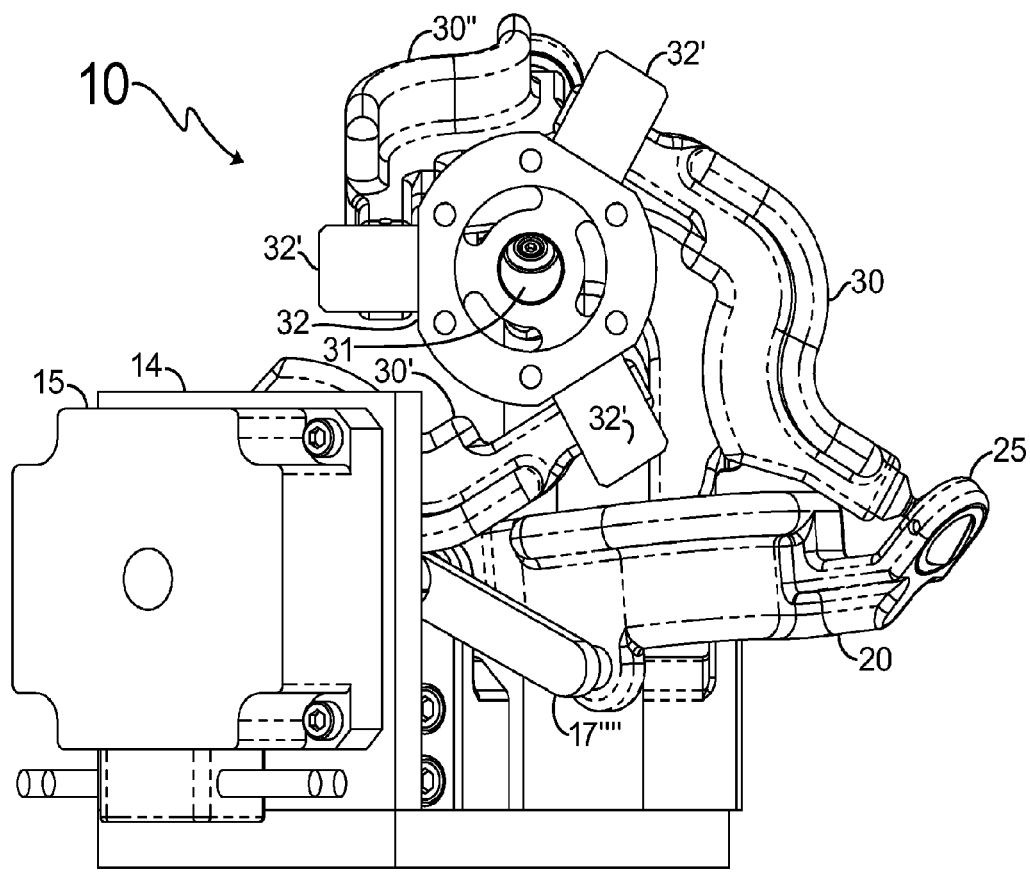

FIGS. 9 through 12 illustrate two selected positionings of manipulable support 32 with FIG. 9 showing in a perspective view support 32 located approximately half way to an extreme lateral position from the position taken when the axes of symmetry of openings 13 and 31 coincide. FIG. 10 provides a similar perspective view with manipulable support 32 located at an extreme position away from the position taken when the axes of symmetry of openings 13 and 31 coincide. FIGS. 11 and 12 provide alternative elevation views of manipulator 10 with manipulable support 32 in this extreme position.

Figure 13:
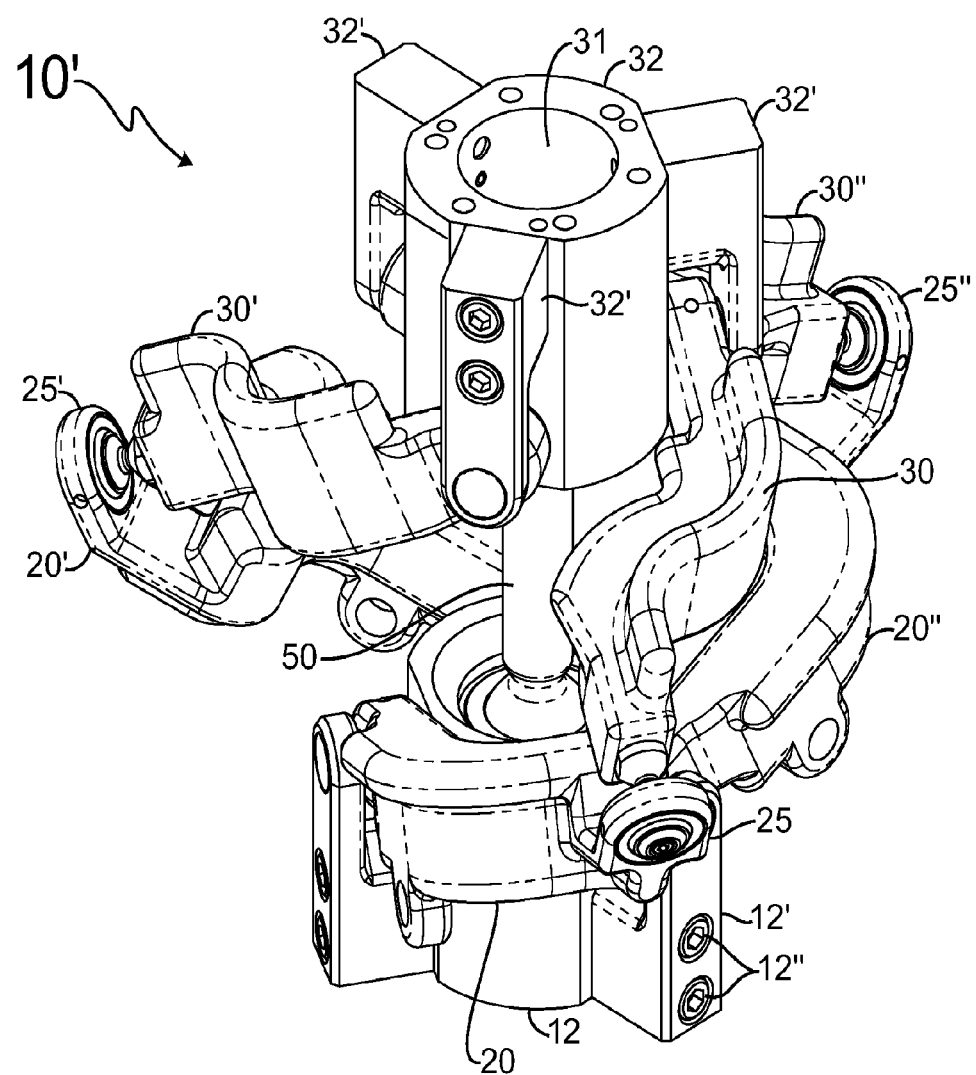
Figure 14:
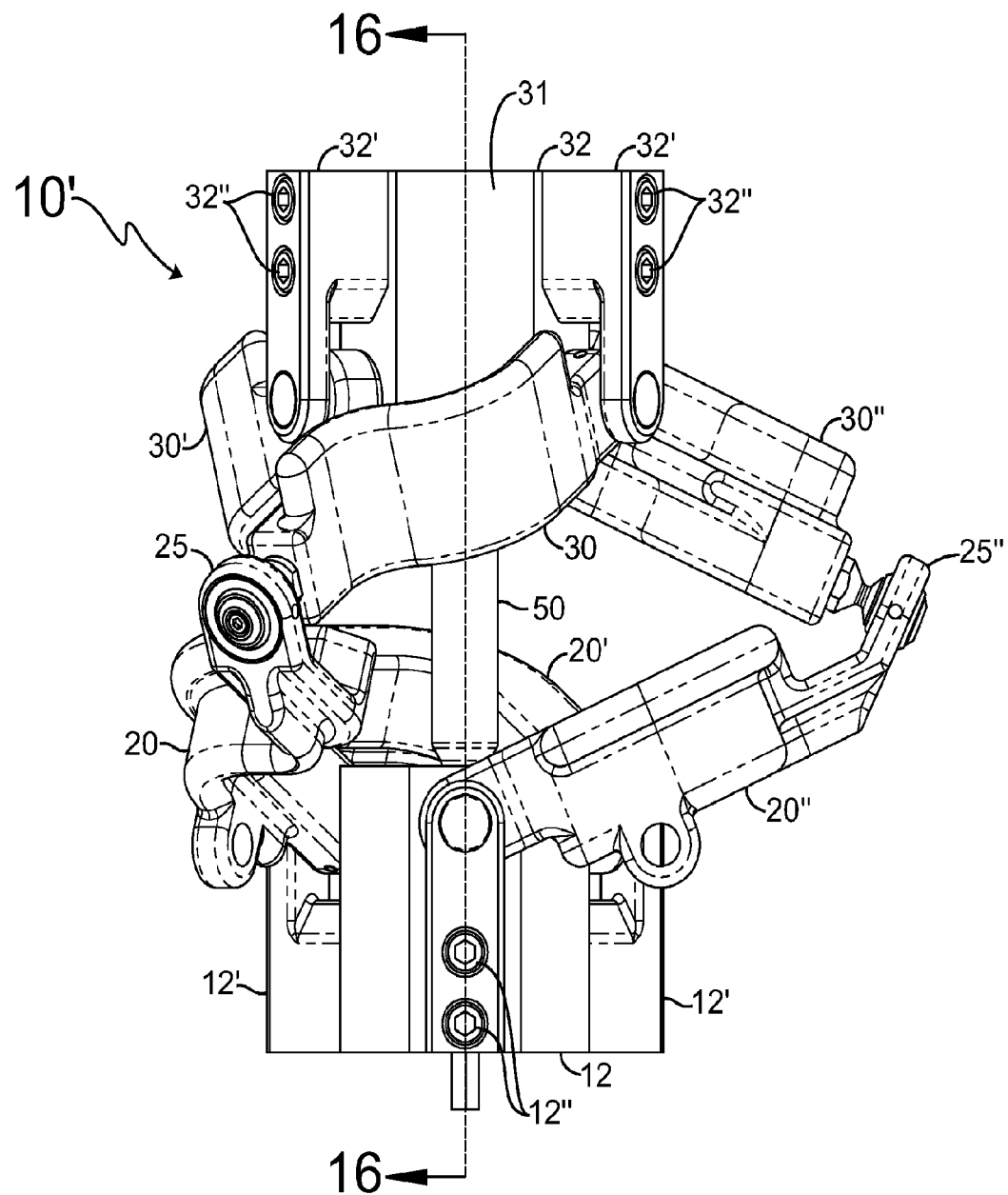
Figure 15:
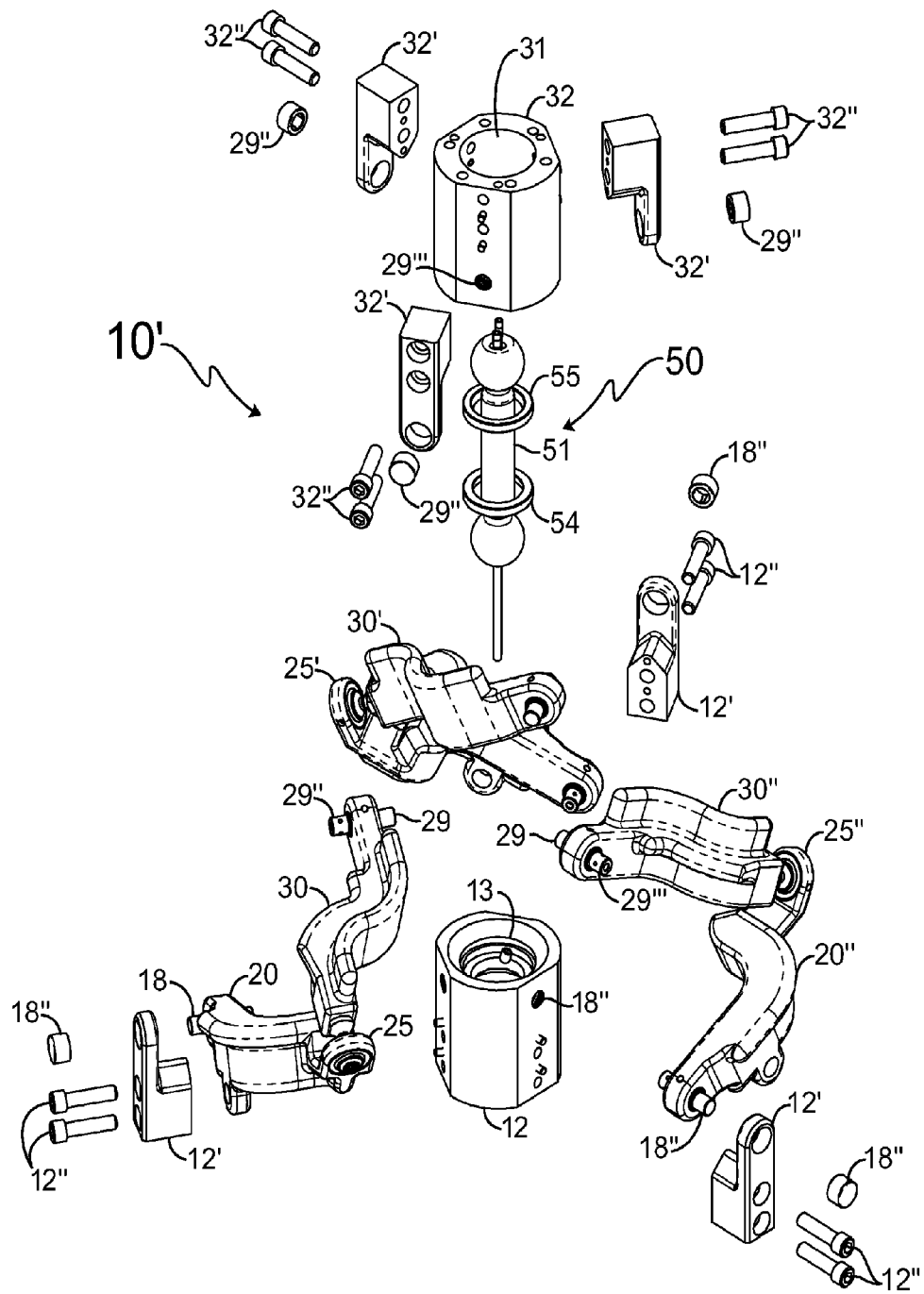
FIG. 15 shows an exploded view of the embodiment shown in FIGS. 13 and 14.
Figure 16:
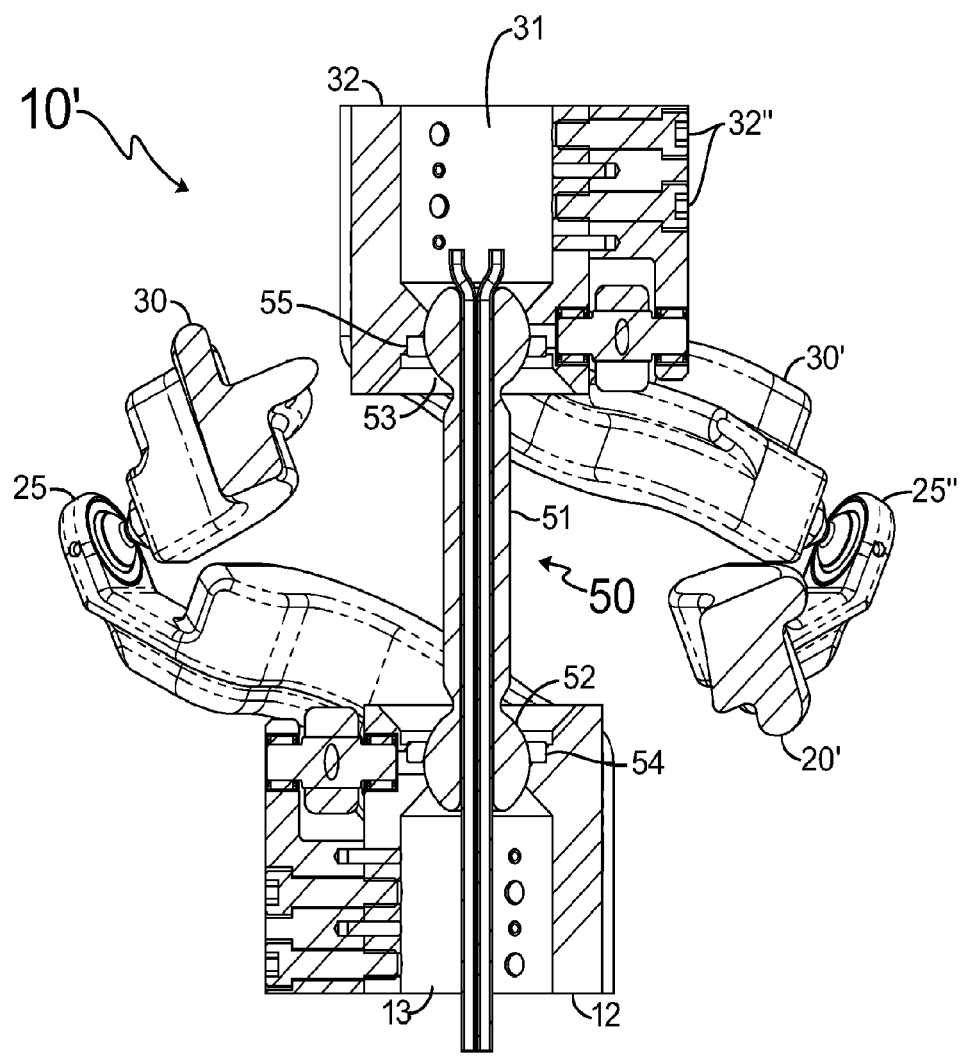
FIG. 16 shows a cross section view of the embodiment shown in FIGS. 13 and 14, FIGS. 17 and 18 show perspective and plan views of a further alternative embodiment of the present invention.

FIGS. 13 through 16 show an alternative embodiment for column structure 40 in manipulator 10 of the embodiment shown in FIGS. 1 through 12. This alternative manipulator, 10', has instead a column structure, 50, that has greater lateral dimensions than that of column structure 40 to thereby accommodate a larger lateral dimension interior opening. FIGS. 13 and 14 provide perspective and side views of manipulator 10' with, in addition, there being an exploded view in FIG. 15 and a cross section view in FIG. 16. Base 11, motors 15 and 16, and their corresponding transferors 17 have been omitted in these figures as they are unchanged from their configurations shown in connection with manipulator 10. Other components similar to those in manipulator 10 retain the same numerical designations in FIGS. 13 through 16 as they had in connection with manipulator 10 in FIGS. 1 through 12.

Column structure 50 has therein an integrated cylindrical shell and sphere structure, 51, with an enlarged interior opening through the cylindrical shell portion to thereby accommodate selected conduits extending therethrough such as the insulated electrical conductors shown. Cylindrical shell and sphere structure 51 has integral spherical-like structures formed at each end thereof with each such spherical structure having a corresponding cylindrical interior opening therein thereby extending the interior opening of the shell portion again to allow selected conduits to extend through cylindrical shell and sphere structure 51. The integral spherical structure closest to base 11 is part of a corresponding ball-and-socket, or spherical, joint, 52, formed in slightly modified opening 13 (compared to opening 13 in manipulator 10) to have base support 12 serving as a socket, and the other integral spherical structure forms a ball-and-socket, or spherical, joint, 53, formed in slightly modified opening 31 (compared to opening 31 in manipulator 10) to have manipulable support 32 serving as a socket.

Base support 12 has a narrowing of opening 13 therein with an interior surface portion having a shape following a coinciding segment of a corresponding joint basis geometrical construct spherical surface between two flat segment sides each on a common side of, and parallel to, a great circle in the corresponding joint basis geometrical spherical surface. The ball portion of cylindrical shell and sphere structure 51 in joint 52 is positioned against this interior surface of the narrowed portion of opening 13 (except for any surface lubricating films that may be used to reduce friction therebetween). This ball is retained there by a ring, 54, press fitted into a corresponding opening in base support 12 adjacent this narrowed opening interior surface. This retention ring, has its interior surface positioned against the ball (again, except for any surface lubricating films that may be used to reduce friction therebetween). This retention ring interior opening has this interior surface portion thereof with a shape following a segment of the joint basis spherical surface between two flat sides parallel to, and on the opposite side of, the aforementioned great circle in the joint basis geometrical spherical surface.

Similarly, manipulable support 32 has a narrowing of opening 31 therein with an interior surface portion having a shape following a coinciding segment of a corresponding joint basis geometrical spherical surface between two flat segment sides each on a common side of, and parallel to, a great circle in the corresponding joint basis geometrical spherical surface. The ball portion of cylindrical shell and sphere structure 51 in joint 53 is positioned against this interior surface of the narrowed portion of opening 31 (except for any surface lubricating films that may be used to reduce friction therebetween). This ball is retained there by a ring, 55, press fitted into a corresponding opening in manipulable support 32 adjacent this narrowed opening interior surface. This retention ring, has its interior surface positioned against the ball (again, except for any surface lubricating films that may be used to reduce friction therebetween). This retention ring interior opening has this interior surface portion thereof with a shape following a segment of the joint basis spherical surface between two flat sides parallel to, and on the opposite side of, the aforementioned great circle in the joint basis geometrical spherical surface.

Again, rotations of lower pivoting links 20 and 20', caused by motors 15 and 16 being directed to rotate their motor revolutions output disks, results in corresponding selected positionings of manipulable support 32. These positionings of manipulable support 32 are accompanied by rotations of column structure 50 in base 12 and rotations of manipulable support 32 in column structure 50 that, in general, do not limit the rotational positions selected for manipulable support 32 at least if any conduits present therein are sufficiently flexible.

Figure 17:
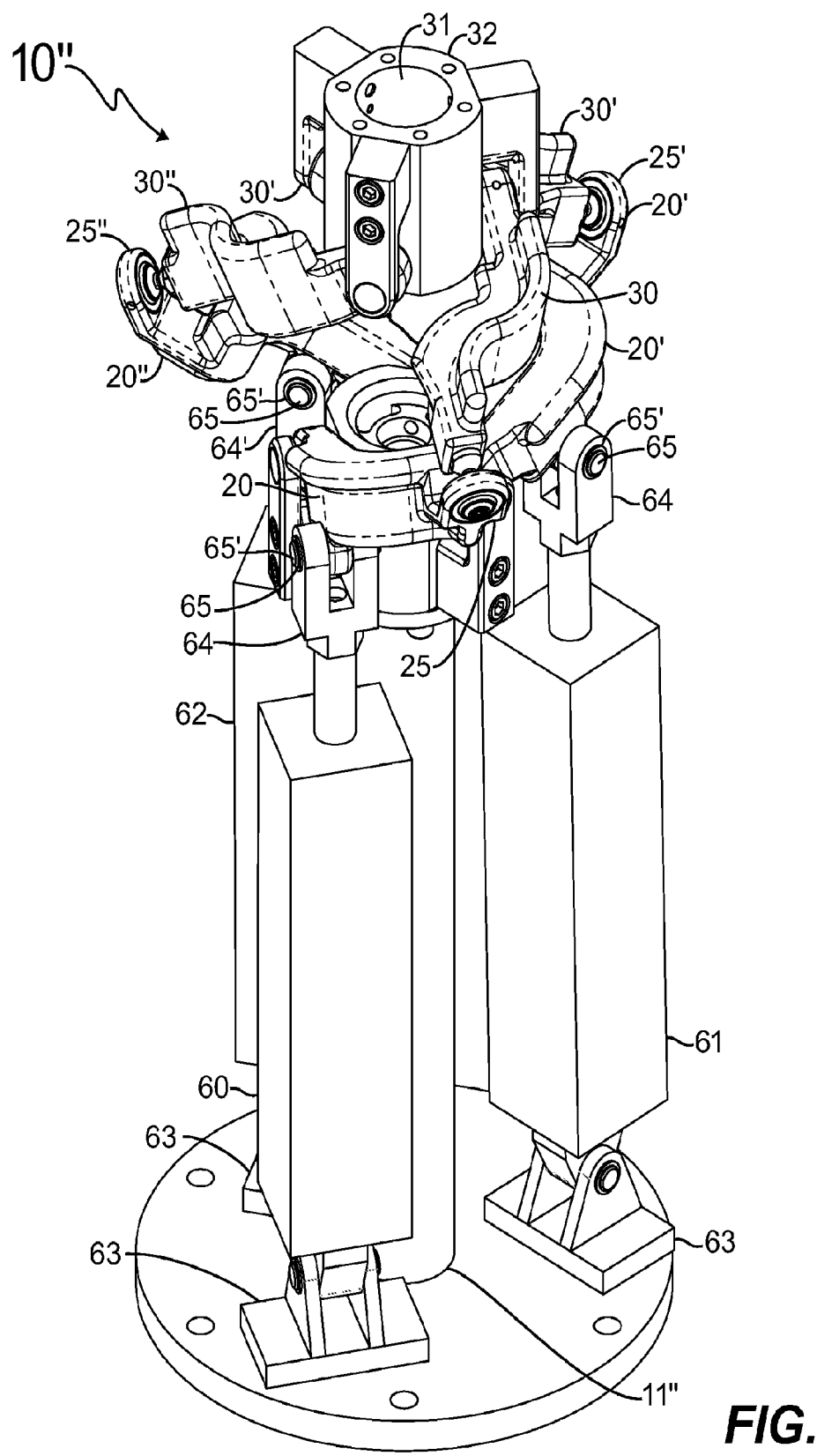
Figure 18:
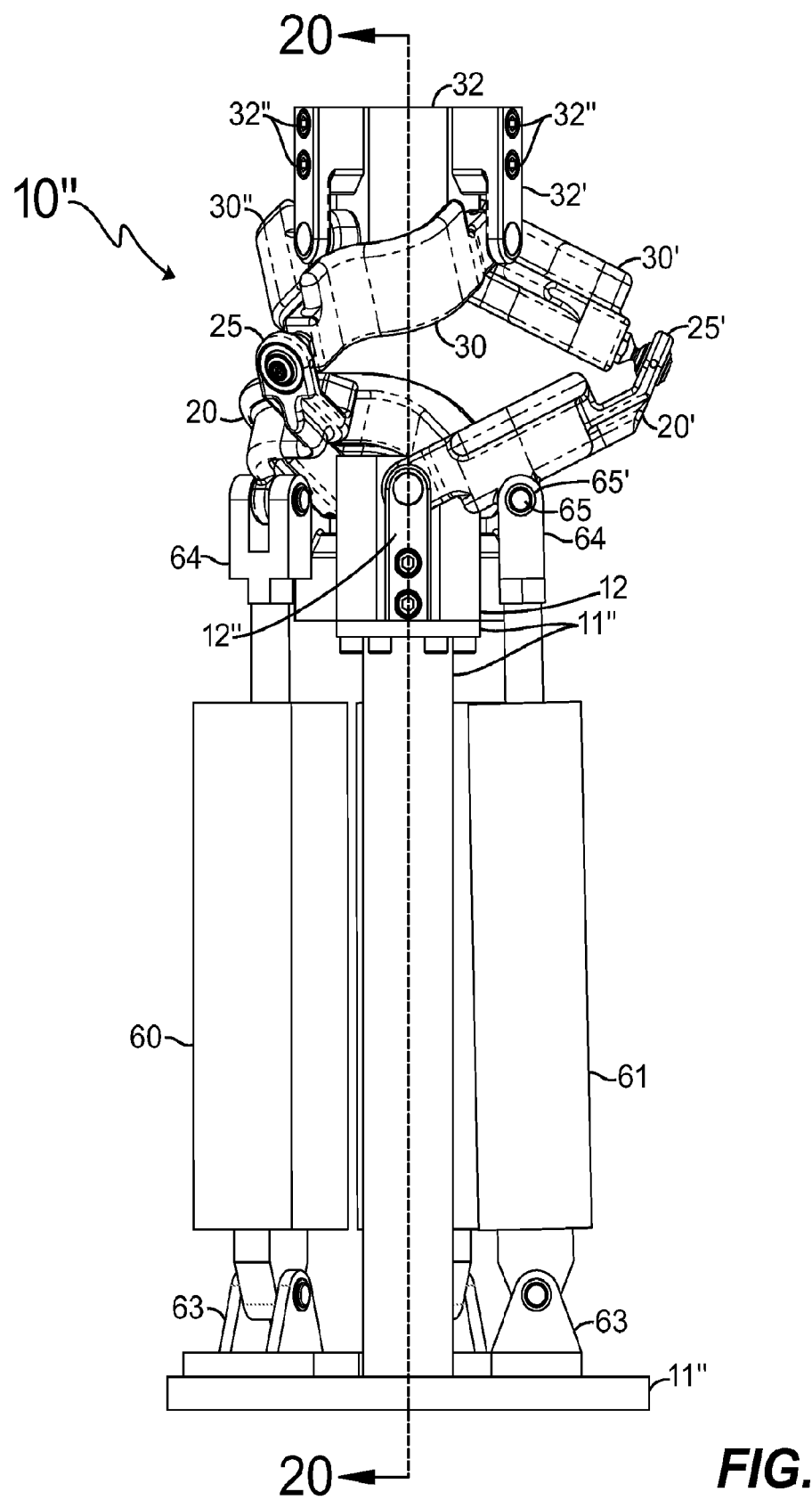
Figure 19:
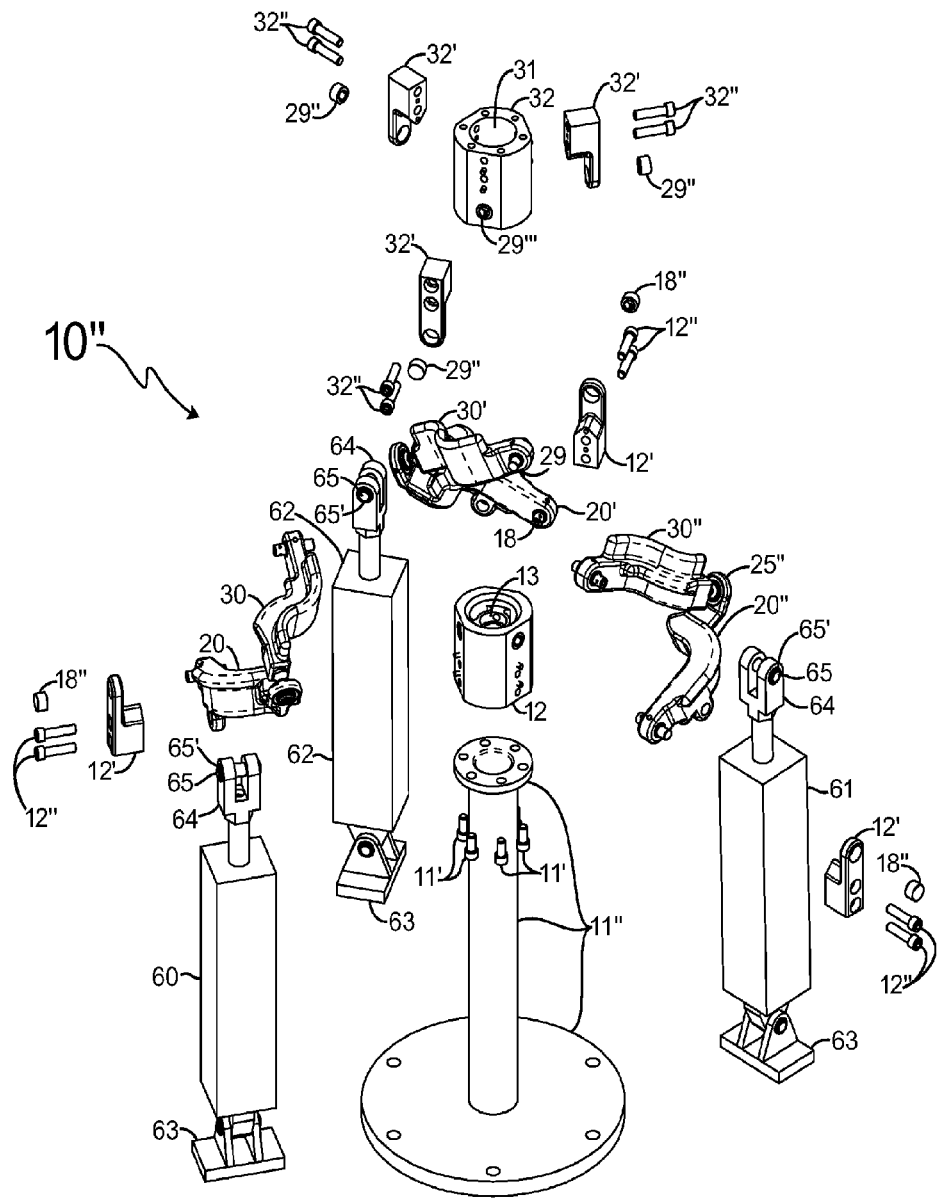
FIG. 19 shows an exploded view of the embodiment shown in FIGS. 17 and 18.
Figure 20:
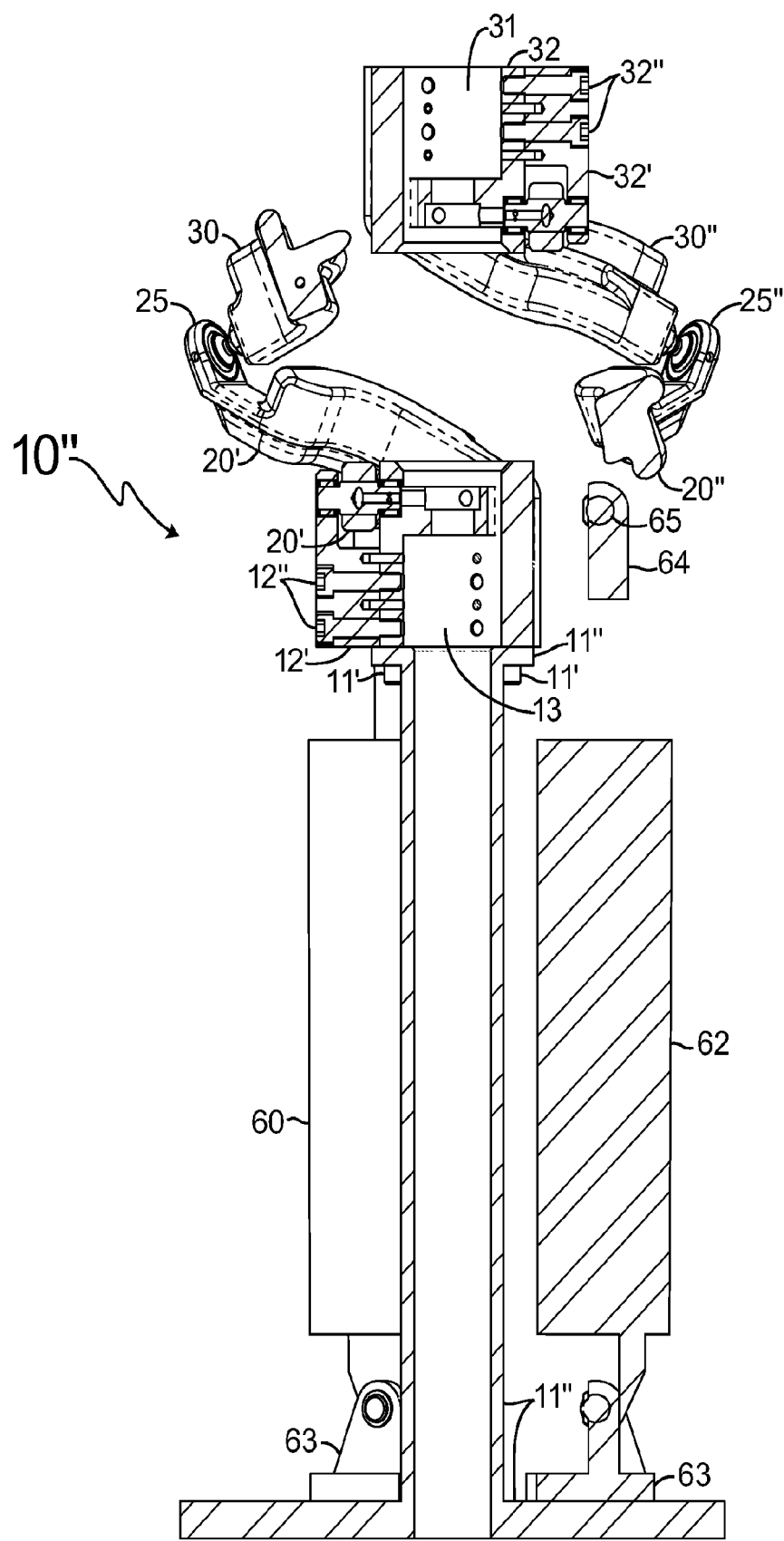
FIG. 20 shows a cross section view of the embodiment shown in FIGS. 17 and 18, FIGS. 21 and 22 show perspective views of an alternative embodiment to the embodiment of the invention shown in FIGS. 17 through 20.

FIGS. 17 through 20 show another alternative embodiment for motors 15 and 16, and their corresponding transferors 17, in manipulator 10 of the embodiment shown in FIGS. 1 through 12. This alternative manipulator, 10", has instead a modified shape base structure, 11", with a circular plate base supporting a cylindrical shell column shown integrally connected thereto (though could be fastened) that supports, in turn, a column platform as a laterally broadened extension of the column structure. In place of motors 15 and 16, there are provided three linear actuators, 60, 61 and 62, each rotatably held in a shackle, 63, that is affixed to the circular base plate in base structure 11". FIGS. 17 and 18 provide perspective and side views of manipulator 10" with, in addition, there being an exploded view in FIG. 19 and a cross section view in FIG. 20. Components similar to those in manipulator 10 retain the same numerical designations in FIGS. 17 through 20 as they had in connection with manipulator 10 in FIGS. 1 through 12.

The integral cylindrical shell column of base structure 11' has a length sufficient to accommodate the opposite ends of linear actuators 60, 61 and 62 each being rotatably connected to a corresponding one of lower pivoting links 20, 20' and 20". These opposite ends of the actuators each have a "U-shaped" yoke, 64, each with a pair of spaced apart sides having a bearing reception opening at the outer ends of each of those sides. Each of three pins, 65, is press fitted into a corresponding one of the openings in link bosses 22, 22' and 22" in lower pivoting links 20, 20' and 20", and then has the two opposite bearing ends thereof each positioned in a corresponding one of a pair of needle bearings, 65', each positioned in a corresponding one of the bearing reception openings of a corresponding yoke 64.

Thus, extensions and retractions of the corresponding one of output yokes 64 by linear actuators 60, 61 and 62 forces the corresponding one of lower pivoting links 20, 20' and 20" in manipulator 10" to correspondingly rotate in either a clockwise or counterclockwise direction to selectively position manipuable support 32 just as motors 15 and 16 in manipulator 10 can force rotation of pivoting links 20 and 20'. However, manipulable support 32 can further be extended and retracted in radial directions by concerted extensions and retractions of the output yokes 64 by linear actuators 60, 61 and 62. Such a capability can be provided for manipulators 10 and 10' also by eliminating column structures 40 and 50, respectively, and adding a third motor and transferor to operate lower pivoting link 20".

Figure 21:
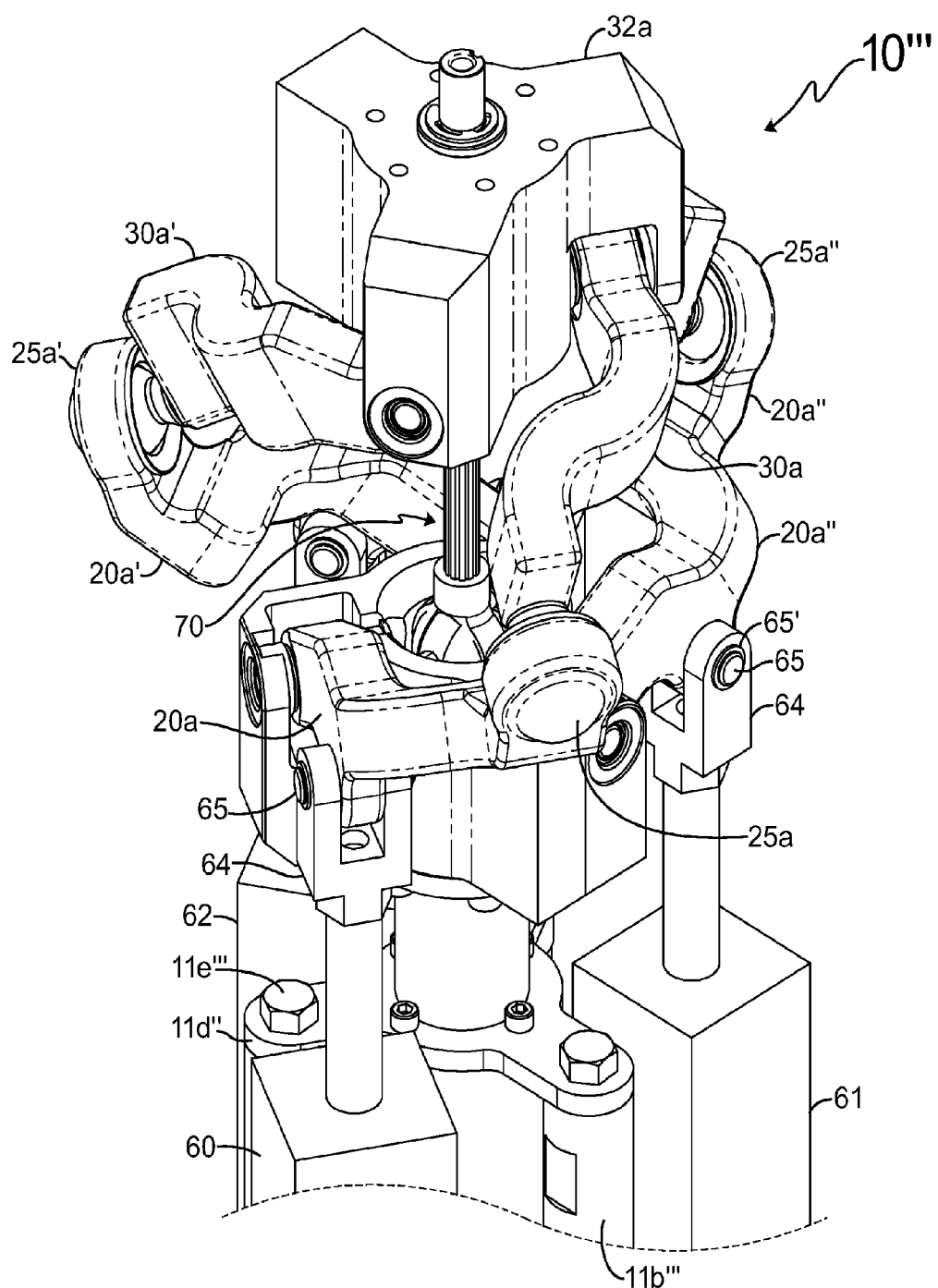

FIGS. 21 through 32 show a rigidified version of manipulator 10" to thereby provide an alternative robotic manipulator, 10''', seen first in the perspective view of FIG. 21, that maintains more rigidity against applications of some external mechanical loads on its output manipulable support at various different positions thereof, i.e. is a mechanically "stiffer" or less compliant mechanism. The changes for improving structural and mechanism rigidification begin from the manipulator base and continue through the manipulable support.

Figure 22:
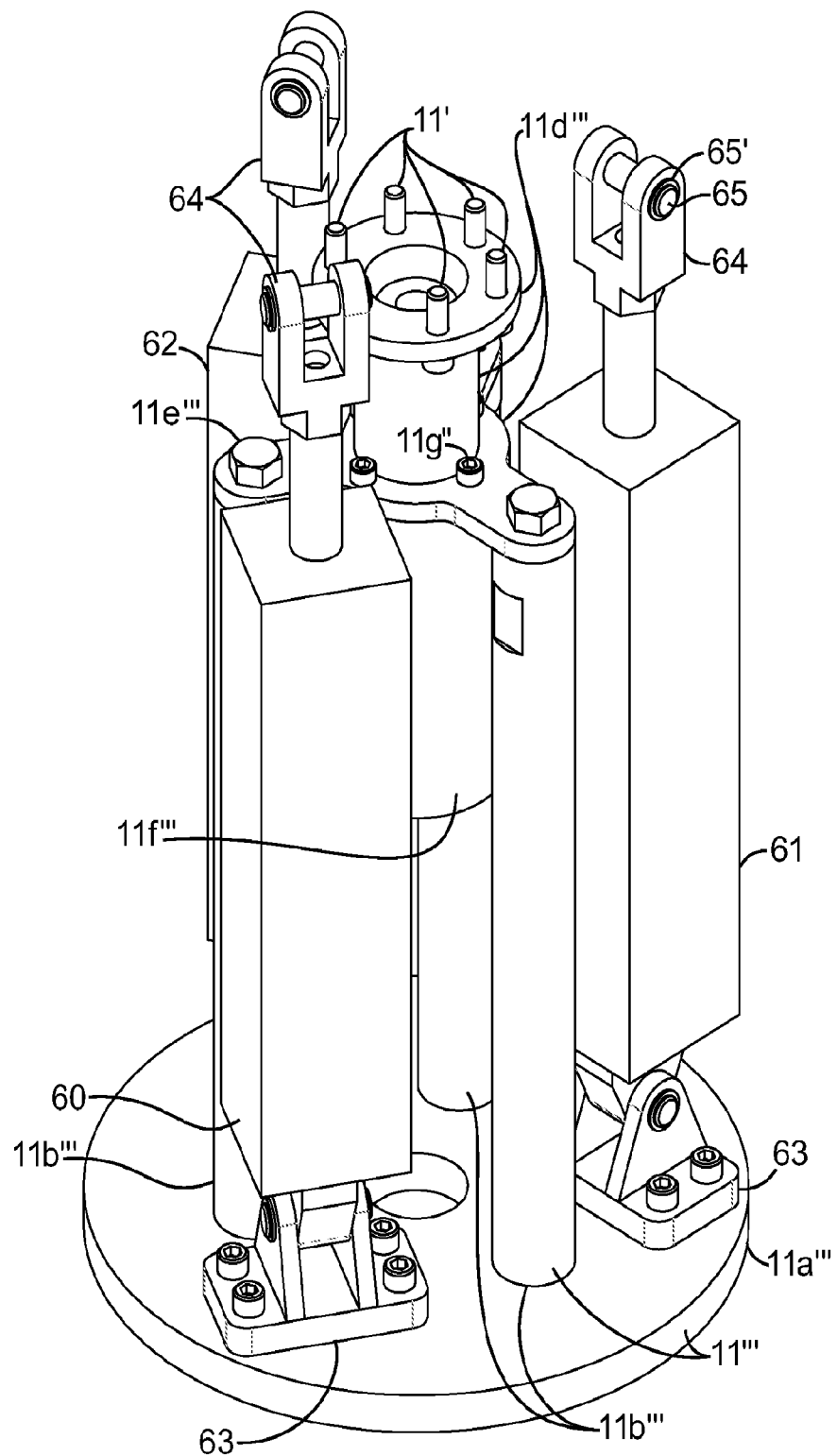
Figure 23:
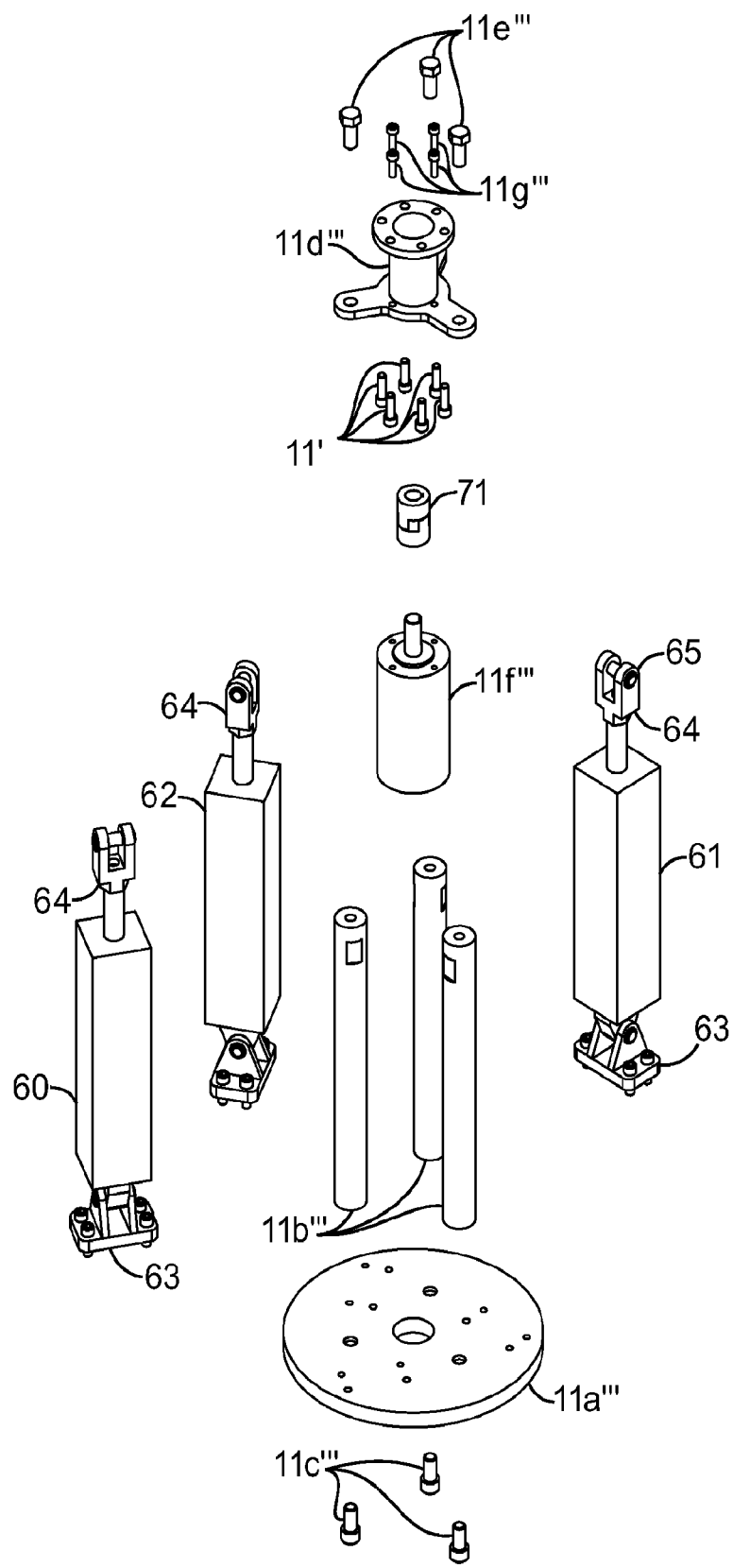
FIG. 23 shows an exploded view of the embodiment shown in FIG. 22.
Figure 24:
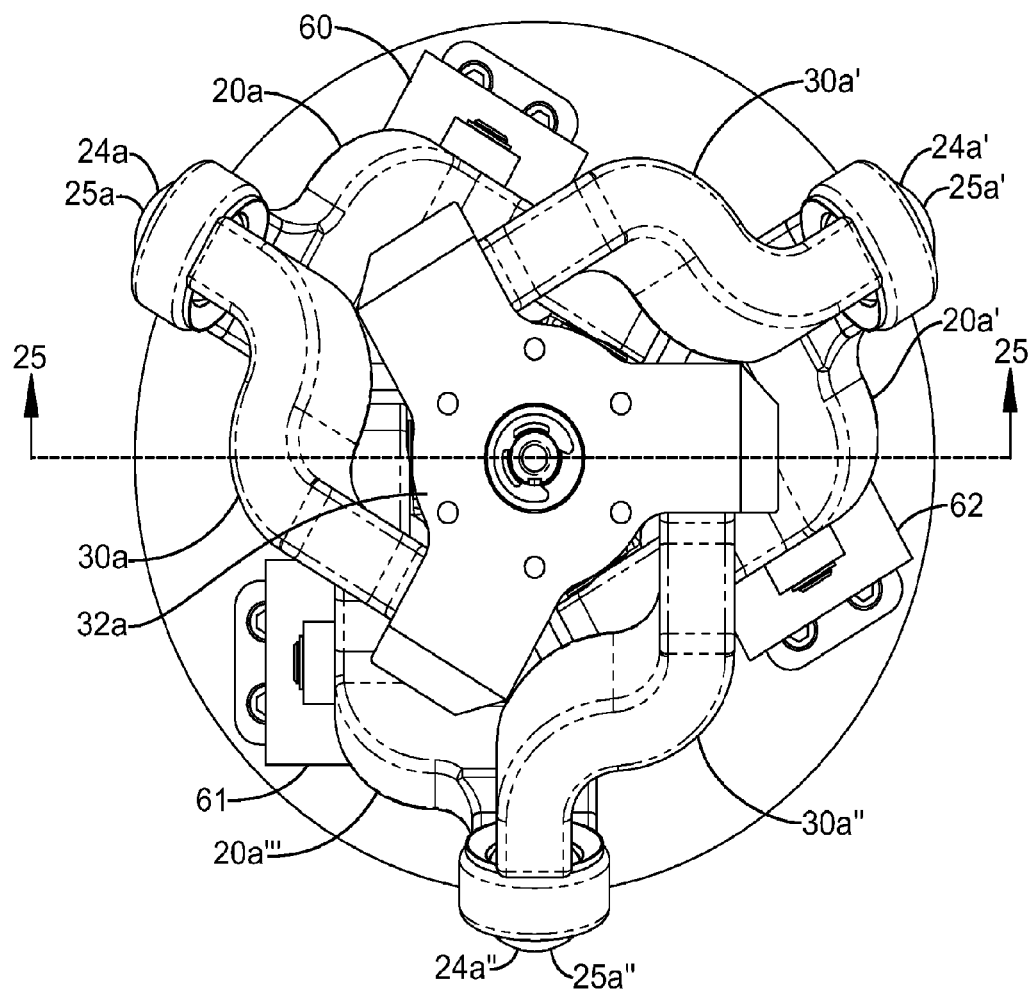
FIG. 24 shows a plan view of the embodiment shown in FIGS. 21 and 22.

Rather than the modified shape base structure 11" having a circular plate base supporting an integral cylindrical shell column that supports, in turn, a column platform in the column structure of manipulator 10" of FIGS. 17 through 20, manipulator 10''' has a further modified base structure, 11'''. This base structure uses a circular base plate, 11a''', to support three cylindrical columns, 11b''', each provided 120° from the others along a circle centered about a circular opening in the base plate, and fastened there by a corresponding one of three screws, 11c''', each extending through a corresponding opening in the base plate into a threaded opening in an end of a corresponding column extending parallel to the axis of symmetry of that column as seen in FIGS. 22 and 23.

The opposite ends of cylindrical columns 11b''' are fastened to a triangular-to-cylindrical conversion support, 11d''', having a column joining plate therein with a joining disk having a centered first circular opening, and further three arms extending outward from the disk. Each arm has a circular arm opening in the outward end thereof and each is located 120° from the others along a circle centered about the circular opening in the disk about which opening one end of a spacer cylindrical shell is affixed so as to be concentric therewith along a common axis of symmetry including its interior opening being similarly concentric. The opposite end of the cylindrical shell spacer is affixed to a circular outside shape manipulator base support disk plate having a concentric interior circular opening therein also concentric with the interior circular opening of the cylindrical shell spacer.

Each of the outward extending arms of the column joining plate has the arm opening at the end thereof across from a threaded opening in an end of a corresponding cylindrical column $11b'''$. Each threaded opening extends into the corresponding column parallel to the axis of symmetry of that column, and the adjacent arm opening has a corresponding one of three screws, $11e'''$, extending through it into the column threaded opening.

The disk portion of the column joining plate has four further circular motor openings therein each across from one other and also 90° from each of the others along a circle concentric with the first disk opening. These four latter openings match the threaded frame openings in a facing surface of the frame of a rotary electric motor, $11f'''$, that extend into the frame parallel to the motor output shaft. This motor has its output shaft extending through the first opening in the joining plate and further into the interior opening of the spacer cylindrical shell. Each of four screws, $11g'''$, extends through a corresponding one of each joining plate disk motor openings into a corresponding threaded frame opening to fasten electric motor $11f'''$ to the column joining plate of conversion support $11d'''$.

The manipulator base support disk plate at the opposite end of the cylindrical shell spacer in conversion support $11d'''$, having a circular outside shape, is fastened to a modified manipulator base support, $12a$. Six circular fastener openings are provided in this disk plate that are symmetrically positioned about the interior circular opening thereof and each is across from a corresponding threaded opening in a facing surface of manipulator base support $12a$. A corresponding one of screws $11'$ extends through each fastener opening in the disk plate into the corresponding threaded support opening. Conversion support $11d'''$ on the three spaced apart columns $11b'''$ in modified base structure $11'''$ supports manipulator base support $12a$ more rigidly against lateral forces applied to alternative robotic manipulator $10'''$ to the extent they are directed perpendicular to the common axis of symmetry of the portions of conversion support $11d'''$ than would base structure $11''$ in manipulator $10''$ subjected to similar forces.

The modifications in modified manipulator base support $12a$ in essence comprise forming base support brackets $12'$ integrally in manipulator base support $12$ of manipulators $10$, $10'$ and $10''$ to thereby provide rigidity along with a slightly modified opening, $13a$, therein as compared to openings $13$ in the previously described manipulators, in here just forming the support for liquid conduit combined with a ball-and-socket joint therein rather than have base support $12a$ effectively serve as the socket. Manipulator base support $12a$ has a basic cylindrical wall structure formed about opening $13a$ with interior structure in the opening walls to accommodate forming the ball-and-socket joint in the opening, and to allow the conduit or piping arrangement, including the ball portion of the joint, to extend through that opening as can be seen in the cross section view of FIG. 25. A portion of this piping arrangement can be rotated by motor $11f'''$ within opening $13a$ about a more or less centered axis around which at least a portion of the interior structure is shown to be symmetrical.

In addition, this basic cylindrical wall structure in support $12a$ has, on the outside thereof, three capture extensions, $12a'$, each at one of those locations thereon corresponding to the locations of support brackets $12'$ on support $12$ in the previously described manipulators. Each of these extensions has a support wall portion with a circular outer bushing or bearing opening therethrough, and has this support wall portion spaced apart from the outside of the basic cylindrical wall structure of the support through the presence of a void between the support wall portion and the basic cylindrical wall structure as seen in the exploded view of FIG. 26. This void opens to outside of the support on a side of that support opposite that side thereof facing modified base structure $11'''$ and to part of a side perpendicular to this first described side on the right if facing the support. This spacing void between the support wall portion and the outside of the basic cylindrical wall structure is shaped approximately as a circular sector plate with support $12a$ forming the circular arc-like side of the spacing void and radii-like sides thereof provided by the opening of this void to outside the support.

Opposite the circular outer bushing or bearing opening in each of the support wall portions of the three capture extensions $12a'$ is a circular inner bushing or bearing opening extending through the basic cylindrical wall structure of support $12a$ to open into support opening $13a$. From the side of support $12a$ opposite that facing modified base structure $11'''$, each of three slots, $12a'''$, extends through a corresponding capture extension support wall portion to a corresponding one of the circular outer bushing or bearing openings and parallels a radius thereof, but extends perpendicular to this radius from the spacing void only partway through this support wall to leave at least some support wall portion all around the outer bushing or bearing opening. Similarly, each of three slots, $12a^{iv}$, extends through a corresponding portion of the basic cylindrical wall structure of support $12a$, all the way between the spacing void and opening $13a$, to a corresponding one of the circular inner bushing or bearing openings, and parallels a radius thereof as well as also being directly across from a corresponding one of slots $12a'''$ to both be along a common slot axis. In this manipulator example, bushings will used rather than bearings as in the previously described manipulator examples, and so the openings therefor will be termed bushing openings.

Pairs of capture bushings comprising an outer bushing, $18a''$, and an inner bushing, $18a''''$, are provided in the circular outer and inner bushing openings associated with each of capture extensions $12a'$. Thus, a corresponding one of three outer bushings $18a''$ is held in the circular outer bushing opening of each extension support wall portion $12a'$ by a corresponding one of three collared sleeves, $18a^{iv}$, and a corresponding one of three inner bushings $18a'''$ is held in each of the circular inner bushing openings through the basic cylindrical wall structure across from the corresponding outer opening by a corresponding one of three collared sleeves, $18a^v$. These bushings, however, are so positioned only after each of capture bushing pairs has between them a corresponding one of three lower pivoting links, $20a$, $20a'$ and $20a''$, at corresponding link ends thereof, $21a$, $21a'$ and $21a''$, so as to have each of these ends in a corresponding spacing void provided by capture extensions $12a'$ of support $12a$.

This capture is accomplished by positioning one of a pair of trunnions, $21aa$, shaped as outside and inside truncated cylinders and extending outward on opposite sides of link 20a at end 21a thereof, in a corresponding one of the circular outer bushing openings in its capture extension support wall portion through the slot 12a''' providing access to this opening. Concurrently, the remaining one of the pair of trunnions 21aa is positioned in the circular inner bushing opening in the basic cylindrical wall structure of support 12a across from this outer opening through the slot 12a$^{iv}$ providing access to this inner opening. Thereafter, a corresponding one of outer bushings 18a'' is slid from the outside of the capture extension support wall portion over the trunnion 21aa in the outer bearing opening to be held there by sliding a corresponding collared sleeve 18a$^{iv}$ over this bushing 18'' which sleeve is press fitted into the surrounding outer bushing opening. Similarly, a corresponding one of inner bushings 18''' is slid from opening 13 in support 12a though the basic cylindrical wall structure over the trunnion 21aa in the inner bushing opening to be held there by sliding a corresponding collared sleeve 18$^v$ over this bushing 18''' which sleeve is press fitted into the approximately surrounding inner bushing opening.

In the same manner, ends 21a' and 21a'' of remaining lower pivoting links 20a' and 20a'', each having a corresponding one of two further trunnion pairs, 21aa' and 21aa'', are captured, on one side of the link, by a corresponding one of outer bushings 18'' over the outside trunnion thereof in the outer bushing opening of one of the remaining capture extension support wall portions. These ends are further captured on the other side of the link by a corresponding one of inner bushings 18''' over the inside trunnion thereof in the inner bushing opening across from this outer bushing opening.

The cylindrical columns 11b''' and conversion support 11d''' of modified base structure 11''' together have a length sufficient to accommodate the opposite ends of linear actuators 60, 61 and 62 each being rotatably connected, as before, to a corresponding one of lower pivoting links 20a, 20a' and 20a'' at an opening in a corresponding one of the link bosses, 22a, 22a' and 22a'', extending from the mounting arrangement side of a corresponding one of those links. Thus, extensions and retractions of the corresponding one of output yokes 64 by linear actuators 60, 61 and 62, here too, forces the corresponding one of lower pivoting links 20a, 20a' and 20a'' in manipulator 10''' to correspondingly rotate in either a clockwise or counterclockwise direction. Lower pivoting links 20a, 20a' and 20a'' each extend generally in length from its trunnions along a corresponding initial plane in a straight line over an initial length portion of the link, and each then pierces its initial plane by curving toward shackles 63 and then curving in an opposite direction into a corresponding final plane parallel to the initial plane. Each link then curves in its final plane inwardly into an intermediate straight line portion in that final plane, and then curves in this plane in the opposite direction in a final length portion that is parallel to the initial length portion thereof.

As in previously described manipulators, pivoting links 20a, 20a' and 20a'', in addition to each having a corresponding one of link ends 21a, 21a' and 21a'' that are rotatably connected to base support 12a, also have, at opposite ends thereof, 23a, 23a' and 23a'', respectively, a spherical section capture opening. Here, however, this opening is the entrance to truncated cylindrical void surrounded by a correspondingly truncated cylindrical shell threaded on its inner surface. This cylindrical void is, in turn, an entrance to an approximately hemispherical void provided by an approximately hemispherical shell arranged thereabout at the link end that is provided integrally as part of that link end. The interior surface of the hemispherical shell follows a basis geometrical spherical surface about the void. Thus, in the instance of link 20a, there is formed at link end 23a an integral approximately hemispherical shell, 24a, to thereby form the socket for a ball-and-socket joint, 25a, as seen in detail in FIGS. 27 and 28. Similar integral approximately hemispherical shells, 24a' and 24a'', are formed at ends 23a' and 23a'' of links 20a' and 20a''. For similar reasons as above, each of these spherical section capture openings has an axis of rotational symmetry that extends in a direction perpendicular to the direction of the common symmetry axis of the inside and outside trunnions of the corresponding one of trunnion pairs 21aa, 21aa' and 21aa'' in that link, and which axis also extends at approximately half a right angle (plus or minus 10 degrees) to the general direction of extent of the link.

The ball portion for joint 25a is provided as part of an otherwise cylindrically shaped links joint post, 26aa, is threaded at one end, 26aaa, and has a "shoulder bolt" like structure at the opposite end with a cylindrically shaped unthreaded portion, 26aab, on a common post axis extending from the threaded portion to a "flare" portion, 26aac, having a flared back outer surface. This "flare" portion has a "neck" portion, 26aad, extending along the common post axis from its flared back outer surface to a spherical ball, 26aae. With spherical ball 26aae positioned inside hemispherical shell 24a, a capture collar, 27a, shaped generally as a truncated cylindrical shell with a threaded outer surface but with an inner surface shaped as a portion of a spherical geometrical basis surface, is slid over the other end of links joint post 26aa to end 23a of link 20a to be screwed into the threads surrounding the cylindrical void there to secure spherical ball 26aae there.

The other two lower pivoting links 20a' and 20a'' are also, at ends 23a' and 23a'' thereof, respectively, each part of a corresponding one of ball-and-socket, or spherical, joints, 25a' and 25a'', respectively. Joints 25a' and 25a'' are similar to joint 25a, and the parts designations for joints 25a' and 25a'' are the same as for joint 25a with the addition, or substitution, of, correspondingly, a single or double prime mark thereafter. The integrating of the socket portion of each of joints 25a, 25a' and 25a'' into the corresponding lower pivoting link, and the use of a screw threaded capture collar to hold the ball in that socket, rigidifies each joint toward moving essentially only in rotation about the spherical section capture opening axis of rotational symmetry therein.

As in the configurations of the previously described manipulators, and in the manner of connecting lower pivoting links 20a, 20a' and 20a'' being connected to modified manipulator base support 12a, three rotation connection sets each having a corresponding pair of bushings, 29'' and 29''' (the outer and inner bushings) are each provided with a corresponding one of a plurality of manipulator side pivoting links, 30a, 30a' and 30a'', or upper side pivoting links in the figures, which links each extend from a corresponding one of spherical joints 25a, 25a' and 25a''. Each of these bushing sets rotatably connects a corresponding one of links 30a, 30a' and 30a'' to a basic cylindrical wall structure formed about an opening, 31a, in a manipulable support, 32a, and to a support wall portion in a corresponding one of three capture extensions, 32a'. Each of these three capture extensions extends outward from the outside of the support basic cylindrical wall structure, and is at one of those locations thereon corresponding to the locations of support brackets 32' on support 32 in the previously described manipulators. Each of these extensions has the support wall portion thereof with a circular outer bushing opening therethrough, this support wall portion being spaced apart from the outside of the basic cylindrical wall structure of the support through the presence of a void between the support wall portion and the basic cylindrical wall structure. This void opens to outside of the support on a side of that support facing modified base structure 11''' and to part of a side perpendicular to this first described side on the left if facing the support. This spacing void between the support wall portion and the outside of the basic cylindrical wall structure is shaped approximately as a circular sector plate with support 32a forming the circular arc-like side of the spacing void and radii-like sides thereof provided by the opening of this void to outside the support.

Opposite the circular outer bushing opening in each of the support wall portions of the three capture extensions 32a' is a circular inner bushing or bearing opening extending through the basic cylindrical wall structure of support 32a to open into support opening 31a. From the side of support 32a facing modified base structure 11''', each of three slots, 32a''', extends through a corresponding capture extension support wall portion to a corresponding one of the circular outer bushing openings and parallels a radius thereof, but extends perpendicular to this radius from the spacing void only partway through this support wall to leave at least some support wall portion all around the outer bushing opening. Similarly, each of three slots, 32a$^{iv}$, extends through a corresponding portion of the basic cylindrical wall structure of support 32a, all the way between the spacing void and opening 31a, to a corresponding one of the circular inner bushing openings, and parallels a radius thereof as well as also being directly across from a corresponding one of slots 32a''' to both be along a common slot axis.

A corresponding one of three outer bushings 29'' is held in the circular outer bushing opening of each extension support wall portion 32a' by a corresponding one of three collared sleeves, 29$^{iv}$, and a corresponding one of three inner bushings 29''' is held in each of the circular inner bushing openings through the basic cylindrical wall structure across from the corresponding outer opening by a corresponding one of three collared sleeves, 29$^{v}$, after each of these bushings has captured a corresponding one of three link ends, 33a, 33a' and 33a'', of upper pivoting links 30a, 30a' and 30a'' so as to have each of these ends in a corresponding spacing void of support 32a. This capture is accomplished by positioning one of a pair of trunnions, 33aa, shaped as outside and inside truncated cylinders and extending outward on opposite sides of link 30a at end 33a thereof, in a corresponding one of the circular outer bushing openings in its capture extension support wall portion through the slot 32a''' providing access to this opening. Concurrently, the remaining one of the pair of trunnions 33aa is positioned in the circular inner bushing opening in the basic cylindrical wall structure of support 32a across from this outer opening through the slot 32a$^{iv}$ providing access to this inner opening. Thereafter, a corresponding one of outer bushings 29'' is slid from the outside of the capture extension support wall portion over the trunnion 33aa in the outer bearing opening to be held there by sliding a corresponding collared sleeve 29$^{iv}$ over this bushing 29'' which sleeve is press fitted into the surrounding outer bushing opening. Similarly, a corresponding one of inner bushings 29''' is slid from opening 31a in support 32a though the basic cylindrical wall structure over the trunnion 33aa in the inner bushing opening to be held there by sliding a corresponding collared sleeve 29$^{v}$ over this bushing 29''' which sleeve is press fitted into the approximately surrounding inner bushing opening.

In the same manner, ends 33a' and 33a'' of remaining lower pivoting links 30a' and 30a'', each having a corresponding one of two further trunnion pairs, 33aa' and 33aa'', are captured, on one side of the link, by a corresponding one of outer bushings 29'' over the outside trunnion thereof in the outer bushing opening of one of the remaining capture extension support wall portions. These ends are further captured on the other side of the link by a corresponding one of inner bushings 29''' over the inside trunnion thereof in the inner bushing opening across from this outer bushing opening.

Upper pivoting link 30a extends from spherical joint 25a through having a threaded post opening in the spherical joint end of this link, 34a, extending parallel to the general length thereof, and into which is screwed threaded end 26aaa of joint post 26aa that extends from hemispherical shell 24a formed at end 23a of lower pivoting link 20a serving as a socket. Here, too, the angle, or other relatively similar angles, for the plane in which the wall about the spherical section capture opening is included, relative to the base link 20a general length direction, and the joint link end of link 30a, are selected not only to aid in clearances, as stated above, but also to aid links 20a and 30a in achieving a large range of relative rotation positions with respect to one another. The other two upper pivoting links 30a' and 30a'' are also configured similarly and each extends in the same manner from a corresponding one of ball-and-socket, or spherical, joints 25a' and 25a'', respectively, at the spherical joint ends thereof, 34a' and 34a''.

Link 30a extends generally in length from its post opening in its spherical joint end 34a along an initial plane in a straight line over an initial length portion, curves in the plane outwardly into an intermediate straight line portion for a shorter distance along the plane, and then curves in the plane in the opposite direction. The link then pierces this initial plane by curving toward shackles 63 and then curving in an opposite direction into a corresponding final plane parallel to the initial plane to its trunnions end. With manipulable support 32a is positioned directly over base support 12a so that the axes of symmetry of openings 13a and 31a coincide, trunnion pair 33aa rotatably connect the manipuable support end of upper link 30a to manipulable support 32a at its basic cylindrical wall structure on the opposite side of these coinciding axes at which lower link 20a is rotatably connected to base support 12a. The other two upper pivoting links 30' and 30'' are also configured similarly and each is correspondingly positioned in a similar manner.

Figure 29:
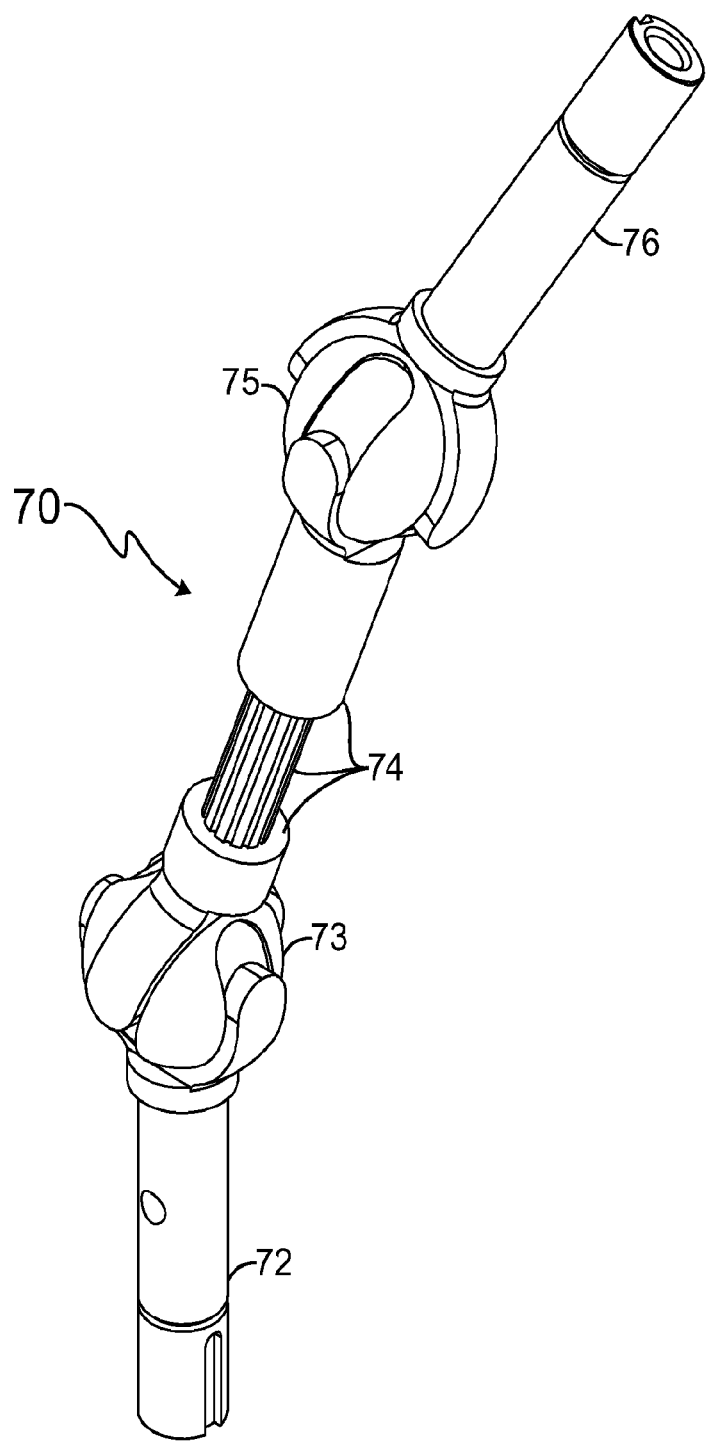
FIG. 29 shows a perspective view of a portion of the embodiment shown in FIGS. 21 and 24.

An alternative embodiment for column structure 40 in manipulator 10 of the embodiment shown in FIGS. 1 through 12, and an alternative embodiment for column structure 50 in manipulator 10' in FIGS. 13 through 16, is provided by a further column structure, 70, in present manipulator 10''' seen, as separated from the remainder thereof, in FIG. 29. In contrast to the omission of a column structure in manipulator 10'' of FIGS. 17 through 20 to allow manipulable support 32 to be extended and retracted over a range of radial directions by concerted extensions and retractions of the output yokes 64 by linear actuators 60, 61 and 62, such concerted extensions and retractions for radial movement of manipulable support 32a are accommodated by column structure 70. In addition, column structure 70 is configured to permit fluid to be introduced therein for transport to manipulable support 32a for such uses as it may be chosen to be put to there.

Figure 25:
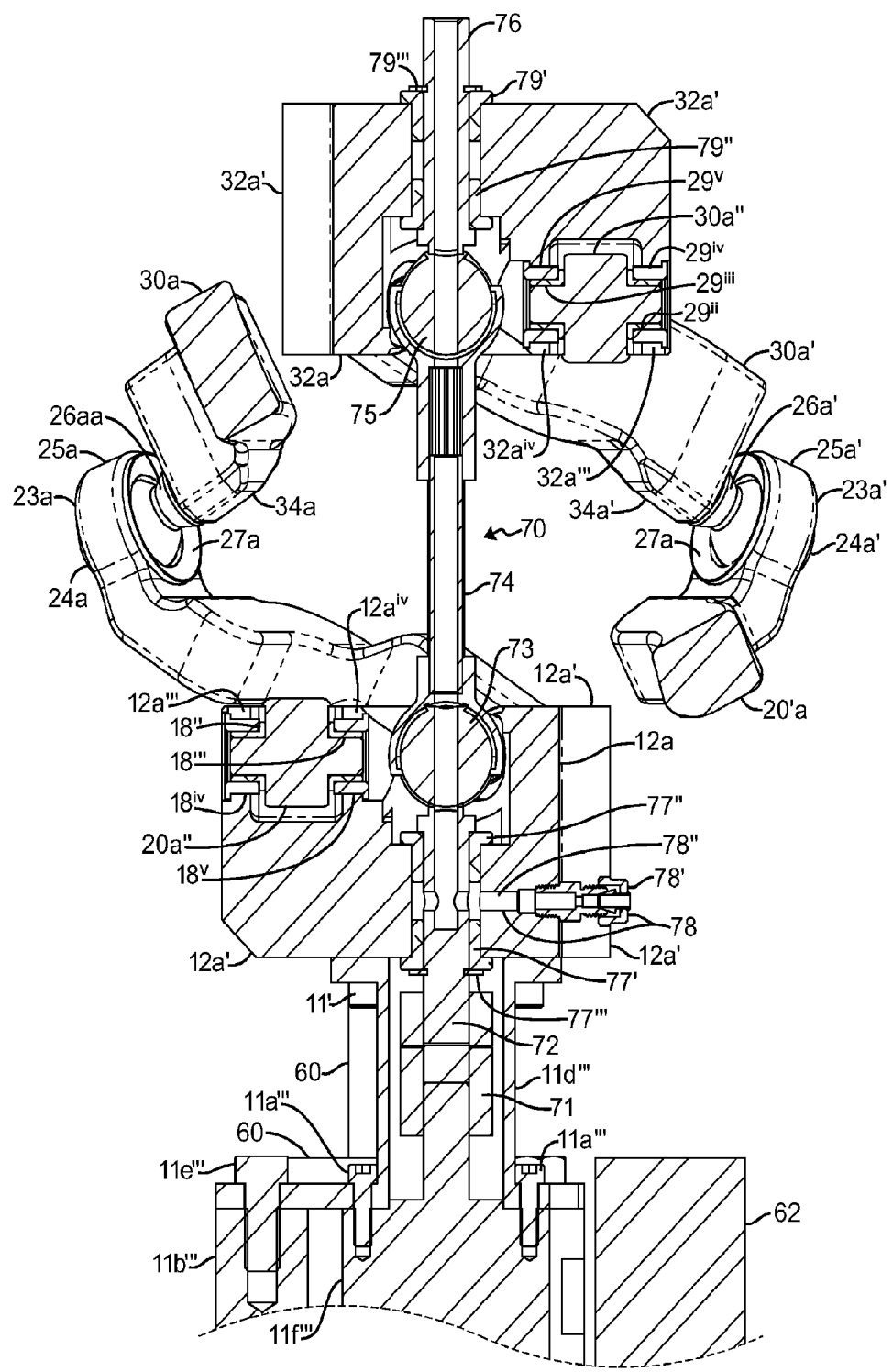
FIG. 25 shows a cross section view of the embodiment shown in FIGS. 21 and 24.
Figure 26:
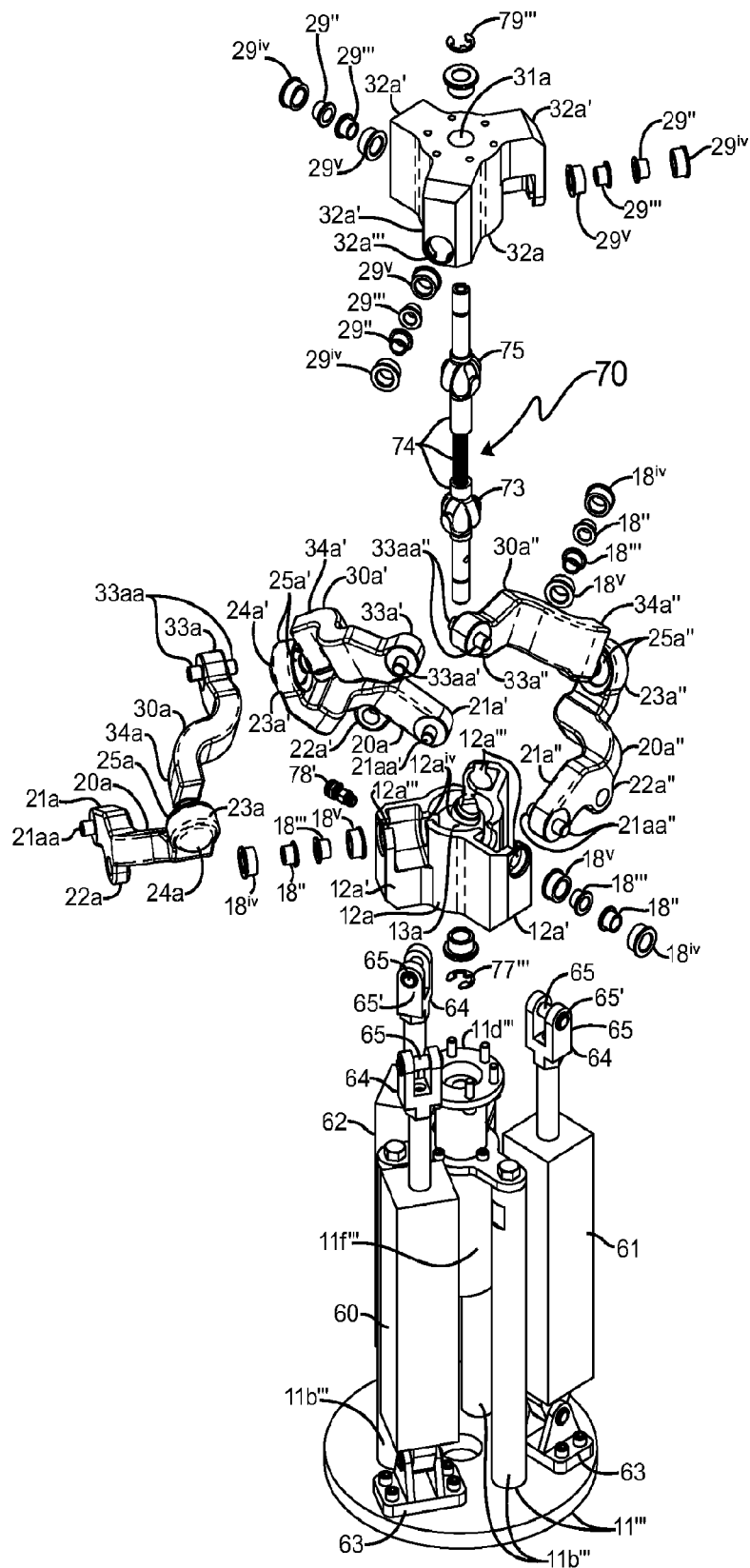
FIG. 26 shows an exploded view of the embodiment shown in FIGS. 21 and 24.
Figure 27:
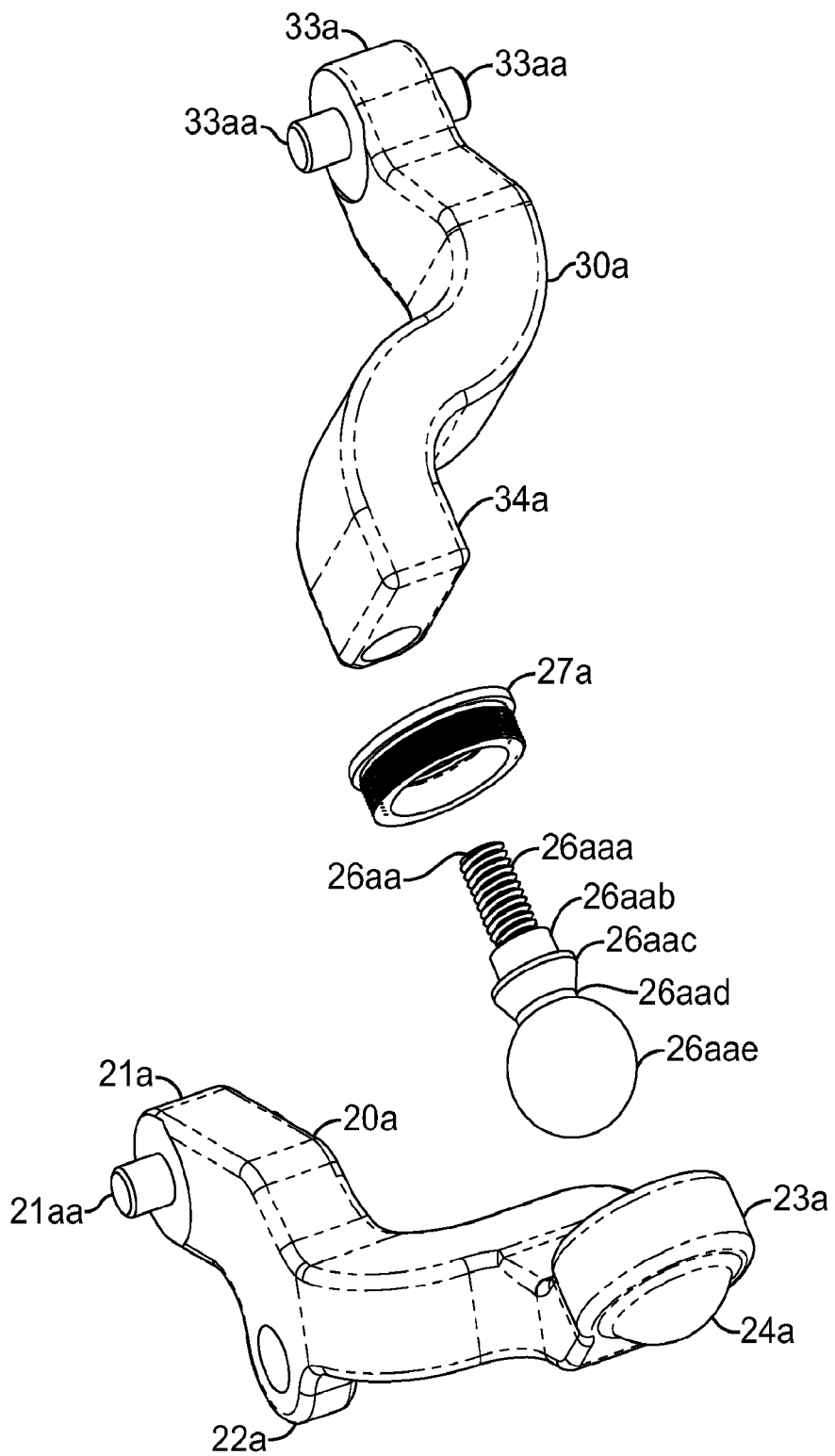
FIG. 27 shows a partial exploded view of the embodiment shown in FIGS. 21 and 24.
Figure 28A:
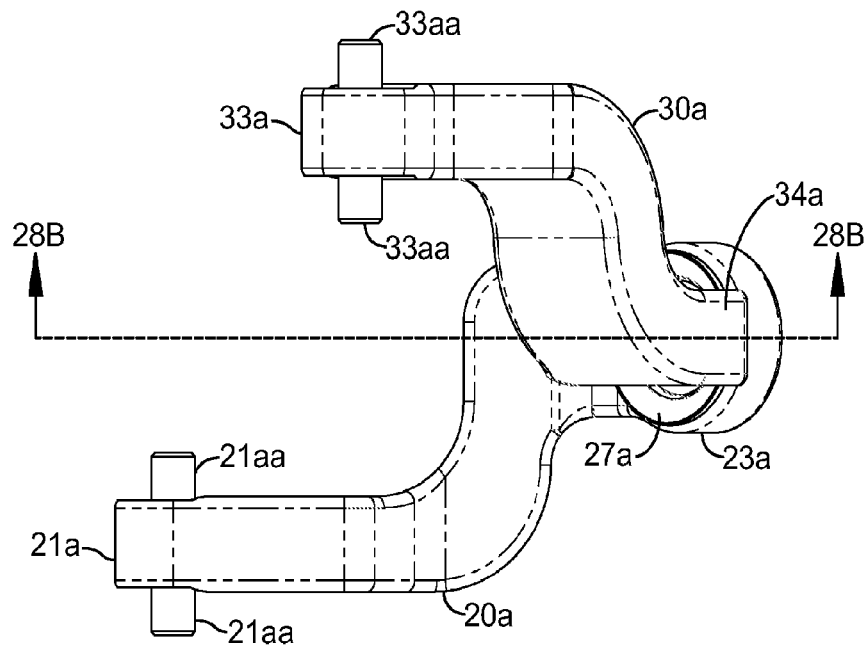
FIG. 28A shows a plan view of a portion of the embodiment shown in FIGS. 21 and 24.
Figure 28B:
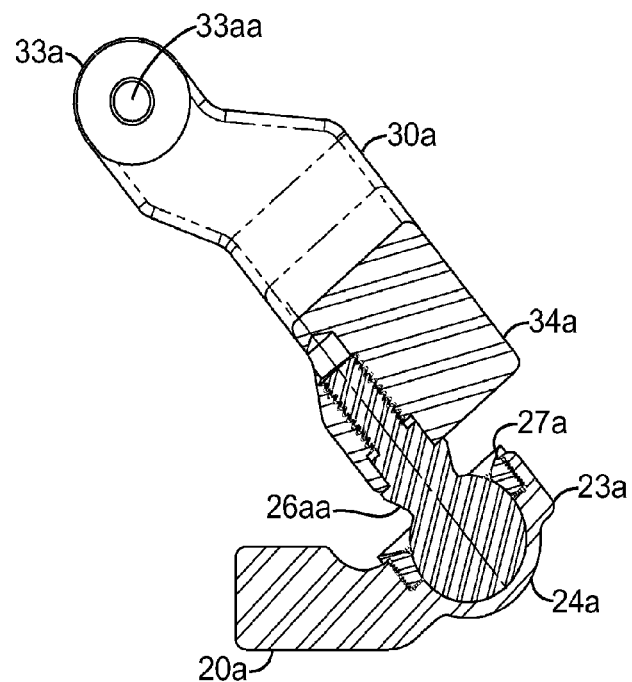
FIG. 28B shows a cross section view of the portion shown in FIG. 28A.
Figure 31:
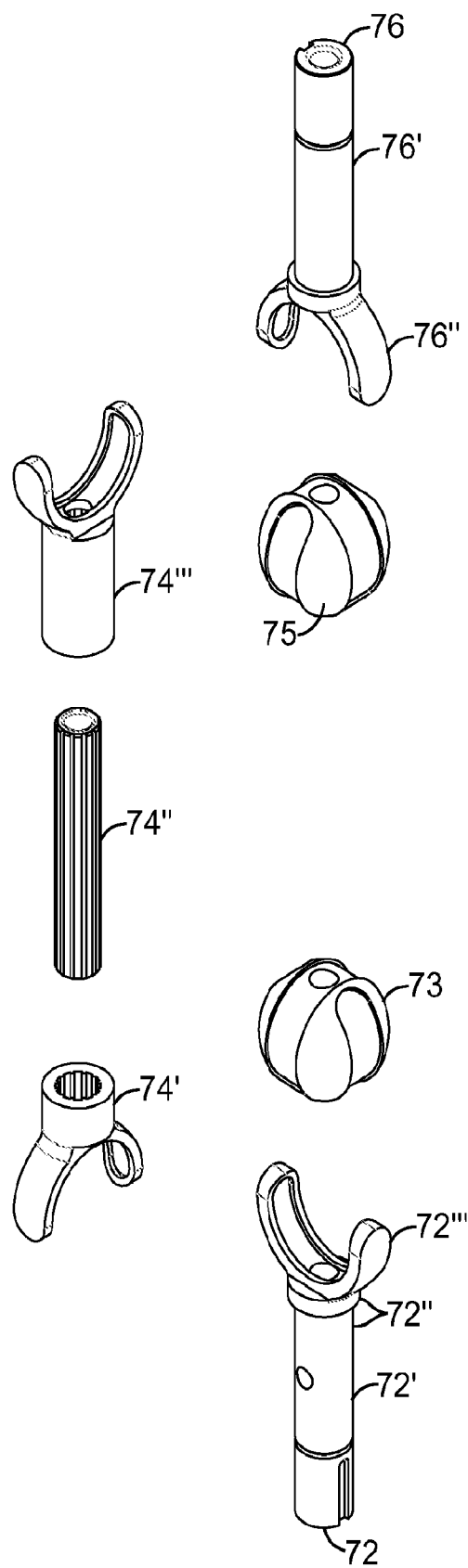
FIG. 31 shows an exploded view of the portion of the embodiment shown in shown in FIG. 29.

Column structure 70 has rotary coupler, 71, fastening this structure to the output shaft of rotary electric motor 11f''' at one end thereof formed by a rotary fluid receptor, 72, as seen in FIG. 25. Receptor 72, on the end thereof fastened by coupler 71, is formed there of a receptor cylindrical shaft portion, 72', that has a circular retaining groove about its axis of symmetry extending inwardly from its outer surface and which is also spaced apart from coupler 71 as seen in FIG. 29 through 31. Receptor cylindrical shaft portion 72' extends along the receptor length to a receptor cylindrical shell portion, 72", surrounding a receptor transport channel. The shell wall around this channel begins past the circular retaining groove along the receptor length but short of the location where two lateral circular entry orifices, positioned across a shell wall diameter from one another, pierce that shell wall. The shell wall generally has an axis of symmetry in common with the axis of symmetry of the receptor cylindrical shaft portion, and this shell wall extends, past an outer collar at the far end thereof, to a receptor recessed yoke portion, 72''', of the receptor. The receptor transport channel opens there into a circular arc band shaped recess in the receptor recessed yoke that faces away in the yoke from the shell wall. The circular arc band shaped recess is surrounded on all sides by a receptor yoke recess wall of extending a generally uniform distance out from the recess including the wall portions thereof about the opposite rounded ends of the recess.

Receptor recessed yoke portion 72''' is positioned against a base support channeled spherical ball, 73, in a first partial circumference recess extending inwardly from the outer surface of the ball and along a great circle of the ball to almost the opposite sides of a second partial circumference recess formed inward in the ball that also extends along another great circle of the ball to almost the opposite sides of the first recess. Each of these recesses in ball 73 follows a corresponding great circle of that ball that is in a plane at right angles to the plane of the other, and the ends of each recess are rounded with those of the first recess having a radius similar to the radius of the rounded end recess walls of receptor recessed yoke portion 72'''. A base support ball transport channel extends along a diameter of ball 73 to open at either end thereof into a corresponding one of the first and second base support ball recesses at midpoints thereof to each be between the ends of the other recess. Receptor 72, including receptor recessed yoke portion 72''' and its receptor yoke recess wall, is formed of sufficiently rigid material so that when pressed against the bottom of the first partial circumference recess formed of the more resilient material used in providing channeled spherical ball 73, fluid in the first mated recess, formed by circular arc band shaped recess of the receptor recessed yoke mated to the first partial circumference recess, cannot escape past the receptor yoke recess wall.

A splined double yoke shaft structure, 74, has a base support ball coupler, 74', affixed to splined shaft, 74", formed as a cylindrical shell about a shaft transport channel with splines at the shell outer surface. Base support ball coupler 74' is formed with a recessed ball coupler yoke, much like receptor recessed yoke portion 72''', which recessed ball coupler yoke is affixed to a yoke mount formed as a cylindrical shell around a splined shaft and yoke mount fluid coupling channel with splines on the shell inner surface surrounding that channel. This coupling channel opens there into a circular arc band shaped recess in the coupler recessed yoke that faces in that yoke base support channeled spherical ball 73. The circular arc band shaped recess in the coupler recessed yoke is surrounded on all sides by a coupler yoke recess wall of extending a generally uniform distance out from the recess including the wall portions thereof about the opposite rounded ends of the recess.

The recessed ball coupler yoke of base support ball coupler 74' is positioned against base support channeled spherical ball 73 in the second partial circumference recess thereof. The rounded ends of the second recess have a radius similar to the radius of the rounded end recess walls of this recessed ball coupler yoke. Here, too, base support ball coupler 74', including its recessed ball coupler yoke with the coupler yoke recess wall thereof, is formed of sufficiently rigid material so that when pressed against the bottom of the second partial circumference recess formed of the more resilient material used in providing channeled spherical ball 73, fluid in the second mated recess, formed by circular arc band shaped recess of the recessed ball coupler yoke mated to the second partial circumference recess, cannot escape past the coupler yoke recess wall.

Splined shaft 74" is affixed at one end thereof to base support ball coupler 74' through its being press fitted into the yoke mount coupling channel thereof. Splined double yoke shaft structure 74 has at the opposite end of shaft 74" a manipuable support ball coupler, 74''', that is slidably joined with that shaft. Manipuable support ball coupler 74''' is formed much like base support ball coupler 74' with again a recessed ball coupler yoke that is affixed to a yoke mount formed as a cylindrical shell around a splined shaft and yoke mount fluid coupling channel with splines on the shell inner surface surrounding that channel. This coupling channel opens there into a circular arc band shaped recess in the coupler recessed yoke of manipuable support ball coupler 74''' that faces in that yoke base support away from channeled spherical ball 73. The circular arc band shaped recess in the coupler recessed yoke is surrounded on all sides by a coupler yoke recess wall of extending a generally uniform distance out from the recess including the wall portions thereof about the opposite rounded ends of the recess.

The recessed ball coupler yoke of manipuable support ball coupler 74''' is positioned against a manipuable support channeled spherical ball, 75, in a first partial circumference recess extending inwardly from the outer surface of ball 75 and along a great circle of that ball to almost the opposite sides of a second partial circumference recess formed inward in the ball that also extends along another great circle of the ball to almost the opposite sides of the first recess. Each of these recesses in ball 75 follows a corresponding great circle of that ball that is in a plane at right angles to the plane of the other, and the ends of each recess are rounded with those of the first recess having a radius similar to the radius of the rounded end recess walls of the recessed ball coupler yoke of manipuable support ball coupler 74'''. A manipuable support ball transport channel extends along a diameter of ball 75 to open at either end thereof into a corresponding one of the first and second manipuable support ball recesses at midpoints thereof to each be between the ends of the other recess. Manipuable support ball coupler 74''', including its recessed ball coupler yoke with the coupler yoke recess wall thereof, is formed of sufficiently rigid material so that when pressed against the bottom of the first partial circumference recess formed of the more resilient material used in providing channeled spherical ball 75, fluid in the third mated recess, formed by circular arc band shaped recess of the manipuable support ball coupler mated to the first partial circumference recess of ball 75, cannot escape past the manipuable support ball coupler yoke recess wall.

Column structure 70 has its other, remaining, end formed by a fluid ejector, 76. Ejector 76 is formed there of a cylindrical shell portion, 76', that has a circular retaining groove about its axis of symmetry extending inwardly from its outer surface and which is also spaced apart from the free, or fluid emission, end of the ejector. Ejector cylindrical shell portion 76' surrounds an ejector transport channel. The shell wall extends, past an outer collar at the near end thereof, to an ejector recessed yoke portion, 76", of the ejector. The ejector transport channel opens there into a circular arc band shaped recess in the ejector recessed yoke that faces away in the yoke from the shell wall and toward manipuable support channeled spherical ball 75. The circular arc band shaped recess is surrounded on all sides by a receptor yoke recess wall of extending a generally uniform distance out from the recess including the wall portions thereof about the opposite rounded ends of the recess.

Ejector recessed yoke portion 76" is positioned against manipuable support channeled spherical ball 75 in the second partial circumference recess thereof. The rounded ends of the second recess have a radius similar to the radius of the rounded end recess walls of this recessed yoke. Ejector 76, including receptor recessed yoke portion 76" and its receptor yoke recess wall, is formed of sufficiently rigid material so that when pressed against the bottom of the second partial circumference recess formed of the more resilient material used in providing channeled spherical ball 75, fluid in the fourth mated recess, formed by circular arc band shaped recess of the ejector recessed yoke mated to the second partial circumference recess, cannot escape past the ejector yoke recess wall.

Column structure 70 is fastened by rotary coupler 71 to the output shaft of rotary electric motor 11f''' so as to position receptor 72 in the narrower adjacent portion of opening 13 in base support 12a and base support channeled spherical ball 73 in the wider portion of opening 13 at the opposite side of base support 12a. Receptor 72 is maintained in this narrower portion of opening 13 by an installation arrangement, 77, comprising a pair of collared bushings, 77' and 77", and a retaining ring, 77'''. Bushing 77' is positioned in the narrower portion of opening 13 adjacent coupler 71 with its collar against base support 12a, and held there by retaining ring 77''' positioned in the circular retaining groove in receptor cylindrical shaft portion 72'. Bushing 77" is positioned in the narrower portion of opening 13 at the other end thereof adjacent channeled spherical ball 73 with its collar also against base support 12a.

Bushings 77' and 77" are separated from one another in the n arrowed portion of opening 13, and such that the space separating them is located where the two lateral circular entry orifices are provided in the shell wall of receptor cylindrical shell portion 72". A fluid provision arrangement, 78, comprising a compression connector, 78', and an exterior fluid provision channel, 78", provided in base support 12a extending from the side of that support to the narrower portion of opening 13 therein at the space separating bushings 77' and 77". Connector 78' is mounted on the side of base support 12a at the outer end of the exterior fluid provision channel provided therein to receive fluid from a source connected there to it to admit the fluid into the channel and then into the space separating bushings 77' and 77". The fluid there then enters two lateral circular entry orifices are provided in the shell wall of receptor cylindrical shell portion 72", and then into the receptor transport channel of receptor cylindrical shell portion 72", whether receptor 72 is being rotated in bushings 77' and 77" by electric motor 11f''' or not.

Ejector 76 is positioned in the narrower adjacent portion of opening 31 provided at the side of side of manipuable support 32a from which the free end of this ejector protrudes, and manipuable support channeled spherical ball 75 is positioned in the wider portion of opening 31 at the opposite side of manipuable support 32a. Ejector 76 is maintained in this narrower portion of opening 13 by an installation arrangement, 79, comprising a pair of collared bushings, 79' and 79", and a retaining ring, 79'''. Bushing 79' is positioned in the narrower portion of opening 13 adjacent the ejector free end with its collar against manipuable support 32a, and held there by retaining ring 79''' positioned in the circular retaining groove in ejector cylindrical shell portion 76'. Bushing 79" is positioned in the narrower portion of opening 31 at the other end thereof adjacent channeled spherical ball 75 with its collar also against manipuable support 32a, and separated in opening 31 from bushing 79'. The separation between retaining rings 77''' and 79''' is selected to maintain adequate pressures between the various recessed yokes and the channeled spherical balls against which they are pressed to prevent significant fluid leakage out of the four mating recessed around the yokes.

Thus, fluid provided under pressure at compression connector 78' flows through channel 78" and then into the space separating bushings 77' and 77" to flow through the two lateral circular entry orifices that are provided in the shell wall of receptor cylindrical shell portion 72", and then through the receptor transport channel of receptor cylindrical shell portion 72" to reach the first mated recess. There, the fluid enters the base support ball transport channel extending along a diameter of base support channeled spherical ball 73 to reach the second mated recess and from whatever position that ball has been forced into along the first partial circumference recess thereof with respect to receptor recessed yoke portion 72''' as the opening to this channel is always exposed to the first mated recess. The position of ball 73 with respect to receptor recessed yoke portion 72''' is again determined by selected extensions and retractions of the corresponding one of output yokes 64 by linear actuators 60, 61 and 62 to force the corresponding one of lower pivoting links 20, 20' and 20" in manipulator 10" to correspondingly rotate in either a clockwise or counterclockwise direction to selectively position manipuable support 32.

Similarly, the recessed ball coupler yoke in base support ball coupler 74' of splined double yoke shaft structure 74 has the opening to the yoke mount fluid coupling channel thereof always exposed to the second mated recess from whatever position the recessed ball coupler yoke of base support ball coupler 74' has been forced into along the second partial circumference recess of ball 73. Hence, base support channeled spherical ball 73, receptor recessed yoke portion 72''', and the recessed ball coupler yoke in base support ball coupler 74' together form a base support fluid transmitting spherical joint.

Fluid flowing through the yoke mount fluid coupling channel of the recessed ball coupler yoke in base support ball coupler 74' enters the shaft transport channel of splined shaft 74", and enters then the yoke mount fluid coupling channel of the recessed ball coupler yoke in manipuable support ball coupler 74''' to reach the third mated recess. There, the fluid enters the manipuable support ball transport channel extending along a diameter of manipuable support channeled spherical ball 75 to reach the fourth mated recess and from whatever position that ball has been forced into along the first partial circumference recess thereof with respect to the recessed ball coupler yoke in manipuable support ball coupler 74''' as the opening to this channel is always exposed to the third mated recess.

Finally, the ejector recessed yoke portion 76" of the fluid ejector 76 has the opening to the ejector transport channel thereof always exposed to the fourth mated recess from whatever position the ejector recessed yoke portion 76" has been forced into along the second partial circumference recess of ball 75. The fluid then flows to the free end of ejector 76 to there be put to a desired use having flowed through a manipuable support fluid transmitting joint formed together by manipuable support channeled spherical ball 75, the recessed ball coupler yoke in manipuable support ball coupler 74''', and ejector recessed yoke portion 76".

Figure 32:
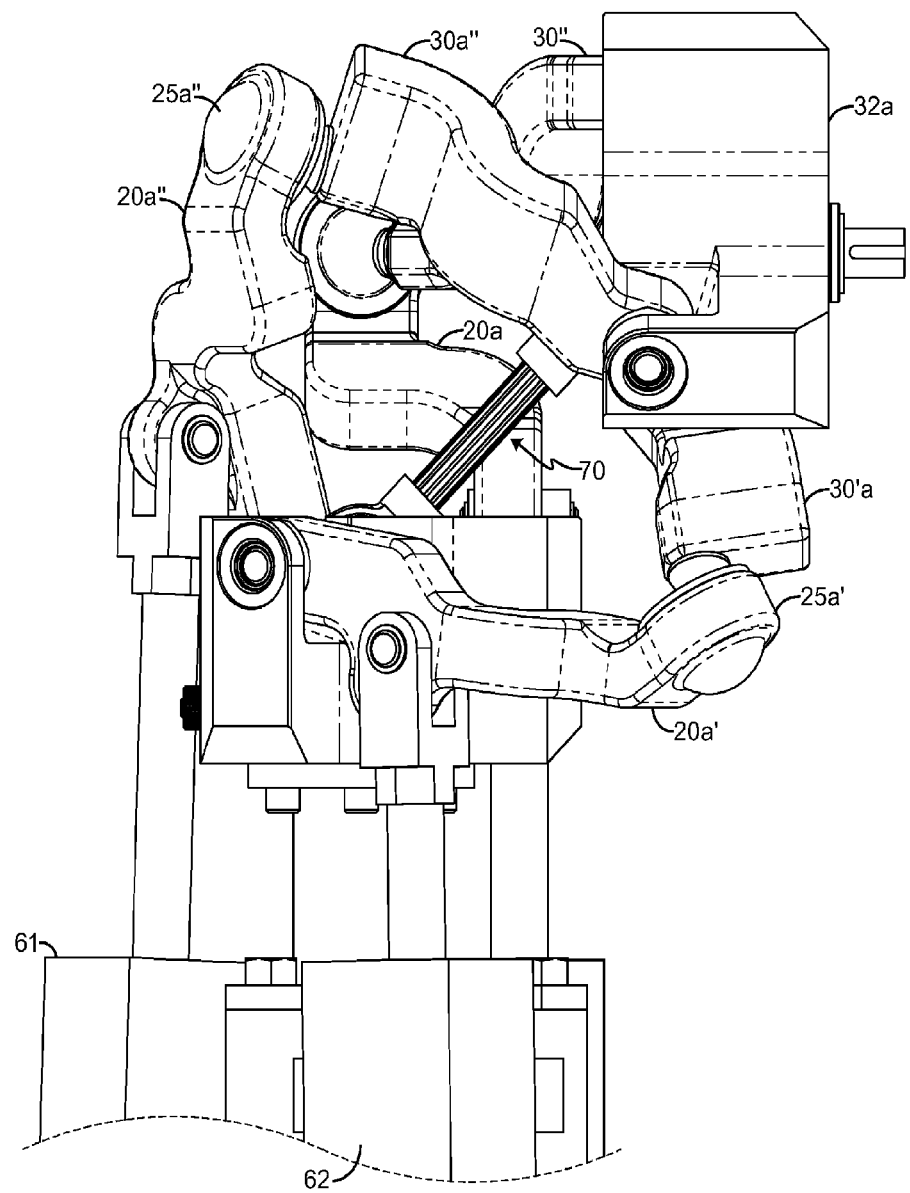
FIG. 32 shows a further elevation view of the embodiment shown in FIGS. 21 and 24, FIGS. 33 and 34 show perspective and elevation views of yet a further alternative embodiment of the present invention.
Figure 33:
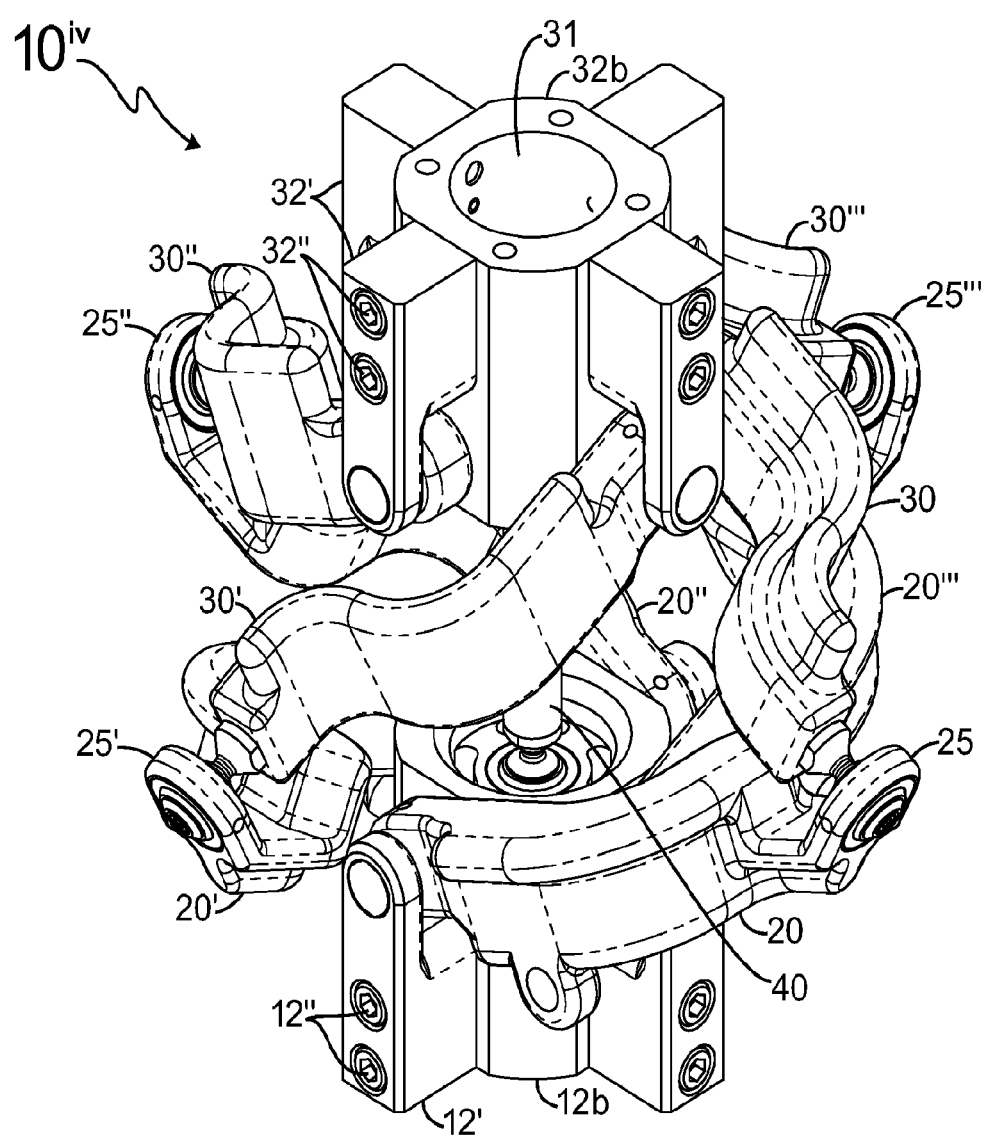
Figure 34:
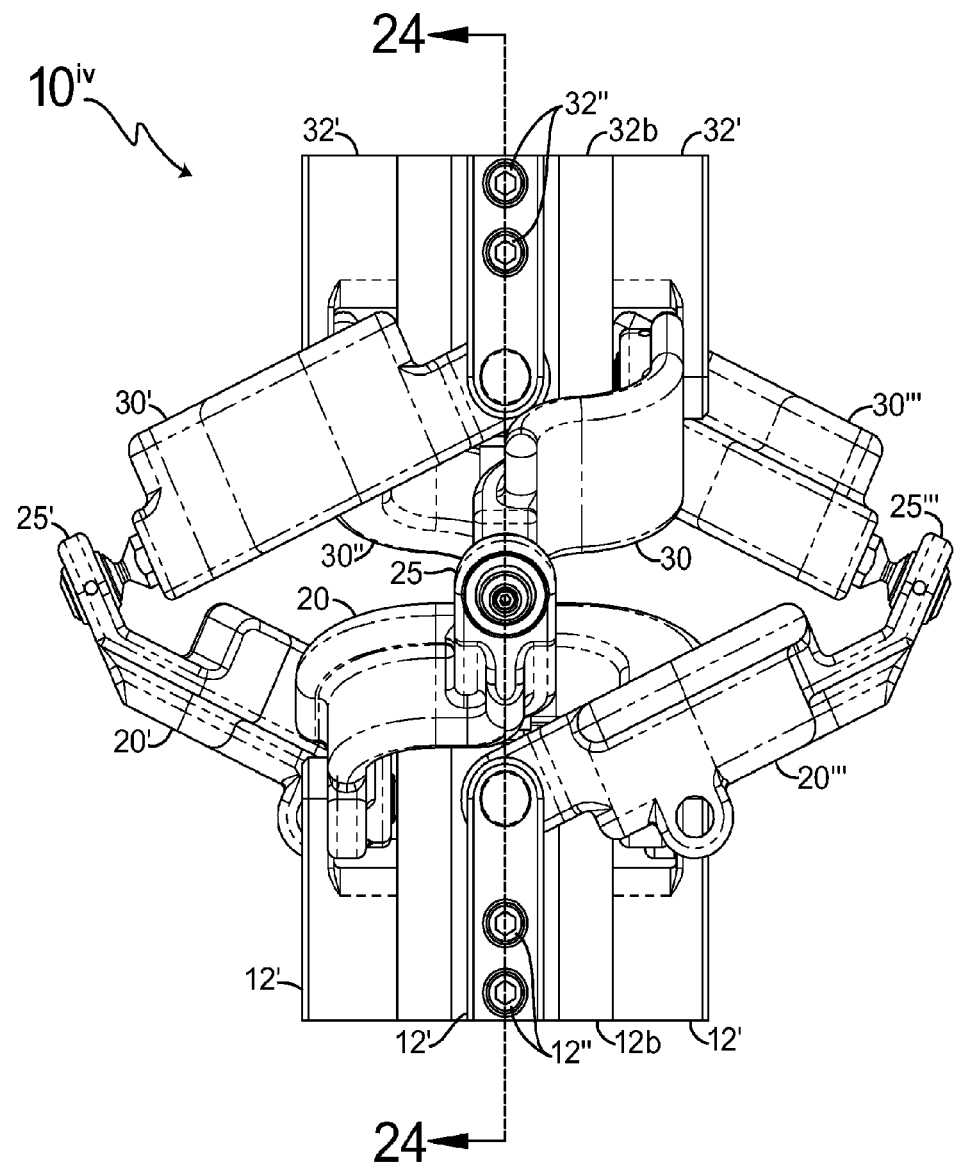
Figure 35:
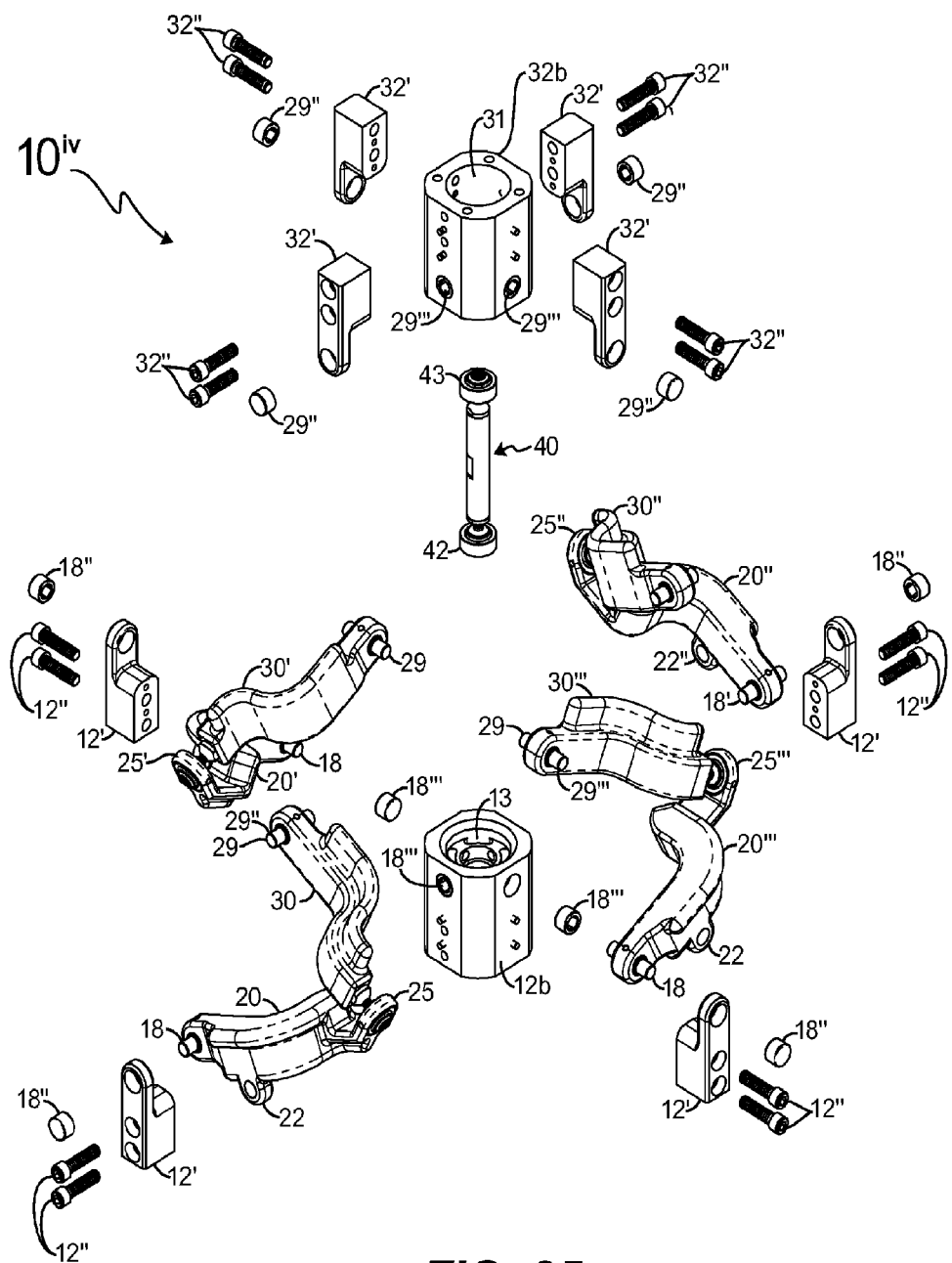
FIG. 35 shows an exploded view of the embodiment shown in FIGS. 33 and 34.
Figure 36:
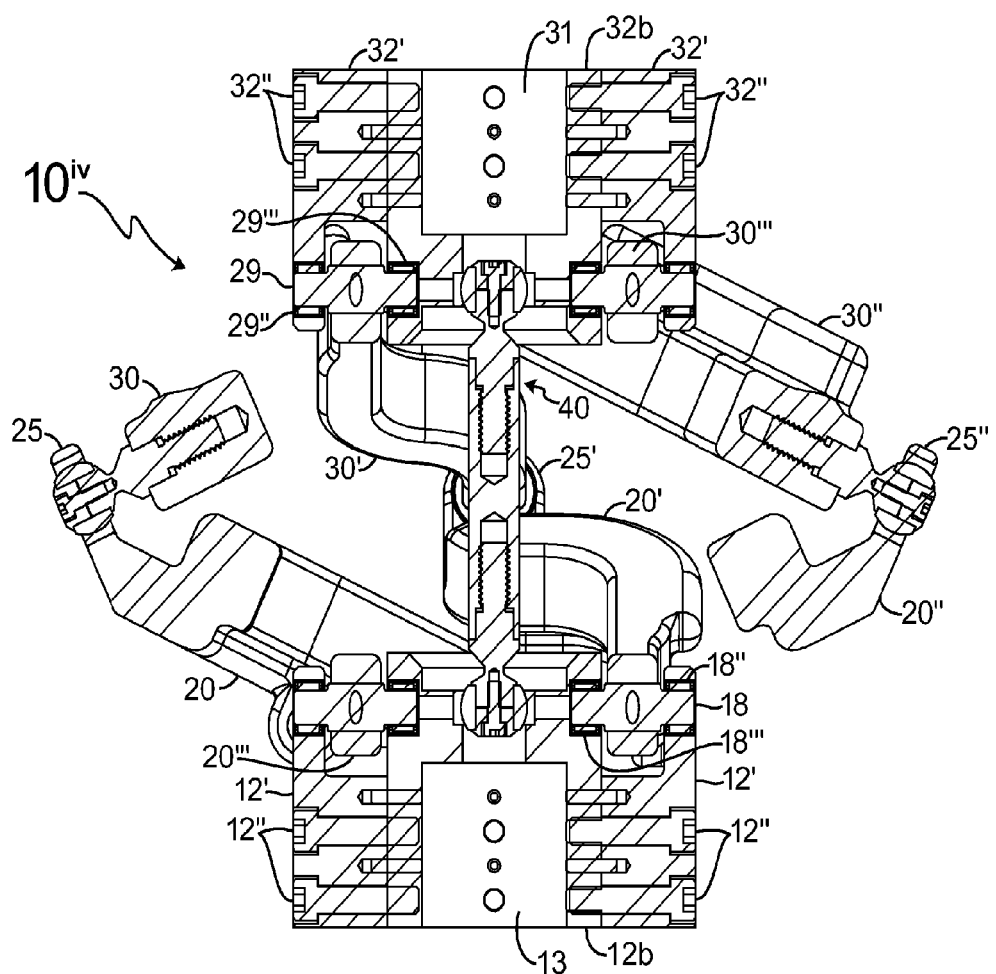
FIG. 36 shows a cross section view of the embodiment shown in FIGS. 33 and 34.

In addition to linear actuators 60, 61 and 62 being capable of selectively forcing the corresponding one of lower pivoting links 20, 20' and 20" in manipulator 10" to correspondingly rotate in either a clockwise or counterclockwise direction to selectively position manipuable support 32, column structure 70, in contrast to column structures 40 and 50 described above, permits manipulable support 32 to be extended and retracted in radial directions by concerted extensions and retractions of the output yokes 64 by linear actuators 60, 61 and 62. This comes about by having manipuable support ball coupler 74''' slidably joined at its internal splines with the external splines of splined shaft 74" within splined double yoke shaft structure 74, and with the opposite end of shaft 74" affixed in to base support ball coupler 74' in that structure. Thereby, linear actuators 60, 61 and 62 can force manipuable support 32 to move radially through having that support force ejector 76, ball 75 and manipuable support ball coupler 74''' slide along splined shaft 74", and have, concurrently if desired, rotary electric motor 11f''' selectively rotate column structure 70 within bushing pair 77' and 77" and with bushing pair 79' and 79". FIG. 32 illustrates a side view of a selected positioning of manipulable support 32a with support 32a located at an extreme position away from the position taken when the axes of symmetry of openings 13a and 31a coincide.

The added fluid transport and radial movement capabilities provided by column structure 70 over those of column structure 40 in manipulator 10 of the embodiment shown in FIGS. 1 through 12, and column structure 50 in manipulator 10' in FIGS. 13 through 16 can be obtained in those manipulators by substituting column structure 70 therein for column structures 40 and 50. Accommodating column structure 70 in those manipulators with a modified receptor not suited for being rotatably driven would require suitable modifications to openings 13 and 31. Providing also the rotational capability of column structure 70 would require further suitable modifications to the mounting arrangement used in those manipulators, including base 11, to accommodate a rotary motor and coupler.

FIGS. 33 through 37 show another alternative embodiment for the lower and upper pivoting links arrangement in manipulators 10, 10', 10" and 10''' of the embodiments shown in FIGS. 1 through 31. This alternative manipulator, 10$^{iv}$, seen in perspective and elevation views in FIGS. 33 and 34, respectively, has instead an eight sided base support, 12b, and an eight sided manipulable support, 32b, seen more clearly in the exploded view of FIG. 35. Each has four rounded corner sides that are separated from the two nearest others thereof by a substantially flat side. These added sides accommodate the addition of a fourth lower pivoting link, 20''', rotatably connected to the further flat side of base support 12b at one end thereof, and connected at the other end through a fourth spherical joint, 25''', to a fourth upper pivoting link, 30''', that is rotatably connected at its opposite end to the further flat side of manipulable support 32b. This link addition is implemented similarly to the linkage arrangement comprising lower pivoting arm 20" connected through spherical joint 25" to upper pivoting link 30" as seen in the cross section view of FIG. 36.

Figure 37:
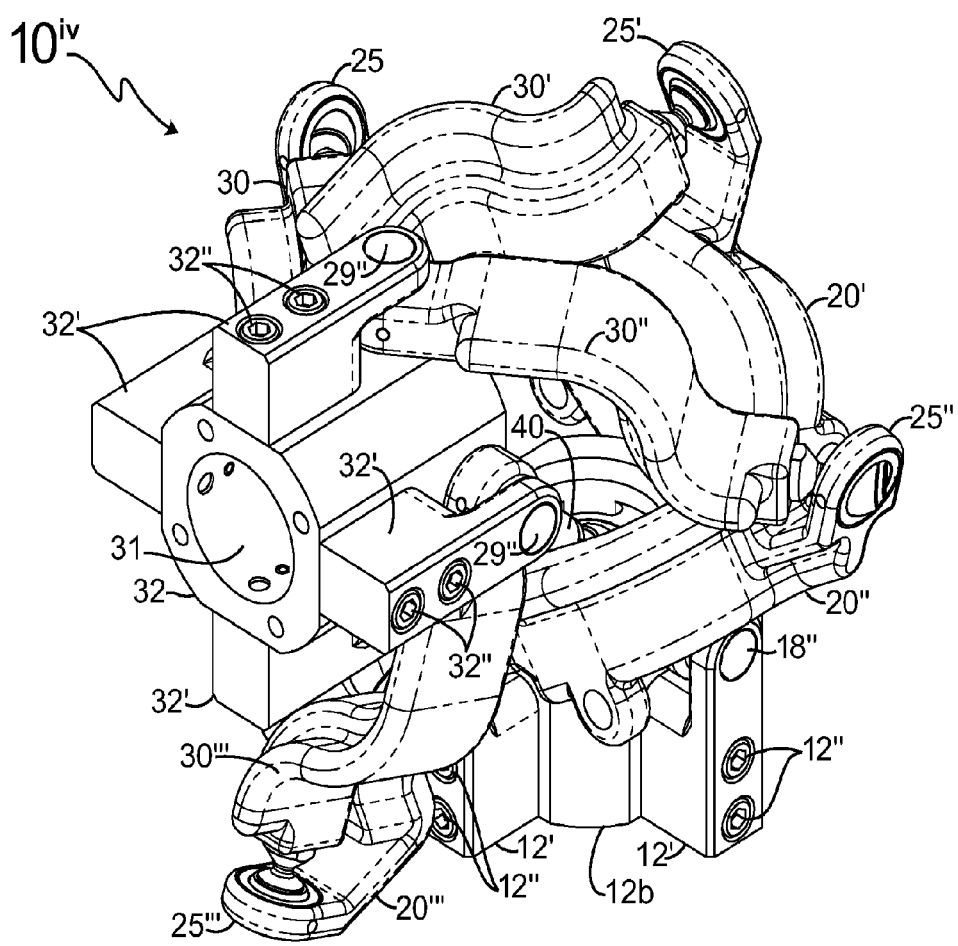
FIG. 37 shows a further perspective view of the embodiment shown in FIGS. 33 and 34, FIGS. 38 and 39 show perspective and elevation views of yet a further alternative embodiment of the present invention.

Again, motors 15 and 16, and their corresponding transferors 17, can be rotatably connected to lower pivoting links 20 and 20' in manipulator 10''' to supply rotational force, or torque, but base 11, motors 15 and 16, and their corresponding transferors 17 have been omitted in these figures as they are essentially unchanged from their configurations shown in connection with manipulator 10. Alternatively, linear actuators 60 and 61 (omitting linear actuator 62) can be rotatably connected to lower pivoting links 20 and 20' in manipulator 10''' to supply rotational force, or torque, but base 11" and linear actuators 60 and 61 have been omitted in these figures as they are essentially unchanged from their configurations shown in connection with manipulator 10". Other components similar to those in manipulators 10, 10' and 10" retain the same numerical designations in FIGS. 33 through 37 as they had in connection with manipulators 10, 10' and 10" of the embodiments shown in FIGS. 1 through 20. An extreme position of manipuable support 32 in this manipulator is shown in FIG. 37.

Figure 38:
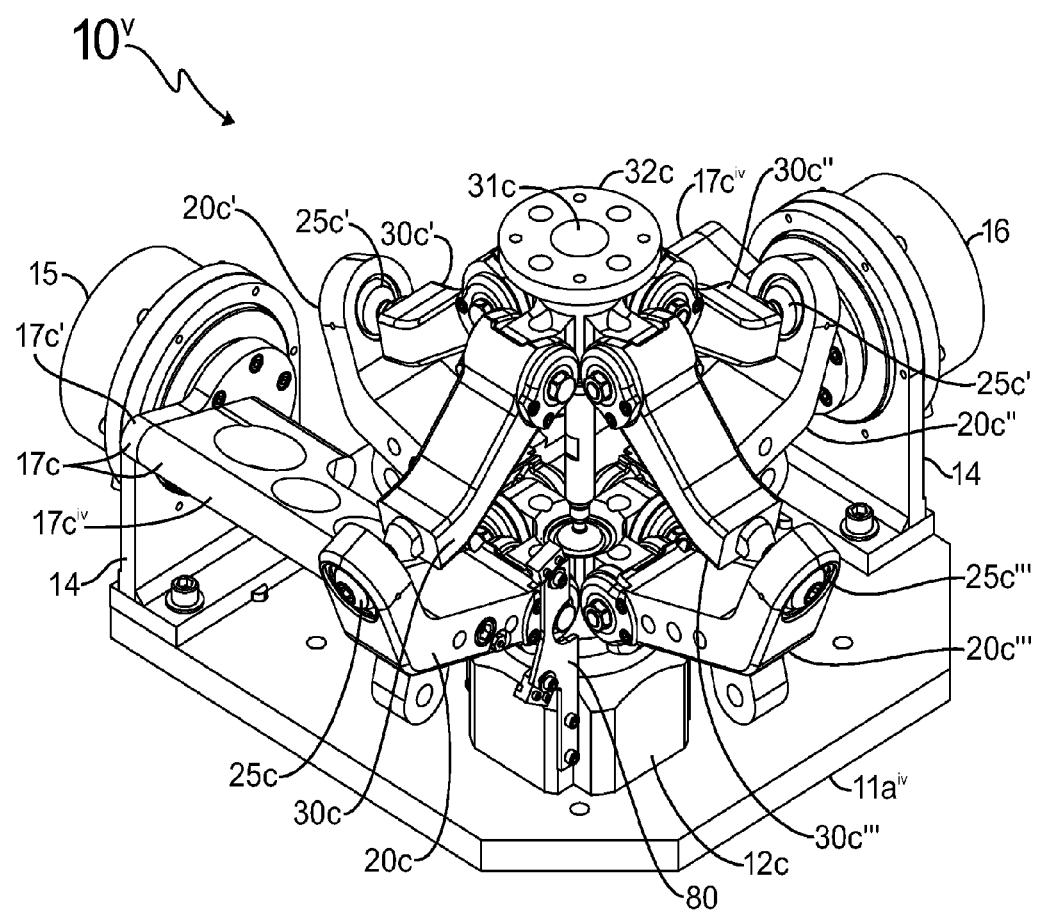
Figure 39:
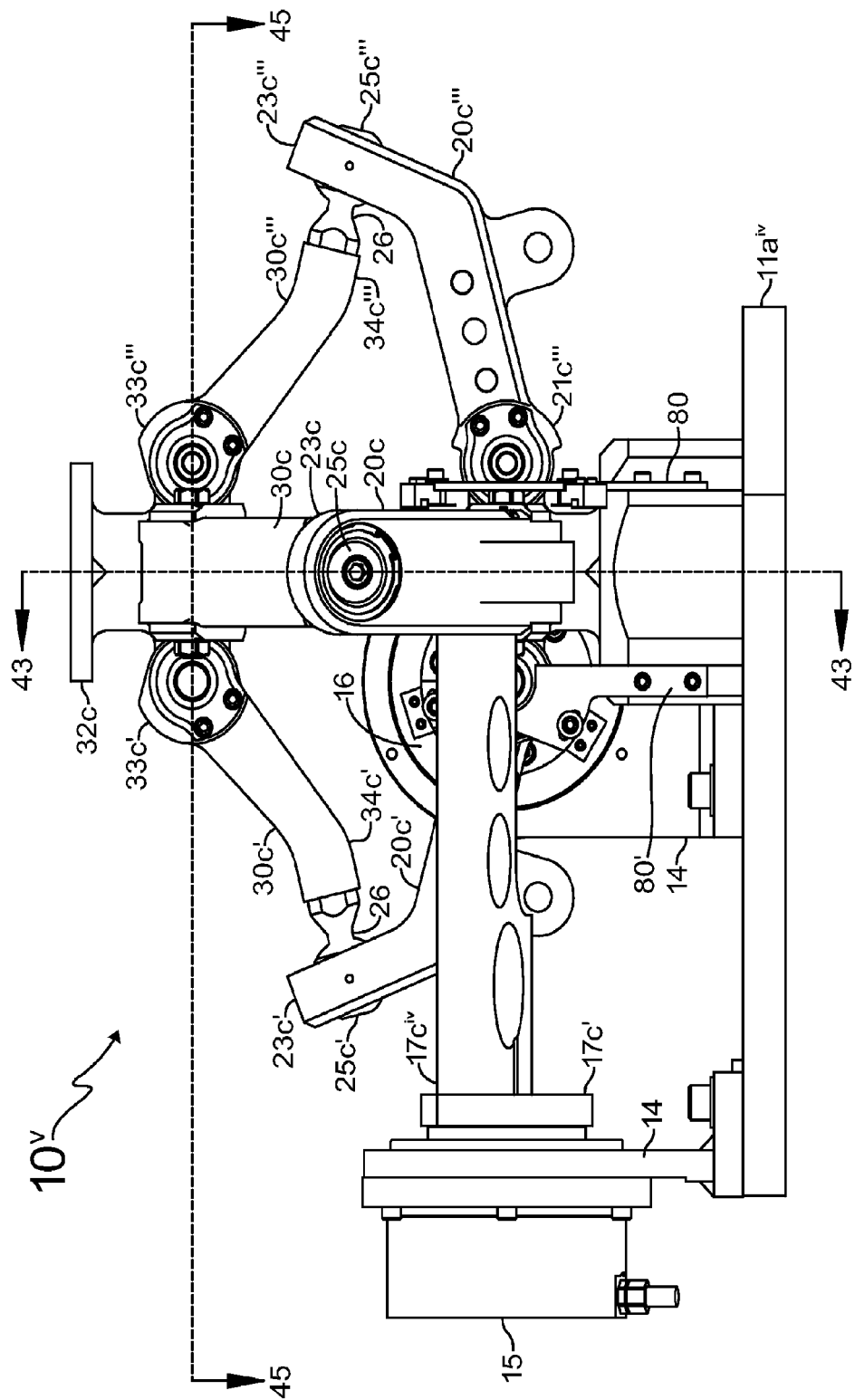

FIGS. 38 through 51 show an alternative to the rigidified manipulator 10''' of FIGS. 21 through 32 in a further rigidified manipulator, 10$^v$, but one that is shown in the perspective and elevation view of FIGS. 38 and 39, respectively, again comprising four lower pivoting links forcibly rotated by two rotary electrical motors, and also again four spherical joints and four upper pivoting links as were all used in manipulator 10$^{iv}$ in FIGS. 32 through 37. This alternative robotic manipulator again maintains more rigidity against applications of some external mechanical loads on its output manipulable support at various different positions thereof, i.e. is a mechanically "stiffer" or less compliant mechanism, using pivoting yoked connections, or shackles, to rotatably connect the links to the supports.

Figure 40:
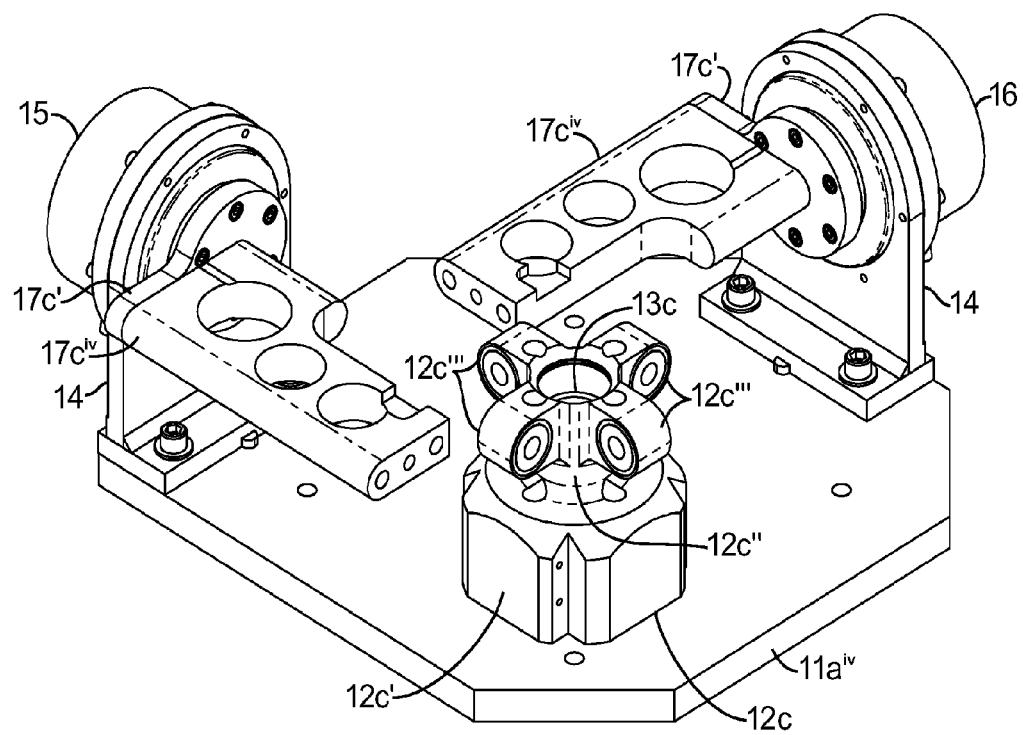
FIG. 40 shows a perspective view of a portion of the embodiment shown in FIGS. 38 and 39.
Figure 41:
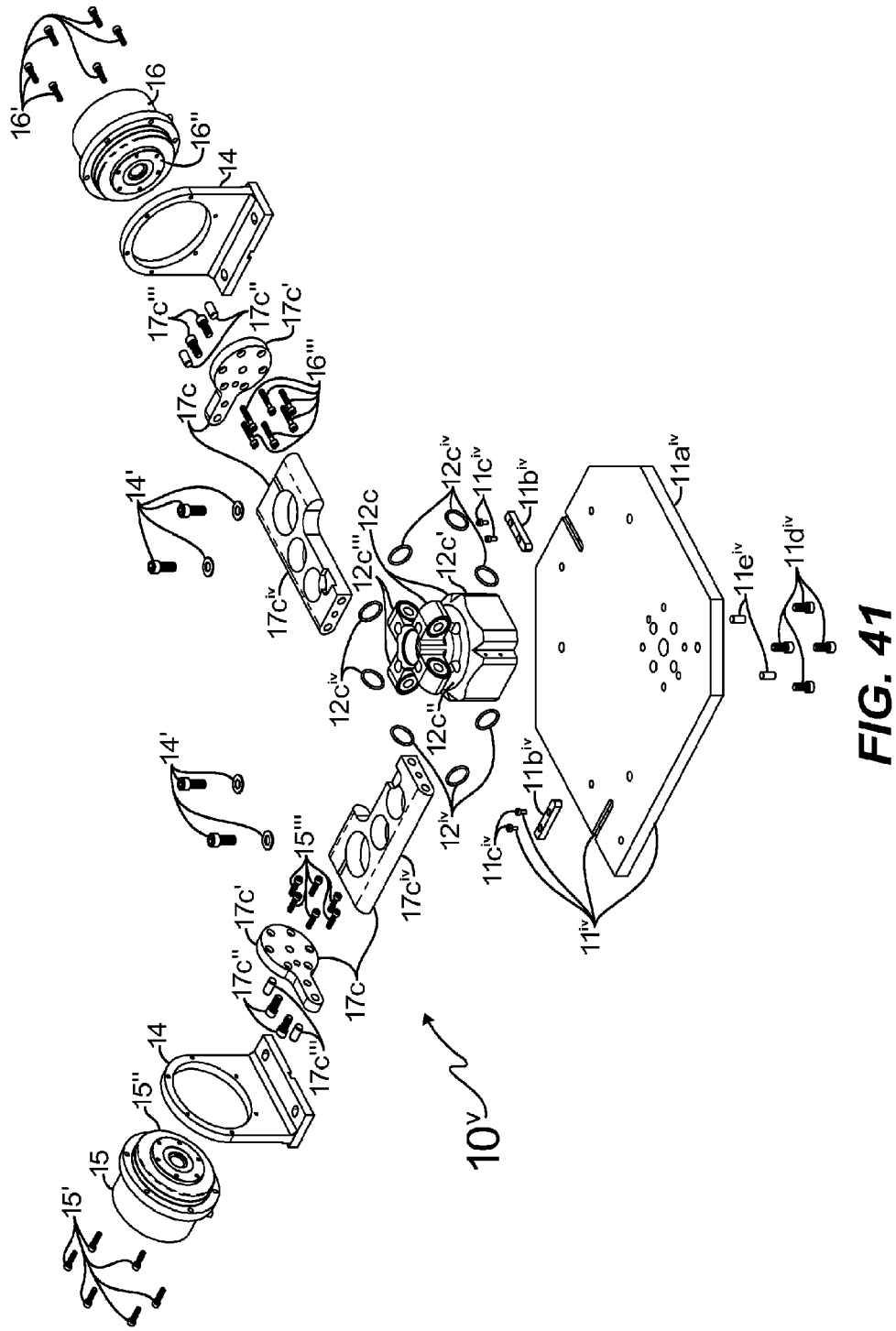
FIG. 41 shows an exploded view of the portion of the embodiment shown in FIG. 40.
Figure 42:
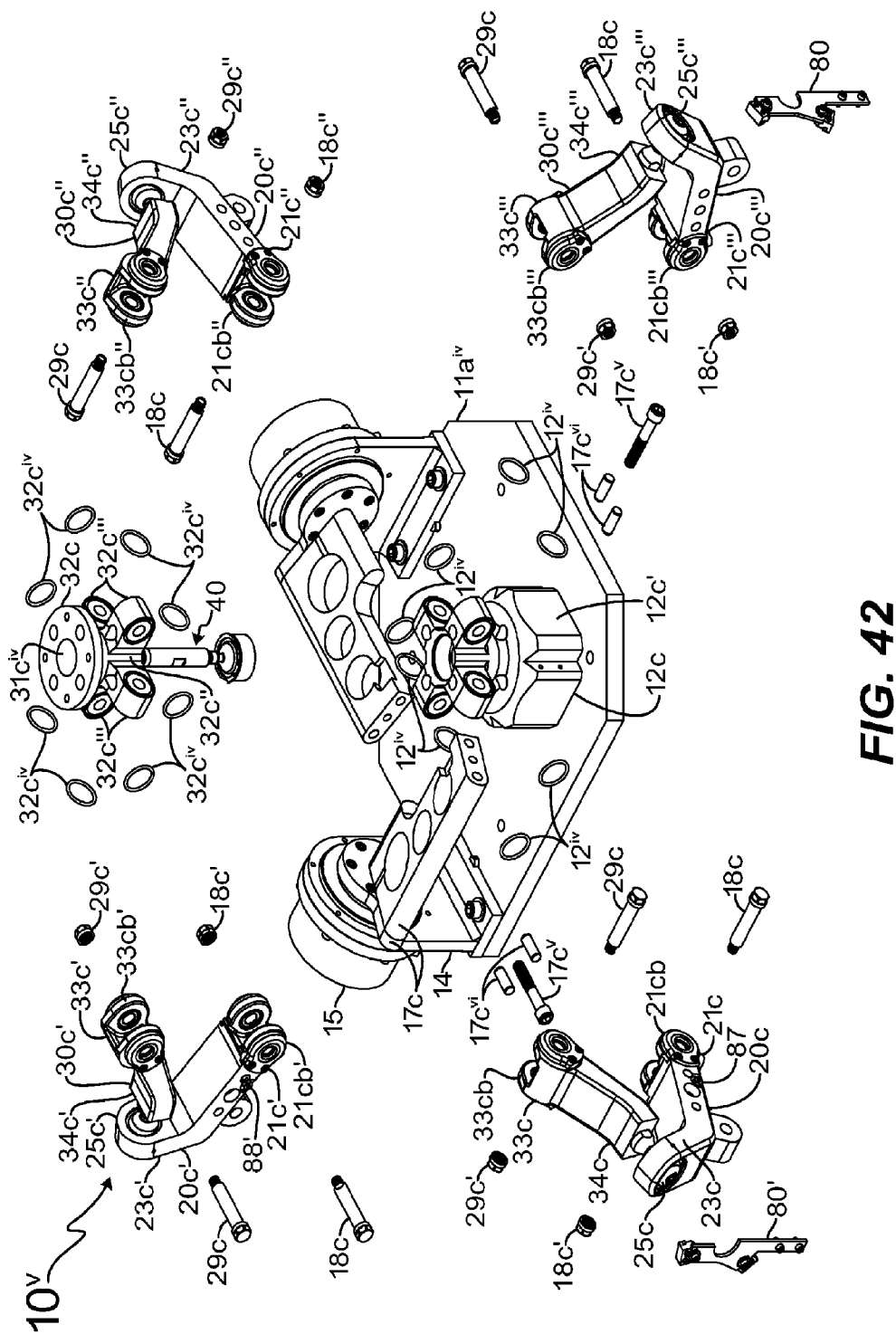
FIG. 42 shows an exploded view of the remaining portion of the embodiment shown in FIGS. 38 and 39 beyond that which was shown in FIGS. 40 and 41.

Manipulator 10$^v$ is again positioned on a mounting arrangement in being directly supported on the outer surface of a further modified base structure, 11$^v$, as shown in FIGS. 40, 41 and 42. This base structure has generally a rectangular shaped base plate, 11a$^{iv}$, with a generally flat outer surface but with three chamfered corners and a right angle corner. There are two keyways extending into the plate from the flat surface and extending perpendicularly from a corresponding plate side. The first keyway is adjacent the right angle corner and the second one is around the chamfered corner on its left at about the midpoint of that next side past this chamfered corner. Two keys, 11b$^{iv}$, are each fitted into a corresponding one of these keyways so as to leave a portion thereof above the flat surface, and fastened there by a corresponding pair of screws, 11c$^{iv}$, extending through its key into threaded openings in the plate at the bottoms of the keyways.

A manipulator base support, 12c, is carried on the plate outer surface of base plate 11a$^{iv}$, and is shown generally shaped as an initial rectangular base block shell structure, 12c', with inwardly notched corners, inward from the outside, if viewed in a cross section parallel to the plate outer surface. The support has substantially flat sides between these corner notches, this support extending outward from base 11a$^{iv}$ along an extension axis typically perpendicular to the flat outer surface of base 11a$^{iv}$ in these figures. The flat sides of block shell structure 12c' are shown parallel to the generally symmetrical extension axis of base support 12c in their outward (or upward) extensions from base plate 11a$^{iv}$, although different geometrical shapes can be used. A flattened base mating surface of the base support is against the outer surface of the base plate. A plurality of screws, 11d$^{iv}$, each inserted through a corresponding one of a plurality of smaller openings in base $11a^{iv}$, symmetrically positioned across from the corners of block shell structure $12c'$, and into corresponding threaded openings in the block shell structure at the adjacent flattened base mating surface thereof. A pair of dowels, $11^{iv}$, each between two of screws $11e$ and each across the width of the block structure from one another, are each inserted through a corresponding one of a pair of smaller openings in base $11a^{iv}$ and also into a corresponding one of two openings in the block shell structure at the adjacent flattened base mating surface thereof.

Support $12c$ has a central opening, $13c$, extending vertically in these figures along the extension axis of support $12c$ to parallel the outer four sides thereof. Opening $13c$ thus extends through block shell structure $12c'$ of support $12c$ and from there through base plate $11a^{iv}$ to result in screws $11d^{iv}$ being symmetrically positioned thereabout. Also, there are four circular routing openings, $13c'$, through block shell structure $12c'$ each located between opening $13c$ and a corresponding one of the four flat sides of the block structure with each also being across from the midline of that side parallel to the support extension axis. The axes of symmetry of each of routing openings $13c'$ are also parallel to the support extension axis.

Figure 43:
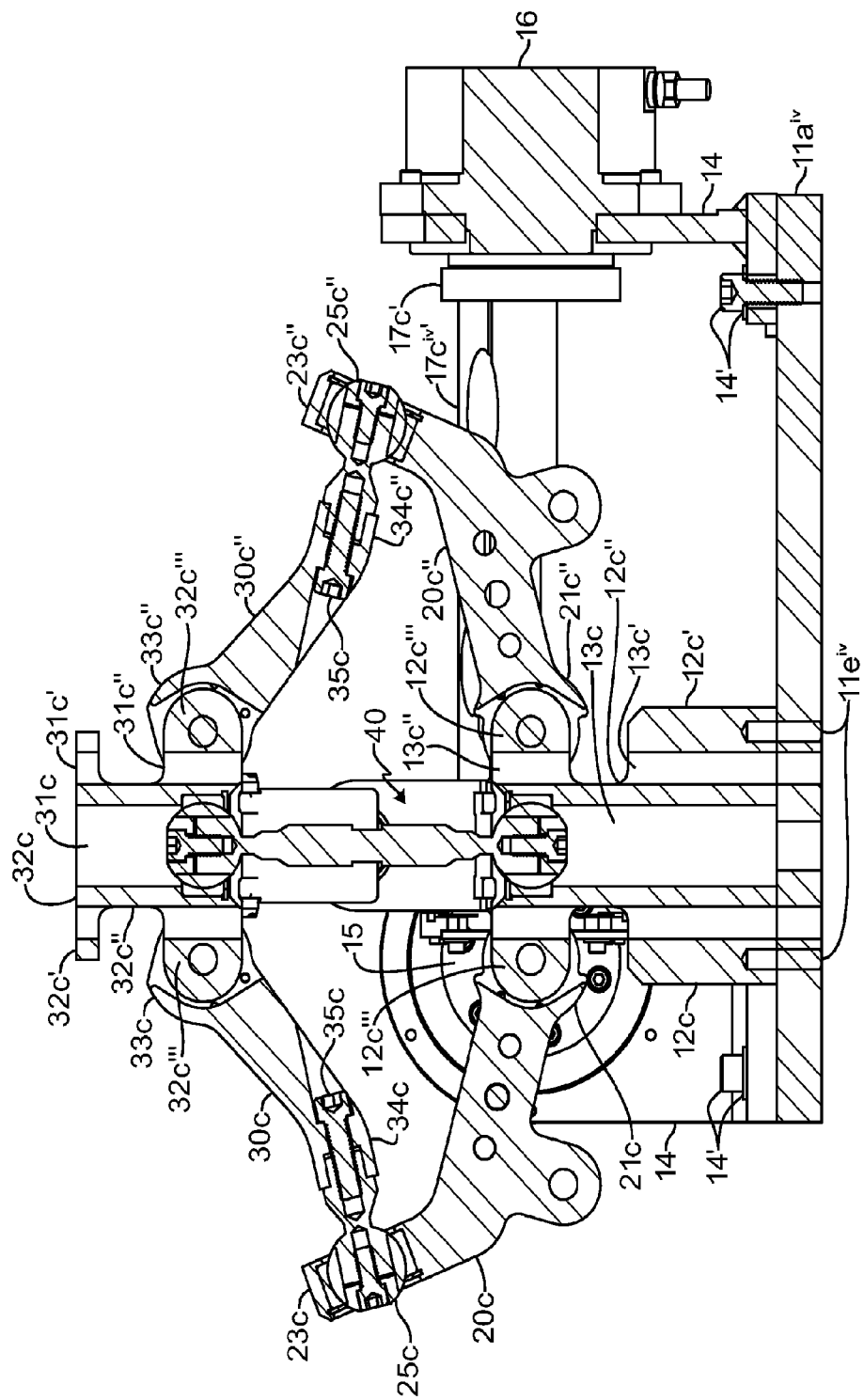
FIG. 43 shows a cross section view of the embodiment shown in FIGS. 38 and 39 as this view is indicated in FIG. 39.
Figure 44:
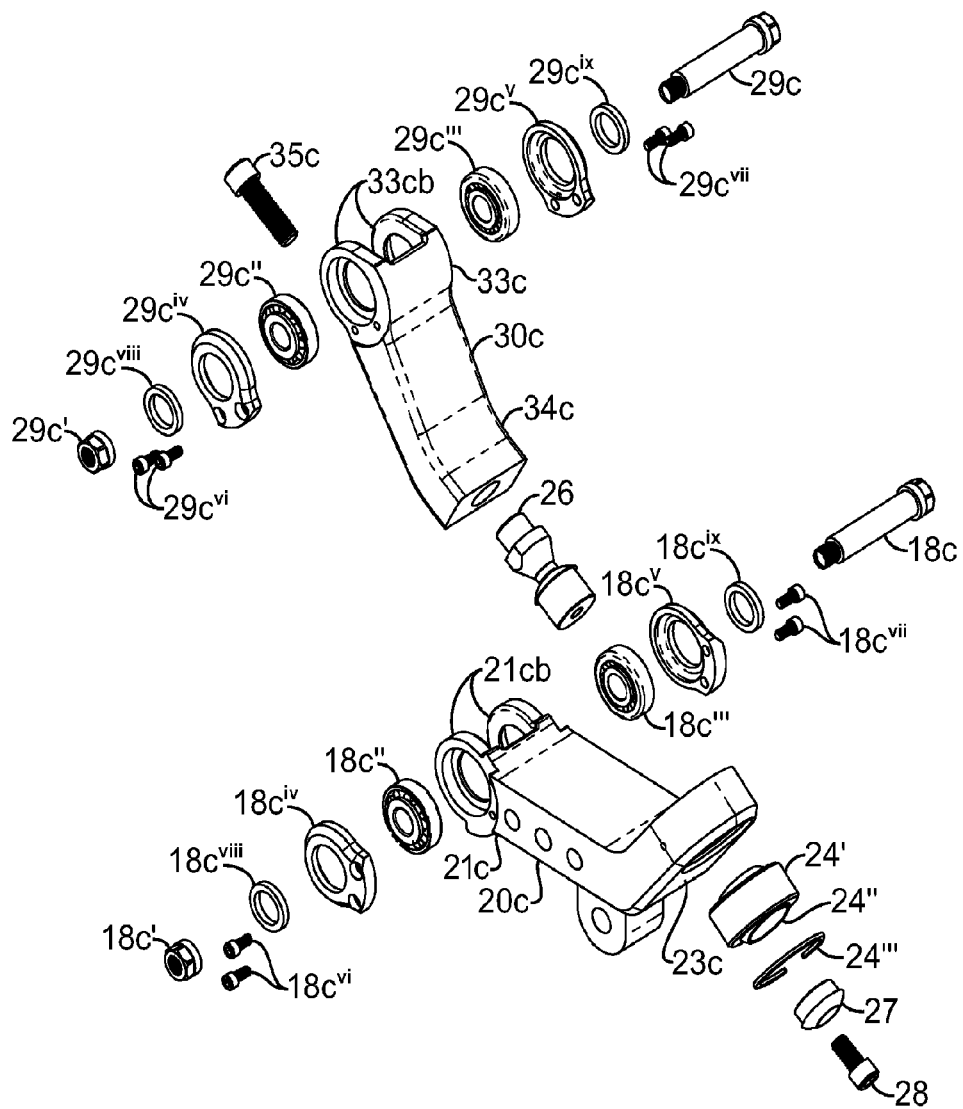
FIG. 44 shows an exploded view of a portion of the embodiment shown in FIGS. 38 and 39 and in the cross section view shown in FIG. 43.
Figure 45:
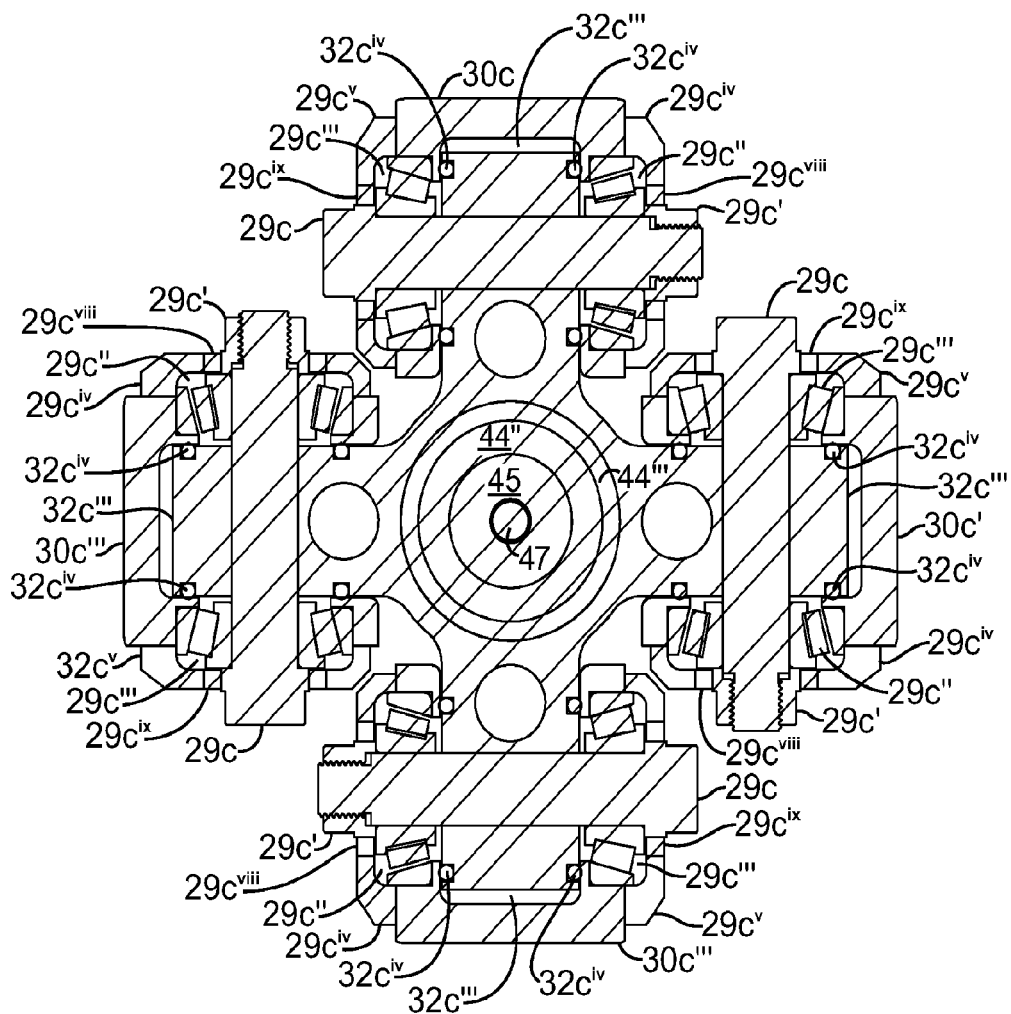
FIG. 45 shows a cross section view of the embodiment shown in FIGS. 38 and 39 as this view is indicated in FIG. 39.
Figure 46:
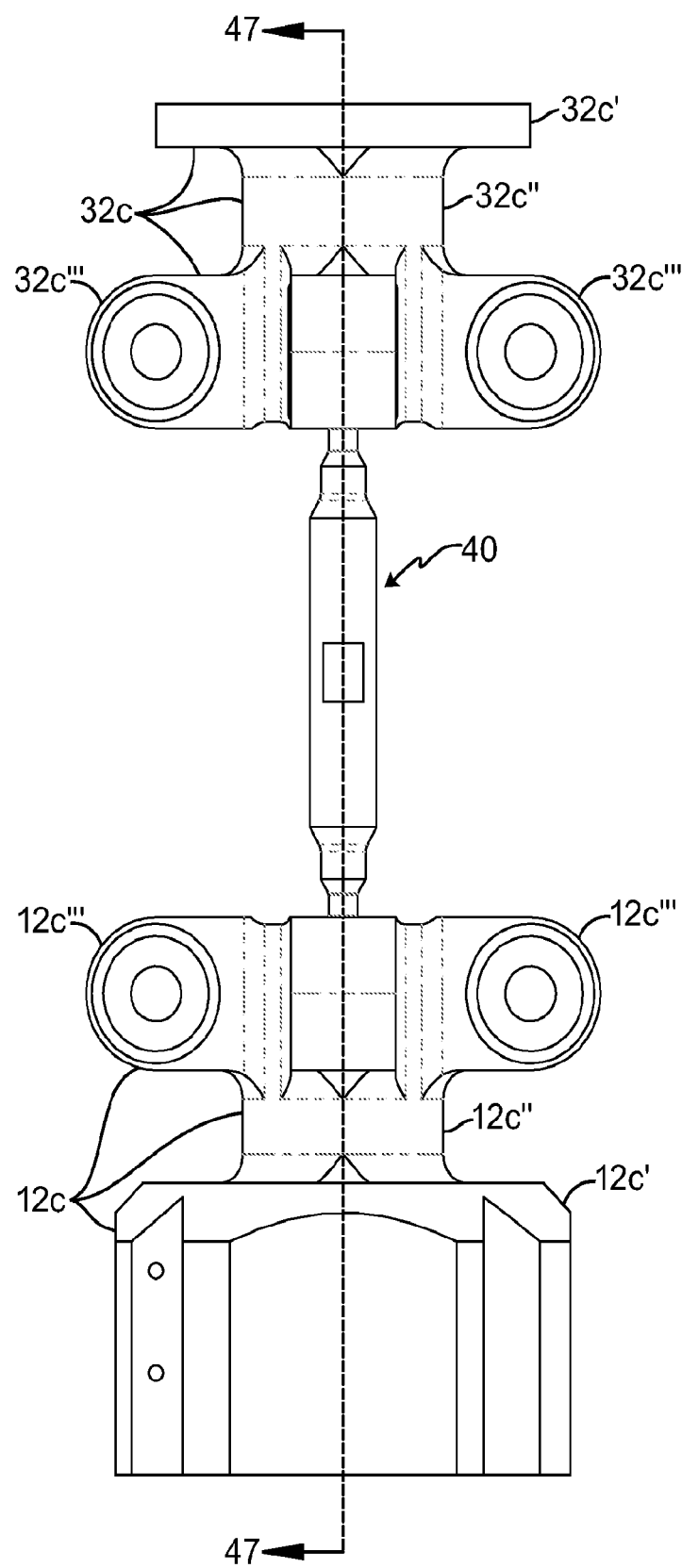
FIG. 46 shows an elevation view of a portion of the embodiment shown in FIGS. 38 and 39 and in the cross section view shown in FIG. 43.
Figure 47:
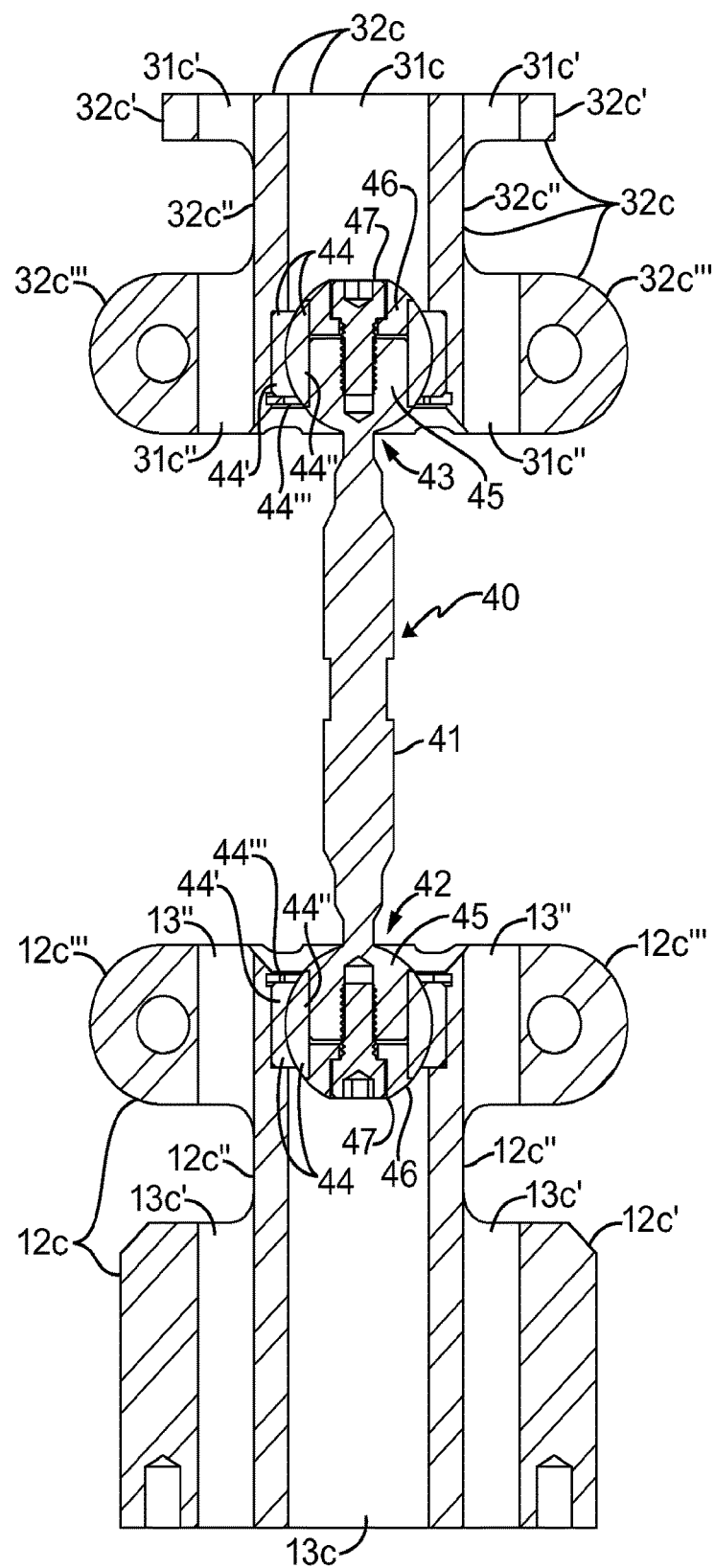
FIG. 47 shows a cross section view of the portion of the embodiment shown in FIG. 46.

In addition, block shell structure $12c'$ has, on the side thereof opposite base $11a^{iv}$, a base spacing ring, $12c''$, extending from the shell walls of the block structure so as to be symmetrically positioned about the extension axis of base support $12c$ which also extends through the interior opening of the ring as the axis of symmetry therefor as seen in the cross section view of FIG. 43. Extending laterally from spacing ring $12c''$, and perpendicularly to the extension axis of base support $12c$, at the end of the ring opposite the block shell structure are four base pivot ring bosses, $12c'''$, each being across from the edge midpoint of the adjacent edge of a corresponding one of the four flat sides of block shell structure $12c'$.

Each of base pivot ring bosses $12c'''$ has a circular pivot opening extending from side to side thereof extending parallel to the outer surface of base plate $11a^{iv}$, and so about an axis of symmetry that is perpendicular to extension axis of base support $12c$ and also parallel to a tangent to the closest point of interior opening of base spacing ring $12c''$. A pair of circular channels, having one member on each side of each of base pivot ring bosses $12c'''$, has each of those members surrounding a corresponding one of the two ends of the circular pivot opening through that boss. One of a plurality of elastomeric "O-rings", $12c^{iv}$, is positioned in each of the base pivot ring channels. Further, each of base pivot ring bosses $12c'''$ has a circular routing opening, $13c''$, extending therethrough parallel to the support extension axis and each located between opening $13c$ and the circular pivot opening of that boss with an axis of symmetry coincident with that of a corresponding one of routing openings $13c'$.

Further, shown supported directly on base plate $11a^{iv}$, as in the manner previously shown above, is the pair of rotary actuator support pedestals 14 each again shown supporting a rotary electric motor along with the direct mechanical interconnection between that electric motor and the remaining portions of manipulator $10^v$. Each of pedestals 14 has a groove in the surface of the base thereof facing base plate $11a^{iv}$, and which fits over the corresponding one of keys $11b^{iv}$ to thereby aid in keeping the pedestal in the desired alignment thereof on the base plate. There are shown for each of pedestals 14 a plurality of screws and corresponding lock washers, 14', with each screw inserted through its lock washer and a corresponding one of a plurality of openings in the pedestal base on either side of the groove therein. Base plate $11a^{iv}$ has threaded openings therein at the desired locations of those pedestals thereon and which correspond to the openings in the pedestal base. Screws 14' are inserted through these openings in the pedestal base to be screwed into these threaded base plate openings so that these screws fasten pedestals 14 to base plate $11a^{iv}$.

Each of the pair of "pancake" type electric motors 15 and 16 is mounted in a motor mounting opening in the corresponding one of pedestals 14 by the corresponding one of two pluralities of screws, 15' and 16'. These screws are inserted through evenly spaced circumferential openings in the mounting plates in the outer casings of these motors to be screwed into corresponding threaded smaller pedestal openings peripheral to the motor mounting opening in a pedestal so that these screws fasten the associated motor to the corresponding one of pedestals 14.

Each of electric motors 15 and 16 has a motor revolutions output disk, 15" and 16", respectively, to each of which there is fastened by a corresponding one of two pluralities of screws, 15''' and 16''', respectively, a corresponding one of two rotary output transferors, $17c$. A first rotary transferor $17c$ is fastened to electric motor 15, and includes a crank arm projection mating disk, $17c'$, affixed by a pair of screws, $17c''$, and a pair of dowels, $17c'''$, to one end of a generally rectangular plate shaft, $17c^{iv}$. Crank arm projection mating disk $17c'$ has a flat sided circular portion with a flat plate as a crank arm extending laterally outward therefrom parallel to a diameter of the circular portion. Evenly spaced circumferential circular openings in the mating disk circular portion each has a screw $15'''$ inserted therethrough into a corresponding threaded opening in output disk 15" to affix mating disk $17c'$ to output disk 15". Four circular openings are in and aligned along the crank arm plate, and further extend to the center of the mating disk circular portion. Each of the two middle openings has a screw $17c''$ inserted therethrough into a corresponding threaded opening in the end of plate shaft $17c^{iv}$ between the major flat sides thereof. These screws are supplemented by dowels $17c'''$ inserted into the openings in mating disk $17c'$ on either side of these middle openings in the mating disk and into a corresponding opening in the end of plate shaft $17c^{iv}$ between the major flat sides thereof to thereby together affix mating disk $17c'$ to plate shaft $17c^{iv}$.

Plate shaft $17c^{iv}$ is shaped as a relatively wide plate to provide it with rigidity against twisting when being rotated but with some holes through the plate in the interior of that width to reduce the weight thereof. The edge of the plate at the far end, or opposite end thereof, on the side closest to the motor rotor is set back from the edge at the near end to narrow the width of that end to reduce what is covered by that end in that to which it is fastened.

The opposite end of plate shaft $17c^{iv}$, between the two major flat surfaces thereof, is affixed by a screw, $17c^v$, and a pair of dowels, $17c^{vi}$, to the side of a base pivoting link, $20c$, that, in turn, is rotatably connected at an end thereof, $21c$, to a corresponding one of base pivot ring bosses $12c'''$ of base support $12c$. The connection arrangement components seen in the exploded view of FIG. 44 comprises a link bolt, $18c$, having a link nut, $18c'$, screwed selectively tight on a threaded end thereof, that extends through a pair of tapered roller bearings, $18c''$ and $18c'''$, and through corresponding bearing retainers, $18c^{iv}$ and $18c^v$, that hold bearings $18c''$ and $18c'''$ in the circular pivot opening of a corresponding one of a pair of spaced apart link pivot ring bosses, $21cb$, positioned on either side of the base pivot ring boss $12c'''$. The link pivot ring bosses $21cb$ extend outward from end $21c$ of link $20c$, parallel to the direction of extent of adjacent portions of that link, one from the side of the link to which plate shaft $17c^{iv}$ is affixed and one from the other side of the link. Together this pair forms a yoke with each member positioned on the opposite sides of the corresponding one of base pivot ring bosses $12c'''$.

The circular pivot openings of each of link pivot ring bosses $21cb$ has the walls thereof about these openings with a small inward extending edge ring at the sides of the bosses nearest each other to slightly reduce the diameter of the openings there. The circular pivot opening and the edge ring opening each have a coincident axis of symmetry that is also coincident with the axis of symmetry of the circular pivot opening in the base pivot ring boss $12c'''$ positioned between them. Bearing $18c''$ is positioned against the ring edge in the circular pivot opening in the link pivot ring boss $21cb$ on the side of link $20c$ affixed to plate shaft $17c^{iv}$. This bearing is held there by a ring portion of bearing retainer $18c^{iv}$ that is fastened to link pivot ring boss $21cb$ by two screws, $18c^{vi}$, extending through a base portion of bearing retainer $18c^{iv}$ peripheral to the ring portion thereof and into corresponding threaded openings in that link pivot ring boss. A shaft seal, $18c^{viii}$, is positioned around the head of link nut $18c'$ in bearing retainer $18c^{iv}$ to seal bearing $18c''$ from the outside.

Similarly, bearing $18c'''$ is positioned against the ring edge in the circular pivot opening in the link pivot ring boss $21cb$ on the side opposite to the side of link $20c$ affixed to plate shaft $17c^{iv}$. This bearing is held there by a ring portion of bearing retainer $18c^v$ that is fastened to that link pivot ring boss $21cb$ by two screws, $18c^{vii}$, extending through a base portion of bearing retainer $18c^v$ peripheral to the ring portion thereto and into corresponding threaded openings in that link pivot ring boss. A shaft seal, $18c^{ix}$, is positioned around link bolt $18c$ in bearing retainer $18c^v$ to seal bearing $18c'''$ from the outside. Link bolt $18c$ extends through each of the circular pivot openings and each of the ring edge openings of link pivot ring bosses $21cb$ inside of the bearings provided there, and through the corresponding base pivot ring bosses $12c'''$ as indicated above. Selected tightening of link nut $18c'$ on link bolt $18c$ to provide a selected preload on the bolt, and on bearings $18c''$ and $18c'''$, to take up unavoidable clearances in bearings $18c''$ and $18c'''$ so that the roller bearings therein rotate true, and also determines the loading of bearings $18c''$ and $18c'''$ against link pivot ring bosses $21cb$, and so of them against base pivot ring boss $12c'''$ therebetween, to thereby adjust the frictional drag during rotations to reduce or eliminate rotational backlash.

The end of plate shaft $17c^{iv}$, affixed to the side of base pivoting link $20c$ as indicated above, is positioned against the side of that link starting near end $21c$ of this link and continuing along the link to near the middle of the extent of the link. Link $20c$ extends generally straight in length from its link pivot ring bosses $21cb$ in an initial plane that includes the center and a diameter of each of the two circular pivot openings in those bosses to a point past half the length of link $20c$ where it bends into a final plane parallel to the common axis of symmetry of the two pivot openings at an angle to the initial plane of around half a right angle (plus or minus 10 degrees). A suitable value for this angle, as an example, is about 53°. The remainder of link $20c$ extends from this bend to an opposite end, $23c$, of that link in which end there is provided a spherical section capture opening. This spherical section capture opening has an axis of rotational symmetry that extends in a direction perpendicular to the direction of the common symmetry axis of the pivot openings in link pivot ring bosses $21cb$ of that link.

Link $20c$ has three evenly spaced circular openings across from, and aligned along the width of, this end of plate shaft $17c'''$, and the middle opening has a screw $17c^v$ inserted therethrough into a corresponding threaded opening in the end of plate shaft $17c^{iv}$ between the major flat sides thereof. This screw is supplemented by two dowels $17c^{vi}$ inserted into the openings in link $20c$ on either side of the middle opening in link $20c$ and into a corresponding opening in the end of plate shaft $17c^{iv}$ between the major flat sides thereof to thereby together affix link $20c$ to plate shaft $17c^{iv}$. Rotation by the rotor in electric motor $15$ clockwise or counterclockwise causes plate shaft $17c^{iv}$ to rotate in a corresponding angular direction which in turn causes link $20c$ to correspondingly rotate about the common axis of symmetry of the pivot openings in link pivot ring bosses $21cb$ of that link, and of the pivot opening in of base pivot ring boss $12c'''$ therebetween, that is more or less perpendicular to the length of link $20c$.

A similar electric motor rotational drive system for forcing rotational motion of another pivoting link is provided in connection with electric motor $16$. The other of the two rotary transferors $17c$ is connected to motor revolutions output disk $16''$ of motor $16$ by a plurality of screws $16'''$ extending through openings in corresponding crank arm projection mating disk $17c'$, and also affixed by a pair of screws $17c''$ and a pair of dowels $17c'''$ to one end of a generally rectangular plate shaft $17c^{iv}$. The opposite end of plate shaft $17c^{iv}$, between the two major flat surfaces thereof, is affixed by screw $17cv$, and a pair of dowels $17c^{vi}$ to the side of a further base pivoting link, $20c'$, that, in turn, is rotatably connected at an end thereof, $21c'$, to a corresponding one of base pivot ring bosses $12c'''$ of base support $12c$.

This rotatable connection is again provided, as above for motor $15$, by a link bolt $18c$ having a link nut $18c'$ screwed selectively tight on a threaded end thereof extending through a pair of tapered roller bearings $18c''$ and $18c'''$. This bolt also extends through corresponding bearing retainers $18c^{iv}$ and $18c^v$ that hold bearings $18c''$ and $18c'''$ in the circular pivot opening of a corresponding one of a pair of spaced apart link pivot ring bosses, $21cb'$, positioned as a yoke on either side of the corresponding base pivot ring boss $12c'''$.

Link $20c'$ is thus also rotatable about the axis of rotational symmetry of corresponding base link bolt $18c$. Hence, here too, rotation of the rotor of electric motor $16$ in either the clockwise or counterclockwise direction forces pivoting link $20c'$ to correspondingly rotate in either a clockwise or counterclockwise direction just as motor $15$ can rotate pivoting link $20c$. The transferor part designations are the same for this second transferor $17c$ as they were for the parts in the transferor used with motor $15$, and the parts designations for link $20c'$ are the same as for link $20c$ with the addition of a prime mark thereafter.

Link $20c'$ also extends generally straight in length from its link pivot ring bosses $21cb'$ in an initial plane that includes the center and a diameter of each of the two circular pivot openings in those bosses to a point past half the length of link $20c'$ where it bends into a final plane parallel to the common axis of symmetry of the two pivot openings at an angle to the initial plane of around half a right angle (plus or minus 10 degrees) again suitably an angle, as an example, of about 53°. The remainder of link $20c'$ also extends from this bend to an opposite end, $23c'$, of that link in which end there is provided a spherical section capture opening. This spherical section capture opening has an axis of rotational symmetry that extends in a direction perpendicular to the direction of the common symmetry axis of the pivot openings in link pivot ring bosses $21cb'$ of that link.

Pivoting links $20c$ and $20c'$ are two in a plurality of base portion side pivoting links in manipulator $10^v$, or lower side pivoting links in the figures, this plurality further including two other similar pivoting links, 20*c*" and 20*c*'". These pivoting links, although not connected to another motor, are also each capable of being rotatably connected at an end thereof, 21*c*" or 21*c*'", to a corresponding one of base pivot ring bosses 12*c*'" of base support 12*c*. These rotatable connections are again provided by a corresponding link bolt 18*c* having a link nut 18*c*' screwed selectively tight on a threaded end thereof extending through a pair of tapered roller bearings 18*c*" and 18*c*'", and through corresponding bearing retainers 18*c*$^{iv}$ and 18*c*$^{v}$ that hold bearings 18*c*" and 18*c*'" in the circular pivot opening of a corresponding one of a pair of spaced apart link pivot ring bosses, 21*cb*" or 21*cb*'", of the corresponding link positioned as a yoke on either side of the corresponding base pivot ring boss 12*c*'". Links 20*c*" and 20*c*'" are thus also rotatable about the axis of rotational symmetry of a corresponding base link bolt 18*c*. Also, the shapes of links 20*c*" and 20*c*'" match that of links 20*c* and 20*c*' in extending to opposite ends thereof, 23*c*" and 23*c*'", where there are provided corresponding spherical section capture openings. The parts designations for links 20*c*" and 20*c*'" are the same as for link 20*c* with the addition of corresponding prime marks thereafter.

Each of the capture openings in ends 21*c*, 21*c*', 21*c*" and 21*c*'" of lower pivoting links 20*c*, 20*c*', 20*c*" and 20*c*'" in manipulator 10$^{v}$ has a corresponding ball portion and socket structure 24 with an outer ring 24' positioned therein about an inner ring 24" just like manipulator 10 of FIGS. 1 through 12. However, the capture openings each have the walls thereof about these openings with a small inward extending edge ring at the interior sides thereof to slightly reduce the diameter of the openings there, but each capture opening and the corresponding edge ring opening have a coincident axis of symmetry. The outer ring 24' of the corresponding ball portion and socket structure 24 is positioned in each spherical section capture against the edge ring and held there by a retaining ring, 24'", as described for an alternative above. Thus, there is thereby provided a portion of a corresponding one of the plurality of ball-and-socket joints, or spherical joints, 25*c*, 25*c*', 25*c*" and 25*c*'", between the corresponding one of the lower pivoting links 20*c*, 20*c*', 20*c*" and 20*c*'" and corresponding ones of upper pivoting links, to be further described below, just as in manipulator 10.

Each of spherical joints 25*c*, 25*c*', 25*c*" and 25*c*'" is again an assembly in which one end of link joint post 26 is fastened to inner ring 24" on one side of that ring, and spherical portion joining cap 27 is fastened thereto on the other side so as to face one another in this inner ring. They are held there in each joint by screw 28 that is positioned in the opening in cap 27 to be screwed into the threaded opening in the end of post 26 just as in manipulator 10. Shown as an alternative, the opposite end of these link joint posts 26 for each of these spherical joints has a smooth, rather than threaded, outer surface cylindrical portion, and instead has a threaded opening extending inward from the circular end surface along the axis of extent of the post. These joints, as spherical joints, each have three degrees of freedom in allowing pitch, yaw and roll rotations of joint post 26 with respect to the corresponding one of lower pivoting links 20*c*, 20*c*', 20*c*" and 20*c*'", providing a range of motion greater than 180 degrees in some embodiments.

Four rotation connection sets, each having a manipulator link bolt, 29*c*, shaped like link bolt 18*c*, a link nut, 29*c*', to be screwed selectively tight on a threaded end of the bolt in assembly, a pair of tapered roller bearings, 29*c*" and 29*c*'", corresponding bearing retainers, 29*c*$^{iv}$ and 29*c*$^{v}$, along with corresponding two pairs of screws, 29*c*$^{vi}$ and 29*c*$^{vii}$, and a pair of shaft seals, 29*c*$^{viii}$ and 29*e*, are each provided with a corresponding one of a plurality of manipulator side pivoting links, 30*c*, 30*c*', 30*c*" and 30*c*'", or upper side pivoting links in the figures. Each of such links extends from a corresponding one of spherical joints 25*c*, 25*c*', 25*c*" and 25*c*'". Each of the sets rotatably connects to a corresponding location adjacent a shell wall about an opening, 31*c*, in a manipulable support, 32*c*, a corresponding one of the ends, 33*c*, 33*c*', 33*c*" and 33*c*'", of the upper pivoting links through using a corresponding one of the pairs of spaced apart link ring bosses, 33*cb*, 33*cb*', 33*cb*" and 33*cb*'", provided there as seen in the cross section view of FIG. 45.

Manipulable support 32*c* is shown shaped generally as a circular disk, 32*c*', extending about central opening 31*c* and having flat major sides. Also, there are four circular routing openings, 31*c*', through disk 32*c*' each located between opening 31*c* and the circular outer periphery of the disk, and they are symmetrically positioned about that opening. The axes of symmetry of each of routing openings 13*c*' are parallel to the axis of symmetry of opening 31*c* which also serves generally as the axis of symmetry for manipulable support 32*c*.

In addition, circular disk 32*c*' has, on the flat side thereof facing base 11*a*$^{iv}$, a manipulable support spacing ring, 32*c*", extending perpendicularly from this flat side and symmetrically positioned about the extension axis of manipulable support 32*c* which also extends through the ring interior opening, as part of opening 31*c*, to be coincident with the axis of symmetry for manipulable support 32*c*. At the end of this ring opposite the circular disk, there are extending laterally from the shell walls of spacing ring 32*c*", and so perpendicularly to the extension axis of manipulable support 32*c*, four manipulable support pivot ring bosses, 32*c*'", each being across from a corresponding one of the four circular routing openings 31*c*'.

Each of manipulable support pivot ring bosses 32*c*'" has a circular pivot opening extending from side to side thereof to be parallel to the flat side of circular disk 32*c*', and so to have an axis of symmetry that is perpendicular to extension axis of manipulable support 32*c* and also parallel to a tangent to the closest point of interior opening of spacing ring 32*c*". Pairs of circular channels, each with a pair member on each side of each of a corresponding manipulable support pivot ring bosses 32*c*'", have each such pair member surrounding a corresponding one of the two ends of the circular pivot opening through that boss. One of a plurality of elastomeric "O-rings", 32*c*$^{iv}$, is positioned in each of the manipulable support pivot ring channels. Further, each of manipulable support pivot ring bosses 32*c*'" has a circular routing opening, 31*c*", extending therethrough parallel to the support extension axis and each located between opening 31*c* and the circular pivot opening of that boss with an axis of symmetry coincident with that of a corresponding one of routing openings 31*c*' from which it is across.

The rotatably connected manipuable support ends 33*c*, 33*c*', 33*c*" and 33*c*'" of links 30*c*, 30*c*', 30*c*" and 30*c*'", respectively, each have a corresponding one of the pairs of spaced apart link ring bosses 33*cb*, 33*cb*', 33*cb*" and 33*cb*'" extending therefrom parallel to the direction of extent of the adjacent portion of the link with the pair members each having a circular pivot opening therein, just as do the lower pivoting links. The circular pivot openings in each member of each of the pairs of spaced apart link pivot ring bosses link ring bosses 33*cb*, 33*cb*', 33*cb*" and 33*cb*'" have the walls thereof about these openings with a small inward extending edge ring at the sides of the bosses nearest each other to slightly reduce the diameter of the openings there. The circular pivot opening and the edge ring opening of both boss pair members each have a coincident axis of symmetry that is also coincident with the axis of symmetry of the circular pivot opening in the manipulable support pivot ring boss $32c'''$ positioned between them.

Each of the rotation connection sets rotatably connects an end $33c$, $33c'$, $33c''$ and $33c'''$ of a corresponding one of links $30c$, $30c'$, $30c''$ and $30c'''$ to the corresponding location on the spacing ring shell wall about opening $31c$ provided by a corresponding one of manipulable support pivot ring bosses $32c'''$. Each such rotation connection has a link bolt $29c$, with link nut $29c'$ screwed selectively tight on a threaded end thereof, extending through bearings $29c''$ and $29c'''$ positioned in the circular pivot opening against its ring edge of a corresponding one of the pairs of spaced apart link pivot ring bosses $33cb$, $33cb'$, $33cb''$ and $33cb'''$ positioned on either side of the corresponding one of manipulable support pivot ring bosses $32c'''$. These bolts also extend through corresponding bearing retainers $29c^{iv}$ and $29c^v$ that hold bearings $29c''$ and $29c'''$ by the ring portions thereof in the circular pivot opening of the corresponding one of these pairs of spaced apart link pivot ring bosses. Bearing retainers $29c^{iv}$ and $29c^v$ are fastened to the corresponding link pivot ring boss by a corresponding one of the two pairs of screws $29c^{vi}$ and $29c^{vii}$, respectively, extending through a base portion of the bearing retainers and into corresponding threaded openings in that link pivot ring boss. Shaft seal $29c^{ix}$ is positioned around the head of link bolt $29c$ in bearing retainer $29c^{iv}$, and shaft seal $29c^{viii}$ is positioned around link nut $29c'$ in bearing retainer $29c^v$ to seal bearings $29c''$ and $29c'''$ from the outside.

Each of the pairs of spaced apart link pivot ring bosses link ring bosses $33cb$, $33cb'$, $33cb''$ and $33cb'''$ forms a yoke through having each pair member positioned on the opposite sides of the corresponding one of manipulable support pivot ring bosses $32c'''$. This connection arrangement allows each of links $30c$, $30c'$, $30c''$ and $30c'''$ to rotate with respect to manipulable support $32c$ about the corresponding one of link bolts $29c$ and the common axis of rotational symmetry extending through each of the circular pivot openings and each of the ring edge openings of the pair of link bosses through which this bolt extends.

Each of upper pivoting links $30c$, $30c'$, $30c''$ and $30c'''$ extends from a corresponding one of spherical joints $25c$, $25c'$, $25c''$ and $25c'''$ through having a post opening in a corresponding spherical joint end of this link, $34c$, $34c'$, $34c''$ and $34c'''$, this opening in each upper link extending parallel to the general length of the adjacent portion of the link, and into which opening is positioned an end of corresponding joint post $26$. This is end of the post with the smooth cylindrical outer surface that is opposite that end thereof assembled in the corresponding spherical joint. This smooth cylindrical outer surface portion of the post end joins in the post to a larger cross section bolt portion thereof at a bolt portion lateral flat ring surface with this latter surface being positioned against the spherical joint end of the corresponding upper pivoting link.

A further upper link opening, a post fastener opening, is provided in the corresponding link at the outer side of a bend in the link to be described below, this opening having its diameter further into the link being reduced by a narrowing ring portion located just before opening to the link post opening, the post fastener, ring and post openings all sharing a common axis of symmetry. Each of upper pivoting links $30c$, $30c'$, $30c''$ and $30c'''$ is fastened to its corresponding post $26$ by a screw, $35c$, inserted through the post fastener and ring openings in the link into the threaded opening in smooth cylindrical outer surface portion of that post end. As described above, each post $26$ extends from joint inner ring $24''$ held in outer ring $24'$ in a corresponding one of spherical joints $25c$, $25c'$, $25c''$ and $25c'''$, and one such outer ring is captured in the spherical section capture opening at each ends $23c$, $23c'$, $23c''$ and $23c'''$ of corresponding ones of lower pivoting links $20c$, $20c'$, $20c''$ and $20c'''$ each serving as a socket.

Each of upper pivoting links $30c$, $30c'$, $30c''$ and $30c'''$ extends generally in length from its post opening in its spherical joint end along an initial plane in a straight line over an initial length portion, and then curves or angles outward to manipuable support $32c$ to extend to the corresponding one of ends $33c$, $33c'$, $33c''$ and $33c'''$ in a straight line in a final plane at an angle to the initial plane. The angle, or other relatively similar angles, between these planes is about a quarter of a right angle (plus or minus 10 degrees) with a suitable choice being about 25°. The angle, or other relatively similar angles, for the plane in which the wall about a lower pivoting link spherical section capture opening is included, relative to that link, and the joint link end of the corresponding upper pivoting link, are selected not only to aid in clearances, as stated above, but also to aid those links in achieving a large range of relative rotation positions with respect to one another. With manipulable support $32c$ positioned directly over base support $12c$ so that the axes of symmetry of openings $13c$ and $31c$ coincide, the rotatable connections of ends $33c$, $33c'$, $33c''$ and $33c'''$ of upper pivoting links $30c$, $30c'$, $30c''$ and $30c'''$ are each intersected by a corresponding axis parallel to these coinciding axes of symmetry of openings $13c$ and $31c$ which also intersects the rotatable connection of the corresponding one of ends $21c$, $21c'$, $21c''$ and $21c'''$ of lower pivoting links $20c$, $20c'$, $20c''$ and $20c'''$.

Manipulable support $32c$ is also supported by tiltable and rotatable column structure $40$ with respect to base support $12c$ insofar as maintaining a separation therebetween, just as was manipulator $10$ in FIGS. $1$ through $12$ though with some slight changes. Column structure $40$, shown separated from much of the remainder of the manipulator in FIGS. $46$ and $47$, has a cylinder $41$, formerly a cylindrical shell, as a generally cylindrical shaft here. Cylindrical shaft $41$ again forms ball-and-socket, or spherical, joint $42$ at one end thereof together with base support $12c$ in opening $13c$ thereof, and again forms ball-and-socket, or spherical, joint $43$ at the other end thereof together with manipulable support $32c$ in opening $31c$ thereof.

Spherical joints $42$ and $43$ are again like spherical joints $25c$, $25c'$, $25c''$ and $25c'''$ except, instead of the spherical section capture openings at ends $23c$, $23c'$, $23c''$ and $23c'''$ of lower pivoting links $20c$, $20c'$, $20c''$ and $20c'''$, there is a base spherical section capture opening formed in opening $13c$ in the upper portion of base support $12c$ for joint $42$, and another spherical section capture opening formed in opening $31c$ in the lower portion of manipulable support $32c$ for joint $43$. Each of these openings holds a ball portion and socket structure, $44$, having an outer ring, $44'$, and having therein an inner ring, $44''$. A corresponding outer ring $44'$ is positioned in each of the base spherical section capture and manipulable spherical section capture support openings against a narrowed portion of each of those openings and now held there by a retaining ring, $44'''$. Toward each of the ends of cylindrical shaft $41$, the shaft narrows to a "neck" portion and then, expanding, extends to a ring holding stud, just as at the outer ends of posts $45$ in the column structure $40$ of manipulator $10$, which stud here is designated $45$ in providing the post function of this previous manipulator. Ring holding stud 45 has a threaded opening starting at the circular end surface thereof that extends into the stud parallel to the length of cylindrical shaft 41.

In spherical joints 42 and 43, cylindrical shaft 41 is fastened to inner ring 44" by having ring holding stud 45 positioned in a corresponding interior opening in that ring. A spherical portion joining cap, 46, has a cylinder portion inserted into the interior opening in inner ring 44" from the side of that ring, opposite the stud in the joint assembly, and with its flat circular end surface side closely adjacent to or against the circular flat surface side of the stud 45 just as in manipulator 10.

The opposite side of joining cap 46 is again a spherical segment portion that mates at an end thereof with the ring partial spherical outer surface of inner ring 44" when cap 46 is assembled in the open interior of the inner ring to thereby add to the spherical surface of the ball in the spherical joint. There is a circular opening provided through cap 46 sharing a common axis of symmetry with the threaded opening in ring holding stud 45. Stud 45 and cap 46 are held closely adjacent to or against one another, and maintained so, by a screw, 47, that is positioned in the opening in cap 46 to be screwed into the threaded opening in ring holding stud 45.

Joints 42 and 43, as spherical joints, each have three degrees of freedom in allowing pitch, yaw and roll rotations of cylindrical shaft 41, and ring holding studs 45 thereof, with respect to base support 12c and manipulable support 32c, respectively. Thus, rotations of lower pivoting links 20c and 20c', caused by motors 15 and 16 being directed to rotate their motor revolutions output disks to result in corresponding selected positionings of both lower link 20c" and 20c''', and of upper links 30c, 30c', 30c" and 30c''', and so of manipulable support 32c, are accompanied by rotations of column structure 40 in base 12c and rotations of manipulable support 32c on column structure 40 that, in general, do not limit the rotational positions selected for manipulable support 32.

Figure 48:
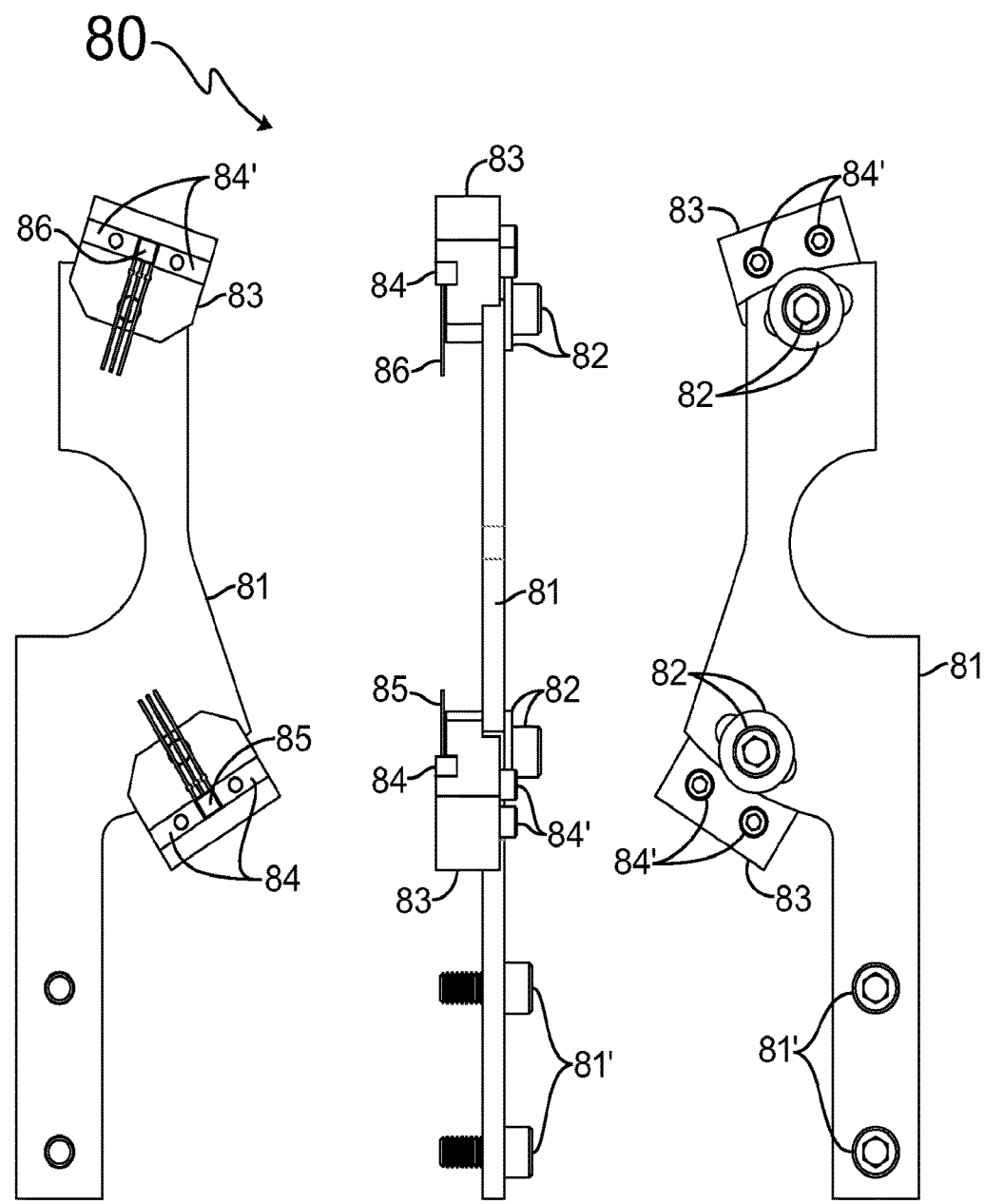
FIG. 48 shows three alternative elevation views of a portion of the embodiment shown in FIGS. 38 and 39.
Figure 49:
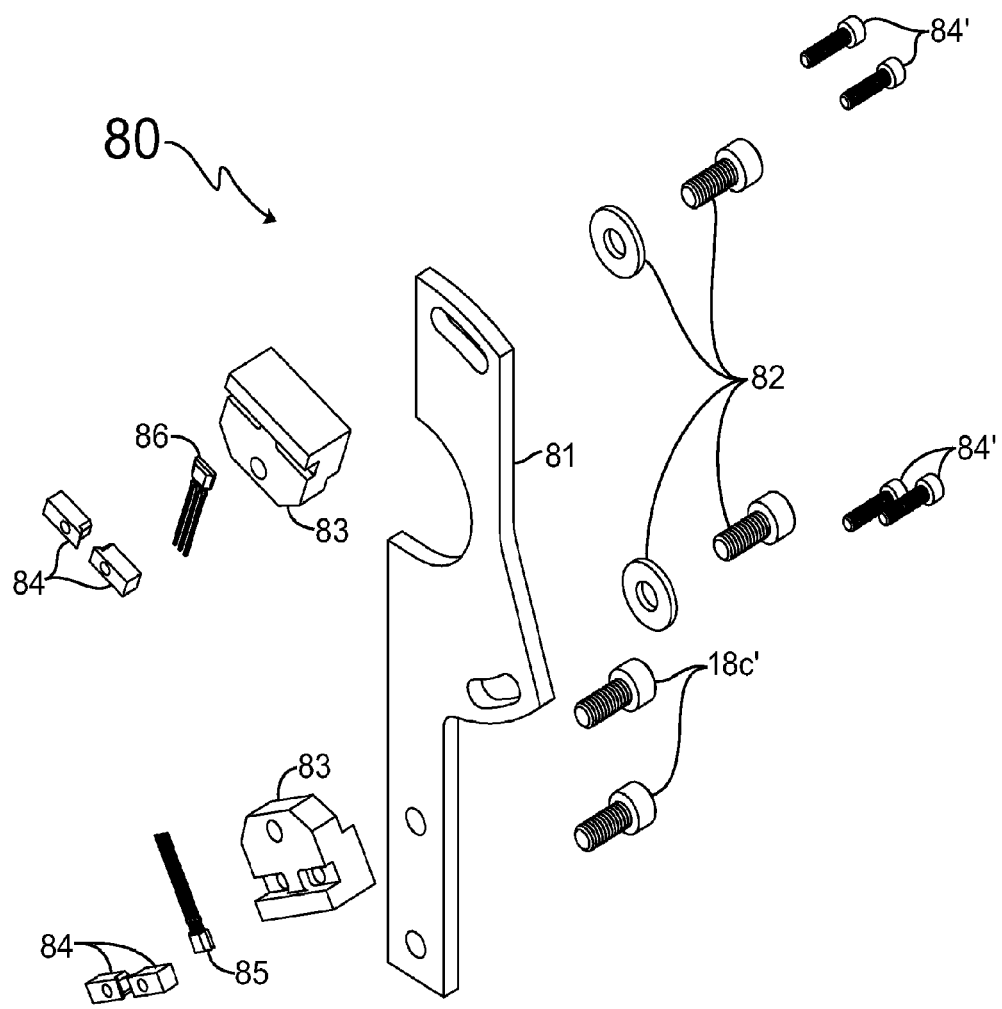
FIG. 49 shows an exploded view of the portion of the embodiment shown in FIG. 48.
Figure 50:
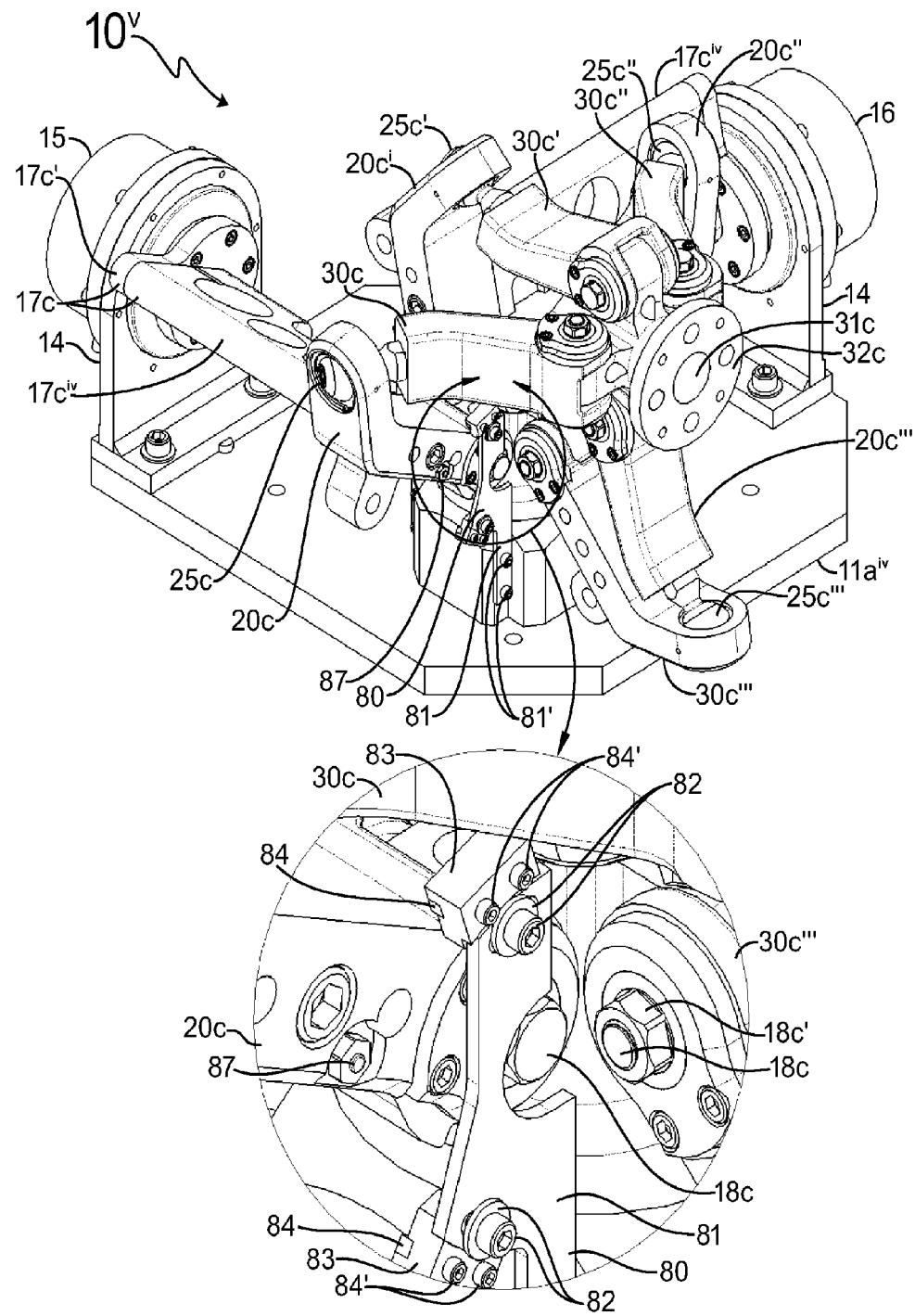
FIG. 50 shows a further perspective view of the embodiment shown in FIGS. 38 and 39, and a partial detail view of that embodiment.

A further capability is also shown in FIGS. 48, 49 and 50 for providing signals from sensors indicating when either of lower pivoting links 20c and 20c' have reached selected angular positions with respect to the corresponding one of base pivot ring bosses 12c''' to which it is rotatably connected. A pair of link position sensor arrangements, 80 and 80', each has a sensor support post plate, 81, with flat sides and having a mounting straight line extension therein with two circular openings through the plate. A pair of screws, 81', each of which extends through a corresponding one of these openings to then be in threaded openings on one side of two of the notched corners of block shell structure 12c' of base support 12c, thereby fasten the post plates to that structure. These sensor support posts 81 are in those notched corners fastened to a side thereof such that a corresponding one of lower pivoting links 20c and 20c' sweeps by a flat side of that sensor support post plate when rotated with respect to the corresponding one of base pivot ring bosses 12c''' to which it is rotatably connected.

The remaining portion of each of support post plates 81 is a "V" shaped, or double wing shaped, extension. This remaining extension has a semicircular void inward from the plate side across from the point of the "V" as a relief opening for the head of a corresponding link bolt 18c rotatably fastening the lower pivot link having its selected angular positions sensed by the sensor supported on that post. At the end of each arm of the "V" shape, or at the end of each wing shape, there is provided a sensor mount opening through the plate in the shape of a circular arc, these openings being a near arc opening closest to base plate base plate $11a^{iv}$ and a separated arc opening farther from that base plate.

The screw in each of a pair of screw and washer sets, 82, extends through the washer of the set and a corresponding one of the near and separated arc openings in the post plate into a threaded opening in a corresponding one of a pair of stepped thickness plate sensor mounting brackets, 83, having generally flat major side but with recesses therein with the opposite major side having the thickness step. Each such threaded opening begins extending into the bracket from the stepped side of the bracket at approximately the center of the thinner plate portion thereof on one side of the thickness step. The one of these brackets with the set 82 screw in it that extends through the near arc opening is a near sensor mounting bracket closest to base plate $11a^{iv}$, and the other bracket with the set 82 screw in it that extends through the separated arc opening is a separated sensor mounting bracket that is farther from that base plate. These set 82 screws fasten the corresponding one of the brackets to post 81 and, in doing so, permit some adjustment of the bracket position with respect to the post plate along the corresponding arc opening therein.

The other side of each sensor mounting bracket 83, in the thicker plate portion thereof on the other side of the thickness step, has two block screw openings extending through this thicker plate portion from the stepped side thereof to open into a corresponding one of two block recesses in the flat recessed side of the bracket located inward from opposite edges of the bracket on that side but separated by a mounting wall. Each recess is oblong in shape and positioned with its length extending along a common length axis that is parallel to the direction of lateral extent of the thickness step on the opposite side of the bracket.

Two pairs of stepped thickness side mounting blocks, 84, one pair in each bracket, are fastened in the bracket block recesses of its bracket by two pairs of screws, 84', with the side of the block with the thickness step facing the bracket. Each of screws 84' extends through a corresponding block screw opening in the bracket into a threaded opening in the thicker portion of the block on one side of the step to thereby fasten the thicker portion of each of blocks 84 to the corresponding bracket in a block recess therein. The thinner portion of each block resulting from the thickness step is across from the thinner portion of the other block in its bracket, and each of these thinner portions are spaced apart from the bracket mounting wall to leave two mounting spaces one between each thinner block portion and that bracket mounting wall.

A near magnetic field sensor, 85, is positioned in the two mounting spaces adjacent the mounting wall of the near sensor mounting bracket 84, and held against that mounting wall by the thinner portions of the two mounting blocks 84 fastened in the block recesses of that bracket. Similarly, a separated magnetic field sensor, 86, is positioned in the two mounting spaces adjacent the mounting wall of the separated sensor mounting bracket 84, and held against that mounting wall by the thinner portions of the two mounting blocks 84 fastened in the block recesses of that bracket. Suitable electrical interconnection wires extend from these sensors through which to provide electrical power and obtain electrical signals indicating that a sufficient magnetic field has occurred sufficiently near the sensor.

Such magnetic fields are intended to be provided by a pair of permanent magnets, 87 and 88, seen in the first instance in FIG. 50, and each positioned near that side of a corresponding one of lower pivoting links 20c and 20c', that can come closest to base plate $11a^{iv}$ during rotations thereof, and are also positioned in these links relatively near link ends 21c and 21c'. This positioning is accomplished by providing threaded openings at those positions in these links, and providing a screw in each such threaded opening with a central circular opening in the screw along its length in which is fastened a corresponding one of permanent magnets 87 and 88. Thus, when rotations of either of lower pivoting links 20c and 20c', during selected manipulator operations, brings the one of permanent magnets 87 and 88 therein sufficiently close to either of magnetic field sensors 85 or 86 in the adjacent one of link position sensor arrangements 80 and 80', corresponding electrical signals will be provided by the sensors to indicate such occurrences. Typically, link position sensor arrangements 80 and 80' are configure so that such occurrences come at or near the extremes of the angular positions of lower pivoting links 20c and 20c' about the corresponding one of base pivot ring bosses 12c''' to which it is rotatably connected.

Figure 51:
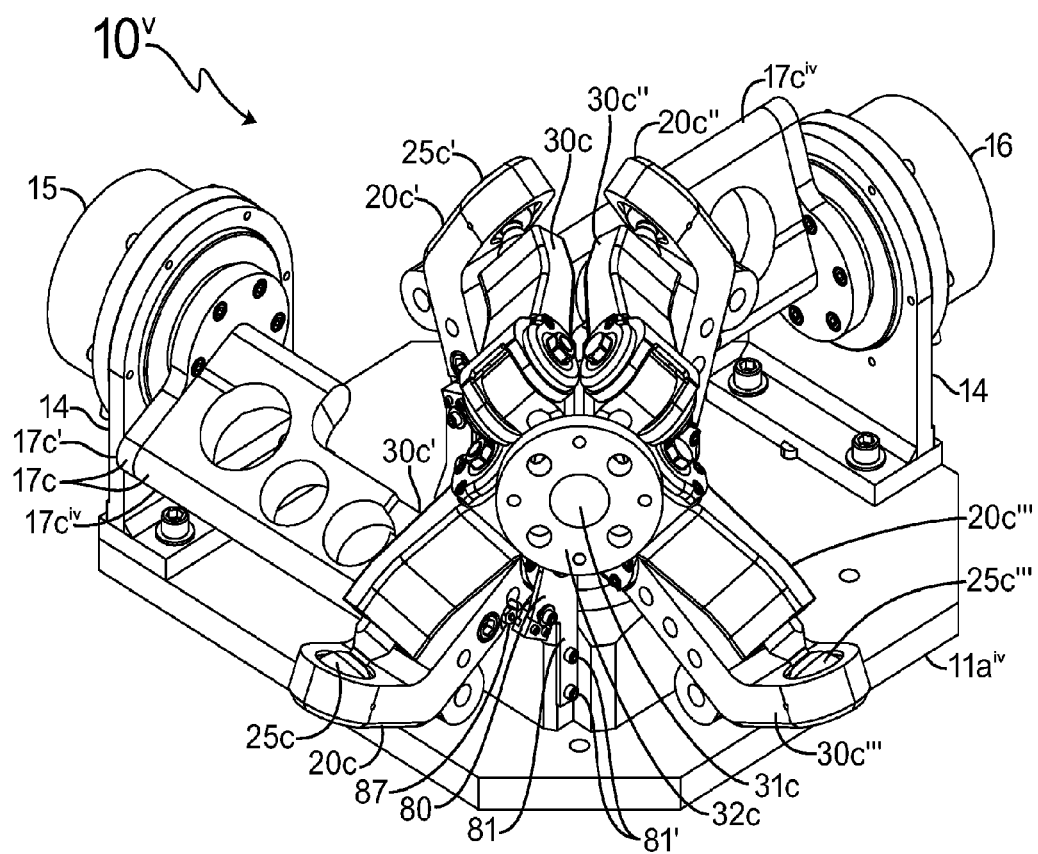
FIG. 51 shows yet a further perspective view of the embodiment shown in FIGS. 38 and 39.

FIGS. 50 and 51 illustrate two selected positionings of manipulable support 32c with FIG. 50 providing a perspective view of manipulable support 32c located at an extreme position away from the position taken when the axes of symmetry of openings 13c and 31c coincide and, in addition, provides a partial detail view of permanent magnet 87. FIG. 51 provides a perspective view of manipulable support 32c located at another such extreme position.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the disclosure herein.

The invention claimed is:

1. A controlled relative motion system comprising:
   a base support;
   a plurality of lower link members each having a first end pivotally coupled to the base support and each having a second end that includes a spherical section capture opening;
   a plurality of upper link members each having a first end rotatably coupled to a respective one of the plurality of lower link members via a spherical joint formed by a ball and socket received in the spherical section capture opening, and each having a second end;
   a manipulable support pivotally coupled to the second end of each of the plurality of upper link members; and
   a tiltable and rotatable column structure supporting the manipulable support, wherein the tiltable and rotatable column structure supporting the manipulable support is coupled to the base support via a first end spherical joint and is coupled to the manipulable support via a second end spherical joint.

2. The controlled relative motion system of claim 1, wherein each of the plurality of upper link members comprises a first portion adjacent the first end thereof extending in a first plane, a second portion adjacent the second end thereof extending in a second plane, and an intermediate portion between the first portion and the second portion, the first plane and the second plane having an angle therebetween of about a quarter of a right angle.

3. The controlled relative motion system of claim 2, wherein the angle between the first plane and the second plane is about 25 degrees.

4. The controlled relative motion system of claim 1, wherein each of the plurality of lower link members comprises a first portion adjacent the first end thereof extending in a first plane, and a second portion adjacent the second end thereof extending in a second plane, the first plane and the second plane having an angle therebetween of about half of a right angle.

5. The controlled relative motion system of claim 4, wherein the angle between the first plane and the second plane is about 53 degrees.

6. The controlled relative motion system of claim 4, wherein the first portion of each of the plurality of lower link members adjacent the first end thereof extends to a point past half a length of the lower link member.

7. The controlled relative motion system of claim 1, wherein each spherical joint rotatably coupling the upper link members and the lower link members comprises a respective ball coupled to a joint stem of a respective upper link member, the ball having a rotational axis that is substantially aligned with and positioned relative to a respective socket receiving the ball so that the spherical joint provides a rotational range of motion without interference between the joint stem and the socket.

8. The controlled relative motion system of claim 7, wherein the rotational range of motion provided by each spherical joint rotatably coupling the upper link members and the lower link members is greater than 180 degrees.

9. The controlled relative motion system of claim 1, wherein each spherical joint rotatably coupling the upper link members and the lower link members comprises a ball formed by a ring that receives a joint stem attached to a respective upper link member on a first side of the ball, the ring being received in the spherical section capture opening.

10. The controlled relative motion system of claim 9, wherein each spherical joint rotatably coupling the upper link members and the lower link members further comprises a spherical portion joining cap on a second side of the ball opposite the first side of the ball that forms a rounded surface on the second side of the ball.

11. The controlled relative motion system of claim 1, wherein each spherical section capture opening of the plurality of lower link members comprises an inwardly extending edge ring that reduces an inner diameter of the spherical section capture opening.

12. The controlled relative motion system of claim 1, wherein each of the plurality of lower link members is pivotally coupled to the base support via a pivot ring boss having a pivot opening with an axis of symmetry extending in a first direction.

13. The controlled relative motion system of claim 12, wherein each spherical section capture opening of the plurality of lower link members has an axis of rotational symmetry that extends in a direction perpendicular to the first direction of the axis of symmetry of the pivot opening for the respective one of the lower link members.

14. The controlled relative motion system of claim 1, wherein the first end spherical joint and the second end spherical joint coupling the tiltable and rotatable column structure to the base support and to the manipulable support each comprises a ball receiving a stud portion of the column structure on a first side of the ball, the ring being received in the spherical section capture opening and having a spherical portion joining cap on a second side of the ball opposite the first side of the ball that forms a rounded surface on the second side of the ball.

15. The controlled relative motion system of claim 1, wherein the plurality of lower link members comprises three lower link members, and the plurality of upper link members comprises three upper link members.

16. The controlled relative motion system of claim 1, wherein the plurality of lower link members comprises four lower link members, and the plurality of upper link members comprises four upper link members.

17. The controlled relative motion system of claim 1, further comprising a plurality of force imparting members coupled to the lower link members that are operable to forcibly rotate the lower link members.

18. The controlled relative motion system of claim 17, wherein the plurality of force imparting members comprises a plurality of rotary motors each connected to a rotary output transferor attached between a respective one of the plurality of rotary motors and a respective one of the plurality of lower link members.

19. The controlled relative motion system of claim 2, wherein the intermediate portion between the first portion and the second portion of each of the plurality of upper link members is curved or angled inward.

20. A controlled relative motion system comprising:
a base support;
a plurality of lower link members each having a first end pivotally coupled to the base support and each having a second end that includes a spherical section capture opening, wherein the plurality of lower link members are each pivotally coupled at the first end thereof to the base support by a connection joint comprising:
  a pair of tapered roller bearings retained in coaxial pivot openings formed by alignment of pivot bosses of a respective lower link member and of the base support;
  a link bolt extending through the tapered roller bearings; and
  a link nut providing a selected loading force on the link bolt and on the tapered roller bearings against the pivot bosses, to adjust frictional drag during movement of the respective lower link members with respect to the base support and reduce rotational backlash;
a plurality of upper link members each having a first end rotatably coupled to a respective one of the plurality of lower link members via a spherical joint formed by a ball and socket received in the spherical section capture opening, and each having a second end; and
a manipulable support pivotally coupled to the second end of each of the plurality of upper link members.

21. The controlled relative motion system of claim 20, further comprising a tiltable and rotatable column structure supporting the manipulable support, wherein the tiltable and rotatable column structure supporting the manipulable support is coupled to the base support via a first end spherical joint and is coupled to the manipulable support via a second end spherical joint.

22. The controlled relative motion system of claim 20, wherein each spherical section capture opening of the plurality of lower link members comprises an inwardly extending edge ring that reduces an inner diameter of the spherical section capture opening.

23. A controlled relative motion system comprising:
a base support;
a plurality of lower link members each having a first end pivotally coupled to the base support and each having a second end that includes a spherical section capture opening;
a plurality of upper link members each having a first end rotatably coupled to a respective one of the plurality of lower link members via a spherical joint formed by a ball and socket received in the spherical section capture opening, and each having a second end, wherein the plurality of upper link members are each pivotally coupled at the second end thereof to the manipulable support by a connection joint comprising:
  a pair of tapered roller bearings retained in coaxial pivot openings formed by alignment of pivot bosses of a respective upper link member and of the manipulable support;
  a link bolt extending through the tapered roller bearings; and
  a link nut providing a selected loading force on the link bolt and on the tapered roller bearings against the pivot bosses, to adjust frictional drag during movement of the respective upper link members with respect to the manipulable support and reduce rotational backlash; and
a manipulable support pivotally coupled to the second end of each of the plurality of upper link members.

24. The controlled relative motion system of claim 23, further comprising a tiltable and rotatable column structure supporting the manipulable support, wherein the tiltable and rotatable column structure supporting the manipulable support is coupled to the base support via a first end spherical joint and is coupled to the manipulable support via a second end spherical joint.

* * * * *

UNITED STATES PATENT AND TRADEMARK OFFICE
CERTIFICATE OF CORRECTION

| | |
|---|---|
| PATENT NO. | : 9,630,326 B2 |
| APPLICATION NO. | : 14/356437 |
| DATED | : April 25, 2017 |
| INVENTOR(S) | : Mark E. Rosheim |

It is certified that error appears in the above-identified patent and that said Letters Patent is hereby corrected as shown below:

In the Specification

Column 27, Line 5:
Delete "11e"
Insert --$11d^{iv}$--

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*